US012106612B2

(12) United States Patent
Fukushima et al.

(10) Patent No.: US 12,106,612 B2
(45) Date of Patent: Oct. 1, 2024

(54) INVESTIGATION ASSISTANCE SYSTEM AND INVESTIGATION ASSISTANCE METHOD

(71) Applicant: i-PRO Co., Ltd., Fukuoka (JP)

(72) Inventors: Yoshitaka Fukushima, Fukuoka (JP); Hiroaki Ootake, Fukuoka (JP)

(73) Assignee: I-PRO CO., LTD., Tokyo (JP)

( * ) Notice: Subject to any disclaimer, the term of this patent is extended or adjusted under 35 U.S.C. 154(b) by 227 days.

(21) Appl. No.: 17/746,479

(22) Filed: May 17, 2022

(65) Prior Publication Data

US 2022/0277642 A1    Sep. 1, 2022

Related U.S. Application Data

(63) Continuation of application No. PCT/JP2020/042079, filed on Nov. 11, 2020.

(30) Foreign Application Priority Data

Nov. 18, 2019  (JP) .................................. 2019-207978
Dec. 23, 2019  (JP) .................................. 2019-231727

(51) Int. Cl.
*G07C 5/08* (2006.01)
*G06T 7/00* (2017.01)
(Continued)

(52) U.S. Cl.
CPC ............... *G07C 5/008* (2013.01); *G06T 7/00* (2013.01); *H04N 7/18* (2013.01); *G08B 13/19608* (2013.01)

(58) Field of Classification Search
None
See application file for complete search history.

(56) References Cited

U.S. PATENT DOCUMENTS

2006/0078047 A1 *  4/2006  Shu .................. G08B 13/19613
                                              348/E7.086
2017/0076140 A1    3/2017  Waniguchi et al.
(Continued)

FOREIGN PATENT DOCUMENTS

JP    2007-174016    7/2007
JP    2016-066314    4/2016
(Continued)

OTHER PUBLICATIONS

Office Action from Japan Patent Office (JPO) in Japanese Patent Appl. No. 2019-231727, dated Oct. 31, 2023, together with an English language translation.
(Continued)

*Primary Examiner* — Shirley X Zhang
(74) *Attorney, Agent, or Firm* — GREENBLUM & BERNSTEIN, P.L.C.

(57) ABSTRACT

A user terminal displays an analysis server selection screen showing a list of a plurality of analysis servers provided to respectively correspond to a plurality of different object feature elements relating to an incident or the like, and, on the basis of input of a retrieval condition including the object feature element of an object to be retrieved by a first analysis server selected from the analysis server selection screen, transmits, to an integrated server, a request to retrieve a corresponding object satisfying the retrieval condition. The integrated server transmits an instruction to retrieve the corresponding object to the first analysis server on the basis of the request to retrieve, receives a retrieval result from the first analysis server, and transmits the retrieval result to the user terminal.

12 Claims, 27 Drawing Sheets

(51) Int. Cl.
*G07C 5/00* (2006.01)
*G08B 13/196* (2006.01)
*H04N 7/18* (2006.01)

(56) References Cited

U.S. PATENT DOCUMENTS

| | | | |
|---|---|---|---|
| 2017/0257602 A1* | 9/2017 | Axson | G08B 13/19689 |
| 2018/0047287 A1* | 2/2018 | Shimotsuma | G06V 20/58 |
| 2019/0057600 A1 | 2/2019 | Watanabe et al. | |
| 2019/0057601 A1 | 2/2019 | Watanabe et al. | |
| 2019/0058849 A1 | 2/2019 | Watanabe et al. | |
| 2019/0120650 A1 | 4/2019 | Miyake et al. | |
| 2019/0122052 A1 | 4/2019 | Miyake et al. | |
| 2019/0156665 A1 | 5/2019 | Watanabe et al. | |
| 2020/0097734 A1 | 3/2020 | Miyake et al. | |
| 2021/0035312 A1* | 2/2021 | Zhuravlev | G06V 10/764 |
| 2021/0256268 A1 | 8/2021 | Miyake et al. | |

FOREIGN PATENT DOCUMENTS

| | | |
|---|---|---|
| JP | 6011833 | 10/2016 |
| JP | 2019-036872 | 3/2019 |
| JP | 2019-080293 | 5/2019 |
| JP | 6573346 | 9/2019 |
| WO | 2018/198376 | 11/2018 |

OTHER PUBLICATIONS

Office Action from Japan Patent Office (JPO) in Japanese Patent Appl. No. 2019-207978, dated Oct. 31, 2023, together with an English language translation.

International Search Report (ISR) from International Searching Authority (Japan Patent Office) in International Pat. Appl. No. PCT/JP2020/042079, dated Feb. 2, 2021, together with an English language translation.

\* cited by examiner

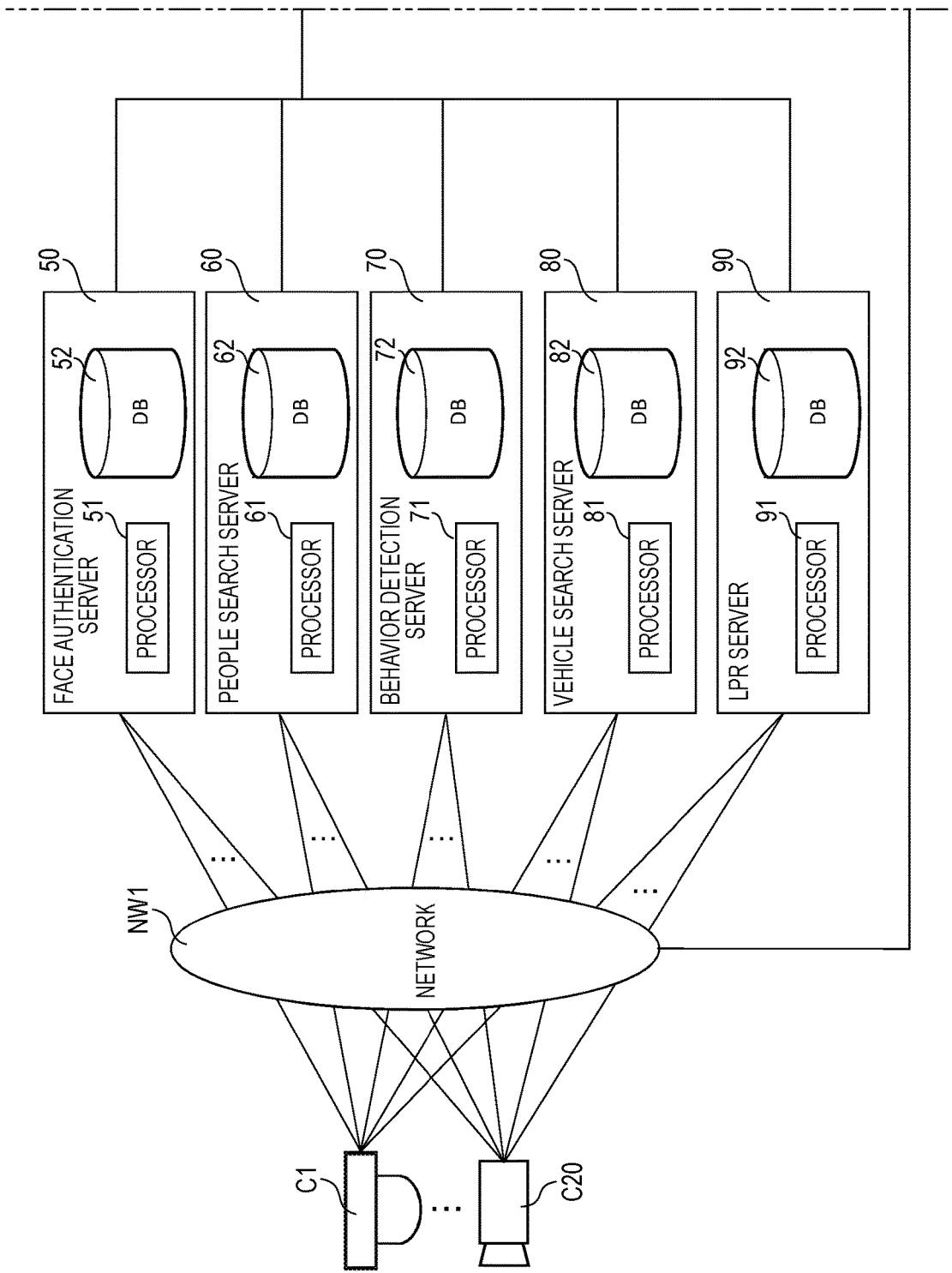
(FIG. 1 CONT.)

FIG. 12

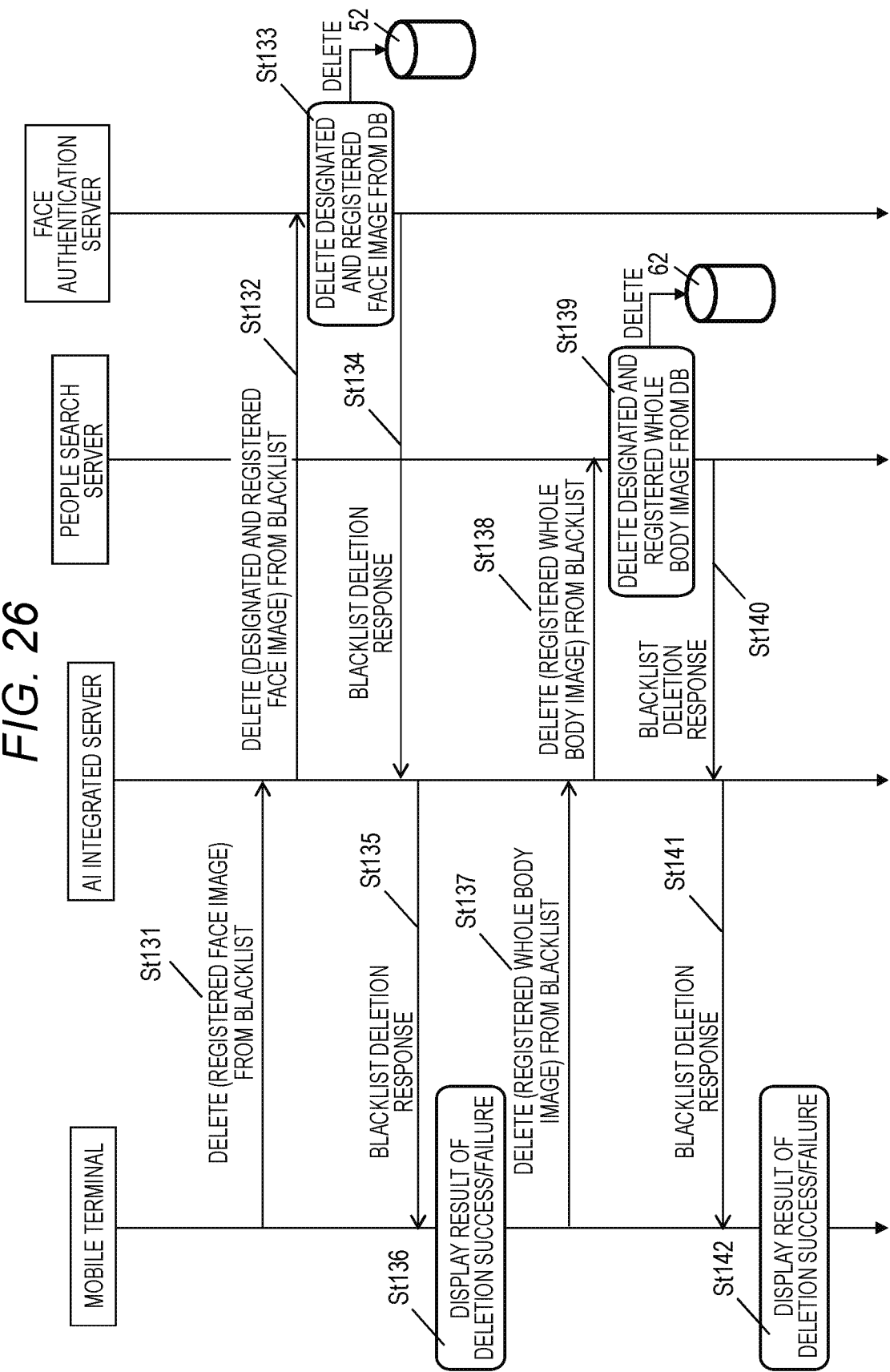

INVESTIGATION ASSISTANCE SYSTEM AND INVESTIGATION ASSISTANCE METHOD

CROSS-REFERENCE TO RELATED APPLICATIONS

This is a continuation of International Application No. PCT/JP2020/042079 filed on Nov. 11, 2020, and claims priority from Japanese Patent Applications No. 2019-207978 filed on Nov. 18, 2019 and No. 2019-231727 filed on Dec. 23, 2019, the entire content of which is incorporated herein by reference.

TECHNICAL FIELD

The present disclosure relates to an investigation assistance system and an investigation assistance method for assisting an investigation on an incident or the like by an investigation institution.

BACKGROUND ART

There is known a technique in which a plurality of camera devices are arranged at predetermined positions on a travel route of a vehicle, and camera image information captured by each camera device is displayed on a display device in a terminal device mounted on the vehicle via a network and a wireless information exchange device (for example, see Patent Literature 1). According to Patent Literature 1, a user can obtain a real-time camera image having a large amount of information based on the camera image information captured by the plurality of cameras arranged on the travel route of the vehicle.

CITATION LIST

Patent Literature

Patent Literature 1: JP-A-2007-174016

SUMMARY OF INVENTION

Technical Problem

In Patent Literature 1, since camera image information captured by a plurality of camera devices can be displayed on a display device in a terminal device mounted on a vehicle, a user (for example, a driver) can confirm the camera image information in real time at an arrangement position of each camera device. However, in view of recent circumstances in which a form of an incident or an accident (hereinafter, referred to as an "incident or the like") is diversified, it is not considered in Patent Literature 1 that a suspect who caused the incident or the like finds a vehicle for escape and notifies a user. In particular, in an investigation (in particular, an initial investigation) by an investigation institution such as the police, it is often required to quickly specify a vehicle for escape in order to find a suspect at an early stage. However, even when the technique in Patent Literature 1 is used, there is a problem that it is difficult to find the suspect or the vehicle for escape at an early stage since it takes time and it is inefficient to confirm the suspect and specify the vehicle for escape by an investigator (for example, a police officer) manually watching videos of camera devices one by one.

The present disclosure is made in view of the circumstances in the related art described above, and an object of the present disclosure is to provide an investigation assistance system and an investigation assistance method that efficiently assist, at an early stage, specification of a vehicle for escape used by a suspect who caused an incident or the like and improve convenience of an investigation of an investigation institution such as the police.

Solution to Problem

According to an aspect of the present disclosure, there is provided an investigation assistance system including a user terminal, and an integrated server that is communicably connected to a plurality of analysis servers. The user terminal displays an analysis server selection screen showing a list of the plurality of analysis servers provided corresponding to a plurality of different object feature elements related to an incident or the like, and selects a first analysis server from the analysis server selection screen, and transmits, to the integrated server, a search request for an object satisfying a search condition including an object feature element of an object to be searched by the selected first analysis server based on an input of the search condition. The integrated server transmits an object search instruction to the first analysis server based on the search request, receives a search result from the first analysis server, and transmits the search result to the user terminal.

Further, according to another aspect of the present disclosure, there is provided an investigation assistance method to be executed by an investigation assistance system including a user terminal and an integrated server that is communicably connected to a plurality of analysis servers. The investigation assistance method includes displaying, by the user terminal, an analysis server selection screen showing a list of the plurality of analysis servers provided corresponding to a plurality of different object feature elements related to an incident or the like; selecting, by the user terminal, a first analysis server from the analysis server selection screen, and transmitting, to the integrated server, a search request for an object satisfying a search condition including an object feature element of an object to be searched by the selected first analysis server based on an input of the search condition; and transmitting, by the integrated server, an object search instruction to the first analysis server based on the search request, receiving a search result from the first analysis server, and transmitting the search result to the user terminal.

Further, according to the other aspect of the present disclosure, the integrated server is communicably connected to n (n is an integer equal to or larger than 2) analysis servers, and periodically monitors a communication status with each of the n analysis servers. When a search condition including k (k is an integer from 1 to n) different object feature elements is received from the user terminal, the integrated server determines k analysis servers provided corresponding to the k object feature elements included in the search condition among the n analysis servers, and transmits an object search request to each of the k analysis servers. When it is detected that a communication disconnection with a specific analysis server among the k analysis servers occurs, the integrated server transmits, to the user terminal, search results received from the (k−1) analysis servers and a communication disconnection notification indicating that a communication disconnection with the specific analysis server occurs. The user terminal displays a search result screen including the search results received from the (k−1) analysis servers and the communication disconnection notification.

Furthermore, according to the other aspect of the present disclosure, the integrated server is communicably connected to n (n is an integer equal to or larger than 2) analysis servers. The investigation assistance method further includes periodically monitoring, by the integrated server, a communication status with each of the n analysis servers, receiving, by the integrated server, a search condition including k (k is an integer from 1 to n) different object feature elements from the user terminal, and subsequently determining k analysis servers provided corresponding to the k object feature elements included in the search condition among the n analysis servers; transmitting, by the integrated server, an object search request to each of the k analysis servers; when detecting that a communication disconnection with a specific analysis server among the k analysis servers occurs, transmitting, by the integrated server, to the user terminal, search results received from the (k−1) analysis servers and a communication disconnection notification indicating that a communication disconnection with the specific analysis server occurs; and displaying, by the user terminal, a search result screen including the search results received from the (k−1) analysis servers and the communication disconnection notification.

Furthermore, according to the other aspect of the present disclosure, the integrated server is communicably connected to at least a first analysis server and a second analysis server. When a search condition including a first object feature element related to an incident or the like and a second object feature element related to the incident or the like is received from the user terminal, the integrated server transmits a search request for an object satisfying the first object feature element to the first analysis server and a search request for an object satisfying the second object feature element to the second analysis server. The integrated server receives a first search result including the object satisfying the first object feature element from the first analysis server and a second search result including the object satisfying the second object feature element from the second analysis server. The integrated server transmits a third search result obtained by excluding the second search result from the first search result to the user terminal. The user terminal displays a search result screen including the third search result transmitted from the integrated server.

Furthermore, according to the other aspect of the present disclosure, the integrated server is communicably connected to at least a first analysis server and a second analysis server. The investigation assistance method further includes receiving, by the integrated server, a search condition including a first object feature element related to an incident or the like and a second object feature element related to the incident or the like from the user terminal, and subsequently transmitting, by the integrated server, a search request for an object satisfying the first object feature element to the first analysis server and a search request for an object satisfying the second object feature element to the second analysis server, receiving, by the integrated server, a first search result including the object satisfying the first object feature element from the first analysis server and a second search result including the object satisfying the second object feature element from the second analysis server, transmitting, by the integrated server, a third search result obtained by excluding the second search result from the first search result to the user terminal, and displaying, by the user terminal, a search result screen including the third search result transmitted from the integrated server.

Advantageous Effects of Invention

According to the present disclosure, it is possible to efficiently assist, at an early stage, specification of a suspect who caused an incident or the like or a vehicle for escape used by the suspect and improve convenience of an investigation by an investigation institution such as the police.

BRIEF DESCRIPTION OF DRAWINGS

FIG. 12 is a diagram showing an example of a search condition detail screen according to a third embodiment.

FIG. 26 is a sequence diagram showing an operation procedure example related to deletion an image of a suspicious people from a blacklist in the investigation assistance system according to the sixth embodiment.

DESCRIPTION OF EMBODIMENTS

Hereinafter, embodiments specifically disclosing an investigation assistance system and an investigation assistance method according to the present disclosure will be described in detail with reference to the accompanying drawings as appropriate. Unnecessarily detailed description may be omitted. For example, detailed description of a well-known matter or repeated description of substantially the same configuration may be omitted. This is to avoid unnecessary redundancy in the following description and to facilitate understanding for those skilled in the art. The accompanying drawings and the following description are provided for those skilled in the art to fully understand the present disclosure, and are not intended to limit the subject matter described in the claims.

Hereinafter, an example will be described in which an investigation assistance system assists an investigation of a police officer on a suspect who caused an incident or the like on the street or in a building or assist the specification or tracking of a vehicle for escape used by the suspect, by using videos captured by cameras (for example, monitoring cameras such as security cameras) installed in various places at the street or in a building. The police is an example of an investigation institution. In the following description, it is assumed that captured video data conceptually includes captured image data.

First Embodiment

Figure 1:
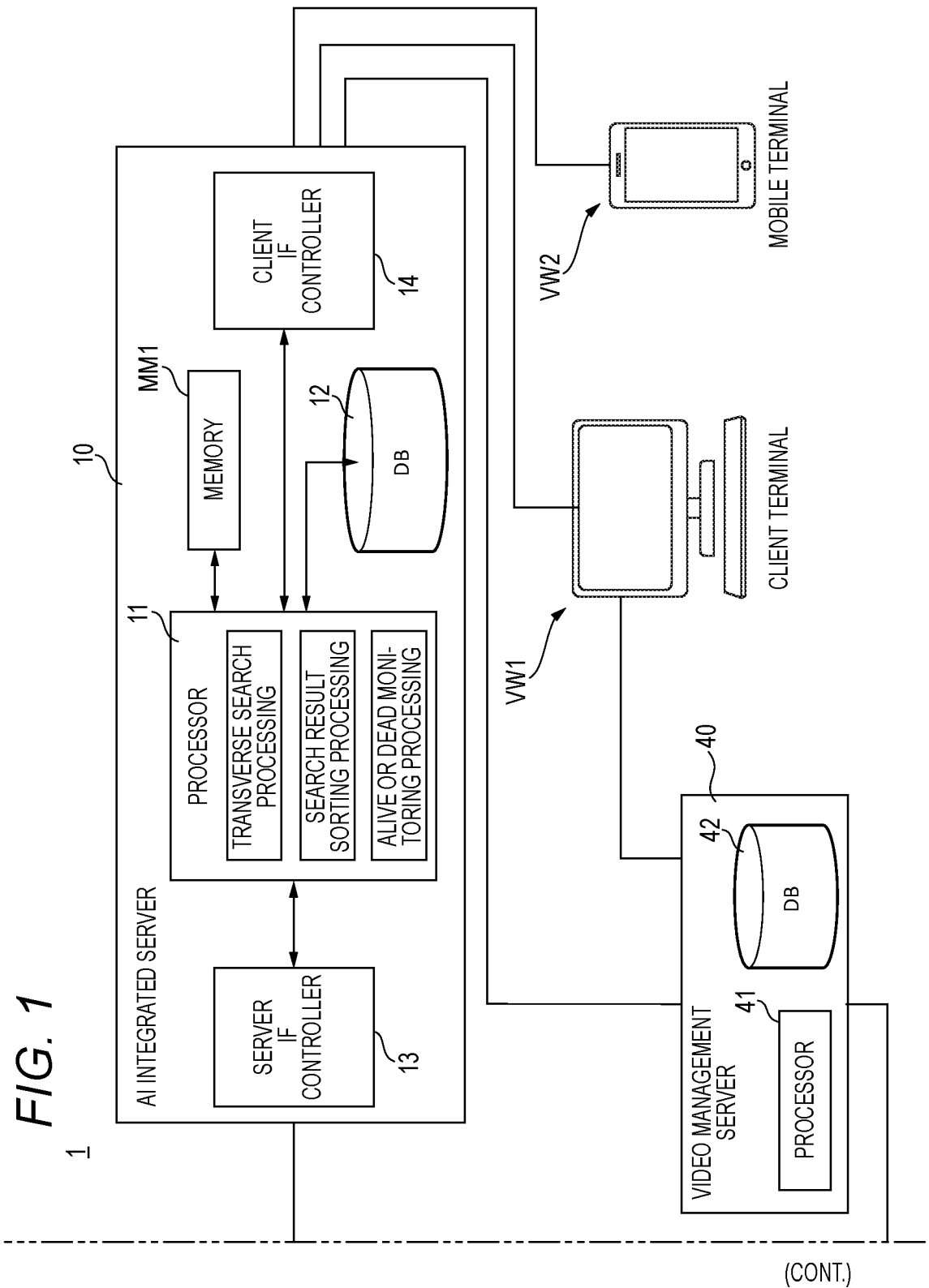
FIG. 1 is a block diagram showing a system configuration example of an investigation assistance system.

FIG. 1 is a block diagram showing a system configuration example of an investigation assistance system 1. The investigation assistance system 1 includes at least an artificial intelligence (AI) integrated server 10, a video management server 40, a face authentication server 50, a people search server 60, a behavior detection server 70, a vehicle search server 80, and a license plate recognition (LPR) server 90. The investigation assistance system 1 may further include a client terminal VW1 and a mobile terminal VW2 as viewers. The video management server 40, the face authentication server 50, the people search server 60, the behavior detection server 70, the vehicle search server 80, and the LPR server 90 are communicably connected to a plurality of (for example, 20) cameras C1 to C20 via a network NW1, respectively. The video management server 40, the face authentication server 50, the people search server 60, the behavior detection server 70, the vehicle search server 80, and the LPR server 90 may be an on-premises server in a police station or may be provided as a cloud server connected to a network such as the Internet.

Although only one client terminal VW1 and only one mobile terminal VW2 are shown in FIG. 1, a plurality of client terminals VW1 and a plurality of mobile terminals VW2 may be provided. The investigation assistance system 1 is not limited to being used only in a single police station, and may be applied to an example in which a plurality of police stations perform a joint investigation.

The cameras C1 to C20 are installed in places on the street or in a building for the purpose of monitoring. Each of the cameras C1 to C20 generates captured video data of an imaging area (in other words, a subject), and transmits the captured video data to each server (specifically, the face authentication server 50, the people search server 60, the behavior detection server 70, the vehicle search server 80, and the LPR server 90) via the network NW1. In the following description, the captured video data includes not only captured video data but also camera identification information of a camera that captures a video and imaging date and time information. The camera identification information may include arrangement position information of a camera in addition to the camera identification information. The cameras C1 to C20 may be fixedly installed on a roadside of a main arterial road such as a national road or a prefectural road, or may be fixedly installed near an intersection. Each of the cameras C1 to C20 is communicably connected to each server (specifically, the video management server 40, the face authentication server 50, the people search server 60, the behavior detection server 70, the vehicle search server 80, and the LPR server 90) via the network NW1 such as an intranet communication line. Although the network NW1 is configured with a wired communication line (for example, an optical communication network using an optical fiber) here, the network NI may be configured with a wireless communication network. All of the cameras C1 to C20 may be manufactured by the same manufacturer, or some of the cameras may be manufactured by other manufacturers. Although the captured video data of the cameras C1 to C20 are commonly received by the servers (specifically, the video management server 40, the face authentication server 50, the people search server 60, the behavior detection server 70, the vehicle search server 80, and the LPR server 90) in the configuration example of FIG. 1, the captured video data commonly received by the servers may be captured video data of all of the cameras C1 to C20 or may be captured video data of some of the cameras C1 to C20. Details will be described with reference to FIG. 2, and the cameras C1 to C20 may execute a video analysis on the captured video data (for example, detect a face of an occupant in the vehicle).

The video management server 40 serving as an analysis server is installed in, for example, a police station, and includes at least a processor 41 and a database 42. Hereinafter, the database may be simply referred to as "DB". The video management server 40 stores data of a processing result of each of the face authentication server 50, the people search server 60, the behavior detection server 70, the vehicle search server 80, and the LPR server 90, and stores captured video data of the cameras C1 to C20. The video management server 40 may receive and store captured video data of the cameras C1 to C20 via the network NW1, or may receive and store captured video data of the cameras C1 to C20 from any one of the face authentication server 50, the people search server 60, the behavior detection server 70, the vehicle search server 80, and the LPR server 90. In response to a request transmitted from the client terminal VW1 in accordance with an operation of an operator in a police station or from the mobile terminal VW2 in accordance with an operation of an on-site police officer, the video management server 40 may read captured video data satisfying the request from the database 42 and transmit the captured video data to the client terminal VW1 or the mobile terminal VW2.

The face authentication server 50 serving as an analysis server is installed in, for example, a police station, and includes at least a processor 51 and a database 52. Each time the processor 51 of the face authentication server 50 receives the captured video data of the cameras C1 to C20, the processor 51 executes a video analysis such as detecting a face of a people (an example of an object to be searched) appearing in the captured video data, and stores a video analysis result in the database 52. When the processor 51 of the face authentication server 50 detects a face that is the same as or similar to a face image registered in blacklist data (to be described later) during the video analysis, the processor 51 may generate, as a video analysis result, an alarm notification for notifying the detection of a people whose face image is registered in the blacklist data. The face image for which the alarm notification is to be generated is registered in advance in the face authentication server 50, and this registration may be executed according to a registration instruction from the client terminal VW1 or the mobile terminal VW2 by an operation of an operator or the like. The alarm notification is transmitted from the face authentication server 50 to the AI integrated server 10 each time the alarm notification is generated. The video analysis result includes, for example, a face image of a people appearing in the captured video data (that is, a face image generated by cutting out a face portion of a people in a captured image frame constituting the captured video data), and an imaging date and time of the captured video data used for the video analysis and camera identification information. When the processor 51 of the face authentication server 50 receives a processing instruction (for example, a face image collation instruction) from the AI integrated server 10, the processor 51 collates whether a face image to be collated included in the processing instruction is registered in blacklist data (to be described later) of the database 52, and stores a collation result in the database 52. Here, the blacklist data (an example of a face database) is, for example, data in which person information including a face image of a person who is a former criminal that caused an incident or the like in the past is classified and registered for each incident or the like, and is registered in the database 52. The blacklist data may be registered in the database 52 or may be registered in another external database (not shown).

The people search server 60 serving as an analysis server is installed in, for example, a police station, and includes at least a processor 61 and a database 62. Each time the processor 61 of the people search server 60 receives captured video data of the cameras C1 to C20, the processor 61 executes a video analysis for extracting information about a people (for example, a suspect or an example of an object to be searched) appearing in the captured video data, and stores a video analysis result in the database 62. When the processor 61 of the people search server 60 detects a people satisfying people attribute information (for example, information indicating an appearance feature of a suspicious people, an example of an object feature element) during the video analysis, the processor 61 may generate, as a video analysis result, an alarm notification for notifying the detection of the people satisfying the people attribute information.

The people attribute information for which the alarm notification is to be generated is registered in advance in the people search server 60, and this registration may be executed according to a registration instruction from the client terminal VW1 or the mobile terminal VW2 by an operation of an operator or the like. The alarm notification is transmitted from the people search server 60 to the AI integrated server 10 each time the alarm notification is generated. The video analysis result includes, for example, people information (for example, face, gender, age, hair type, height, body shape, personal belongings, and accessories of a people appearing in the captured video) of a people appearing in the captured video data, an imaging date and time used in the video analysis, and camera identification information. The processor 61 of the people search server 60 stores the people information in the database 62 in association with the captured video data. For example, when an incident or the like occurs, the processor 61 refers to the video analysis result at the time of searching for whether corresponding people information is present based on a processing instruction (for example, a people information searching instruction) transmitted from the AI integrated server 10.

The behavior detection server 70 serving as an analysis server is installed in, for example, a police station, and includes at least a processor 71 and a database 72. Each time the processor 71 of the behavior detection server 70 receives captured video data of the cameras C1 to C20, the processor 71 executes a video analysis for detecting whether there is a predetermined behavior (to be described later) caused by at least one people appearing in the captured video data, and stores a video analysis result in the database 72. The video analysis result includes, for example, contents (a type) of a predetermined behavior, an imaging date and time of the captured video data used for the video analysis, and camera identification information. Although the predetermined behavior is, for example, at least one behavior that may become a trigger of an incident, such as dizziness of a people, quarreling, holding a gun, shoplifting, or the like, the predetermined behavior is not limited to these behaviors. When the predetermined behavior is detected, the processor 71 of the behavior detection server 70 generates an alarm notification including an imaging date and time corresponding to the captured video data in which the predetermined behavior is detected and camera identification information, and transmits the alarm notification to the AI integrated server 10.

The vehicle search server 80 serving as an analysis server is installed in, for example, a police station, and includes at least a processor 81 and a database 82. Each time the processor 81 of the vehicle search server 80 receives captured video data of the cameras C1 to C20, the processor 81 executes a video analysis for extracting information about a vehicle (for example, a vehicle for escape, an example of an object to be searched) appearing in the captured video data, and stores a video analysis result in the database 82. When the processor 81 of the vehicle search server 80 detects a vehicle satisfying vehicle attribute information (for example, information indicating an appearance feature such as a vehicle type or a vehicle color of the vehicle for escape, or an example of an object feature element) during the video analysis, the processor 81 may generate, as the video analysis result, an alarm notification for notifying the detection of the vehicle satisfying the vehicle attribute information. The vehicle attribute information for which the alarm notification is to be generated is registered in advance in the vehicle search server 80, and this registration may be executed according to a registration instruction from the client terminal VW1 or the mobile terminal VW2 by an operation of an operator or the like. The alarm notification is transmitted from the vehicle search server 80 to the AI integrated server 10 each time the alarm notification is generated. The video analysis result includes, for example, vehicle information (for example, information of a vehicle type, a vehicle color, and a license number of a vehicle appearing in the captured video) of a vehicle appearing in the captured video data, and an imaging date and time of the captured video data used for the video analysis and camera identification information. The processor 81 of the vehicle search server 80 stores the vehicle information in the database 82 in association with the captured video data. For example, when an incident or the like occurs, the processor 81 refers to the video analysis result at the time of searching for whether corresponding vehicle information is present based on a processing instruction (for example, a vehicle information searching instruction) transmitted from the AI integrated server 10.

The LPR server 90 serving as an analysis server is installed in, for example, a police station, and includes at least a processor 91 and a database 92. Each time the processor 91 of the LPR server 90 receives captured video data of the cameras C1 to C20, the processor 91 executes a video analysis for extracting a license number (an example of an object to be searched) printed on a license plate of a vehicle appearing in the captured video data, and stores a video analysis result in the database 92. When the processor 91 of the LPR server 90 detects a license number satisfying license number information of a suspicious vehicle (for example, a license number information of a vehicle for escape) during the video analysis, the processor 91 may generate, as the video analysis result, an alarm notification for notifying the detection of a license plate satisfying the license number information of the suspicious vehicle. The license number information of the suspicious vehicle for which the alarm notification is to be generated is registered in advance in the LPR server 90, and this registration may be executed according to a registration instruction from the client terminal VW1 or the mobile terminal VW2 by an operation of an operator or the like. The alarm notification is transmitted from the LPR server 90 to the AI integrated server 10 each time the alarm notification is generated. The processor 91 of the LPR server 90 collates whether license number information of a target to be collated included in a processing instruction (for example, a license number collation instruction) transmitted from the AI integrated server 10 is registered in license number list data (to be described later) of the database 92 based on the processing instruction, and stores a collation result in the database 92. Here, the license number list data is data in which license number information and information (for example, a face image and person information) related to a purchaser (in other words, an owner) of a corresponding vehicle are registered in association with each other in advance, and is registered in the database 92. The license number list data may be registered in the database 92 or may be registered in another external database (not shown).

The client terminal VW1 serving as an example of a user terminal is installed in, for example, a police station, and is used by an operator (a police officer) in the police station. The client terminal VW1 is configured with, for example, a laptop or a desktop personal computer (PC). For example, when an incident or the like occurs, the operator hears various kinds of information (witness information) related to the incident or the like by a phone call from a people (for example, a witness) who reports the occurrence of the incident or the like to the police station, and inputs and records data by operating the client terminal VW1. The client terminal VW1 transmits a search processing request including, for example, an object feature element of a people or a vehicle that is the same as or similar to the witness information as a search condition to the AI integrated server 10, receives, from the AI integrated server 10, a search result acquired by the AI integrated server 10 through a search by each server (for example, the face authentication server 50, the people search server 60, the vehicle search server 80, and the LPR server 90), and displays the search result (to be described later). When the client terminal VW1 is connected to the video management server 40 via a network in the police station such as a wireless LAN, the client terminal VW1 may access the video management server 40, acquire desired captured video data, and play back and display the captured video data.

The mobile terminal VW2 serving as an example of a user terminal is installed in, for example, a police station, and is used by a police officer who is out at a site or the like. The mobile terminal VW2 is configured with, for example, a computer such as a smartphone or a tablet terminal. The mobile terminal VW2 transmits a search processing request including, for example, an object feature element of a people or a vehicle that is the same as or similar to the witness information heard near the site as a search condition to the AI integrated server 10, receives, from the AI integrated server 10, a search result acquired by the AI integrated server 10 through a search by each server (for example, the face authentication server 50, the people search server 60, the vehicle search server 80, and the LPR server 90), and displays the search result (to be described later). When the mobile terminal VW2 is connected to the video management server 40 via a network (not shown) such as a wireless LAN or a mobile phone network, the mobile terminal VW2 may access the video management server 40, acquire desired captured video data, and play back and display the captured video data.

The AI integrated server 10 serving as an integrated server is installed, for example, in a police station. When the AI integrated server 10 receives the search processing request (see above description) for a people or a vehicle from the client terminal VW1 or the mobile terminal VW2, the AI integrated server 10 specifies an analysis server required by the search of the processing request. The AI integrated server 10 generates and transmits a processing instruction corresponding to the specified analysis server (for example, the face authentication server 50, the people search server 60, the vehicle search server 80, and the LPR server 90). Here, in the investigation assistance system 1 according to the first embodiment, manufacturers of the analysis servers (specifically, the face authentication server 50, the people search server 60, the behavior detection server 70, the vehicle search server 80, and the LPR server 90) may be the same or may be different from one another.

For example, when manufacturers of all of the analysis servers (specifically, the face authentication server 50, the people search server 60, the vehicle search server 80, and the LPR server 90) are the same, an application screen (for example, an input screen of a search condition or a collation condition) for requesting each server to search for information from the client terminal VW1 or the mobile terminal VW2 may be generated in a common layout or the like unique to the manufacturer. Therefore, an operator or the like can perform a transverse search (AND search) in which a plurality of objects (for example, a people, a vehicle, a face, and a number plate) are mixed on an input screen of one search condition.

When manufacturers of all of the analysis servers (specifically, the face authentication server 50, the people search server 60, the vehicle search server 80, and the LPR server 90) are not the same, an application screen (for example, an input screen of a search condition) for requesting the analysis servers made by different manufacturers to search for information from the client terminal VW1 or the mobile terminal VW2 is generated by different search algorithms, layouts, or the like for each manufacturer. That is, from the viewpoint of the client terminal VW1 or the mobile terminal VW2, an input screen (an application) of a collation condition to the face authentication server 50, an input screen (an application) of a search condition to the people search server 60, and an input screen (an application) of a search condition to the vehicle search server 80 are different from one another. For example, it is not possible to perform a transverse search in which a plurality of objects (for example, a people, a vehicle, a face, and a number plate) are mixed at a time, and convenience of a system is lowered.

Therefore, in the first embodiment, even in a case where manufacturers of the analysis servers (specifically, the face authentication server 50, the people search server 60, the vehicle search server 80, and the LPR server 90) are different from one another, when the AI integrated server 10 receives a search processing request from the client terminal VW1 or the mobile terminal VW2, the AI integrated server 10 uses a common interface (IF) for communication (access) with the analysis servers that are destinations of the processing request. The interface referred to here is, for example, a common search algorithm in which an object search algorithm used in each server is universally used, and the AI integrated server 10 stores the common search algorithm in advance. The AI integrated server 10 uses the search algorithm (interface) common to each analysis server to send a search or collation processing instruction to a corresponding analysis server. The interface may be, for example, an interface in which an agreement or a protocol related to a specification of communication with each analysis server (specifically, the face authentication server 50, the people search server 60, the vehicle search server 80, and the LPR server 90) is standardized, or may be an individual interface suitable for communication with each analysis server. The AI integrated server 10 may use the interface suitable for communication with each analysis server to transmit and receive data or information (for example, receive an alarm notification).

The AI integrated server 10 is configured with, for example, a high-performance server computer. Specifically, the AI integrated server 10 includes a memory MM1, a processor 11, a database 12, a server IF controller 13, and a client IF controller 14.

The memory MM1 is configured with, for example, a random access memory (RAM) and a read only memory (ROM), and temporarily stores a program necessary for executing an operation of the AI integrated server 10, and further stores data or information generated during the operation. The RAM is, for example, a work memory used when the processor 11 operates. The ROM stores, for example, a program for controlling the processor 11 in advance. The memory MM1 records road map information indicating positions where the cameras C1 to C20 are installed, and records updated road map information each time road map information is updated by, for example, new road construction, maintenance work, or the like.

The processor 11 is configured with, for example, a central processing unit (CPU), a digital signal processor (DSP), or a field programmable gate array (FPGA), functions as a control unit of the AI integrated server 10, and executes a control processing for integrally controlling an operation of each unit of the AI integrated server 10, a data input and output processing to each unit of the AI integrated server 10, a data calculation processing, and a data storage processing. The processor 11 operates in accordance with a computer program stored in the memory MM1. The computer program causes, for example, the AI integrated server 10 that is a computer device to execute a step of communicating with a terminal (for example, the client terminal VW1 or the mobile terminal VW2), a step of communicating with a plurality of analysis servers (for example, the face authentication server 50, the people search server 60, the behavior detection server 70, the vehicle search server 80, and the LPR server 90) that execute video analyses on different objects related to an incident or the like using captured video data of the plurality of cameras C1 to C20, a step of transmitting an object search request to an analysis server corresponding to an object feature element based on an input of a plurality of different object feature elements from the terminal, and a step of receiving object search results from respective analysis servers and integrally displaying the search results on the terminal.

For example, when the processor 11 receives a search processing request for a people or a vehicle from the client terminal VW1 or the mobile terminal VW2, the processor 11 specifies at least one server necessary for a search of the processing request. The processor 11 generates and transmits a processing instruction (for example, a search instruction) corresponding to the specified analysis server (for example, the face authentication server 50, the people search server 60, the vehicle search server 80, and the LPR server 90). As a result, the processor 11 can execute a transverse search (a transverse search processing) for a people and a vehicle using, for example, a plurality of analysis servers (for example, the people search server 60 and the vehicle search server 80). For example, as the transverse search processing, the processor 11 executes a refined search using two objects of a feature and a face of a people or three objects of a vehicle, a people, and a face in a corresponding analysis server.

For example, when the processor 11 receives a search result from each analysis server, the processor 11 rearranges a search result for each object (for example, a people or a vehicle) (executes a search result sorting processing). For example, the processor 11 determines an order indicating matching degrees of images (for example, a thumbnail image of a people, a thumbnail image of a face, and a thumbnail image of a vehicle) included in the search result based on scores (for example, a probability value indicating a similarity of a search result obtained based on a processing of an AI engine) included in the search result from each analysis server, and rearranges the images according to the order.

For example, the processor 11 transmits a predetermined command to each analysis server (specifically, the video management server 40, the face authentication server 50, the people search server 60, the behavior detection server 70, the vehicle search server 80, and the LPR server 90) connected to the AI integrated server 10. The processor 11 monitors an alive or dead state (executes an alive or dead monitoring processing) of an analysis server (that is, whether there is an operation of a process in a server computer) according to whether a command response is received from each analysis server.

The database 12 is configured with, for example, a hard disk drive (HDD) or a solid state drive (SSD), and stores data or information acquired or generated by the processor 11.

The server IF controller 13 is configured with a communication interface circuit that manages communication (transmission and reception) between the AI integrated server 10 and each of the analysis servers (specifically, the face authentication server 50, the people search server 60, the behavior detection server 70, the vehicle search server 80, and the LPR server 90). For example, when manufacturers of the face authentication server 50, the people search server 60, and the vehicle search server 80 are different from one another, the server IF controller 13 selects and uses an interface suitable for communication (access) with each server. For example, the server IF controller 13 includes an input and output interface for the face authentication server 50, an input and output interface for the people search server 60, and an input and output interface for the vehicle search server 80, and selects and uses an interface suitable for a search processing request from the client terminal VW1 or the mobile terminal VW2.

The client IF controller 14 is configured with a communication interface circuit that manages communication (transmission and reception) with each of the client terminal VW1, the mobile terminal VW2, and the video management server 40. The client IF controller 14 transmits search results sorted by the processor 11 to the client terminal VW1 or the mobile terminal VW2. The client IF controller 14 instructs the video management server 40 to distribute captured video data to the client terminal VW1 or the mobile terminal VW2 or record captured video data of each of the cameras C1 to C20. The client IF controller 14 transfers an alarm notification from the behavior detection server 70 to each terminal (specifically, the client terminal VW1 and the mobile terminal VW2). The client IF controller 14 may transfer an alarm notification from an analysis server other than the behavior detection server 70 (for example, the face authentication server 50, the people search server 60, the vehicle search server 80, and the LPR server 90) to each terminal (specifically, the client terminal VW1 and the mobile terminal VW2).

Figure 2:
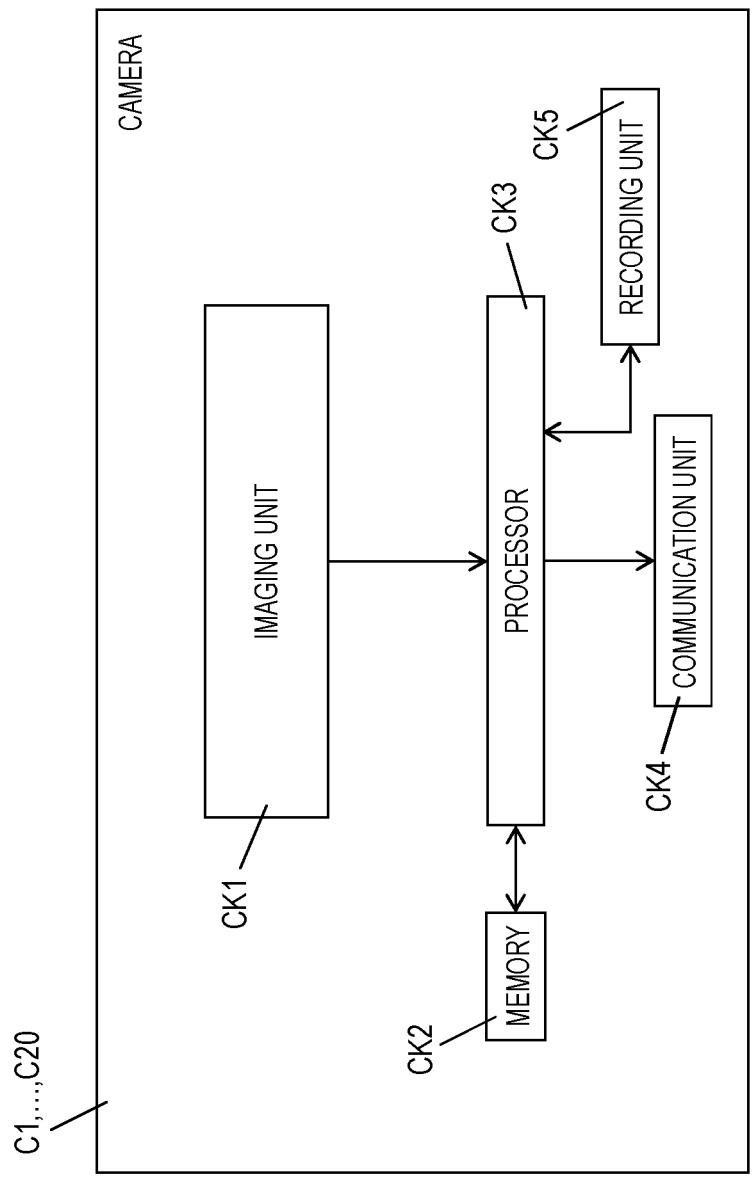
FIG. 2 is a block diagram showing a hardware configuration example of a camera provided in the investigation assistance system.

FIG. 2 is a block diagram showing a hardware configuration example of the cameras C1 to C20 provided in the investigation assistance system 1. Since the cameras C1 to C20 have the same configuration, the camera C1 will be described below as an example.

The camera C1 includes an imaging unit CK1, a memory CK2, a processor CK3, a communication unit CK4, and a recording unit CK5. For example, the camera C1 is installed (arranged) in various places on the street or in a building, and generates captured video data by imaging an imaging area in an angle of view. The camera C1 can detect an entire frame of various objects (for example, a people or a vehicle) related to an incident or the like by executing a video analysis on the captured video data.

The imaging unit CK1 includes a focusing lens and a solid-state imaging element such as a charge coupled device (CCD) image sensor or a complementary metal oxide semiconductor (CMOS) image sensor. When power of the camera C1 is turned on, the imaging unit CK1 constantly outputs captured video data of a subject obtained based on imaging by the solid-state imaging element to the processor CK3. The imaging unit CK1 may include a mechanism that changes a zoom magnification at the time of imaging.

The memory CK2 is configured with, for example, a random access memory (RAM) and a read only memory (ROM), and temporarily stores a program and data necessary for executing an operation of the camera C1, and further stores data or information generated during the operation. The RAM is, for example, a work memory used when the processor CK3 operates. The ROM stores, for example, a program and data for controlling the processor CK3 in advance. The memory CK2 stores, for example, identification information (for example, a serial number) of the camera C1 and various kinds of setting information.

The processor CK3 is configured with, for example, a central processing unit (CPU), a micro processing unit (MPU), a digital signal processor (DSP), or a field-programmable gate array (FPGA). The processor CK3 functions as a control unit of the camera C1, and executes a control processing for integrally controlling an operation of each unit of the camera C1, a data input and output processing to each unit of the camera C1, a data calculation processing, and a data storage processing. The processor CK3 operates in accordance with a program and data stored in the memory CK2. The processor CK3 acquires current time information by using the memory CK2 at the time of operation, executes various known image processing on video data captured by the imaging unit CK1, and records the captured video data in the recording unit CK5. Although not shown in FIG. 2, when the camera C1 includes a global navigation satellite system (GNSS) receiver, current position information may be acquired from the GNSS receiver, and the position information may be recorded in association with the captured video data.

Here, the GNSS receiver will be briefly described. The GNSS receiver receives satellite signals that each include a signal transmission time and position coordinates and that are transmitted from a plurality of GNSS transmitters (for example, four navigation satellites). The GNSS receiver calculates current position coordinates of a camera and reception times of the satellite signals using the plurality of satellite signals. Instead of the GNSS receiver, this calculation may be executed by the processor CK3 to which an output from the GNSS receiver is input. The reception time information may also be used to correct a system time of a camera. For example, the system time is used to record imaging time of a captured image in a captured video.

The processor CK3 may variably control an imaging condition (for example, a zoom magnification) of the imaging unit CK1 in accordance with an external control command received by the communication unit CK4. For example, when the external control command instructs the processor CK3 to change the zoom magnification, the processor CK3 changes, in accordance with the control command, the zoom magnification at the time of imaging by the imaging unit CK1 designated by the control command.

The processor CK3 may detect an object feature element (for example, a face of an occupant) of an object (for example, a vehicle) appearing in the captured video data by analyzing the captured video data. The processor CK3 generates face area information formed by coordinates indicating a position of an object feature element as an analysis result of the captured video data, and transmits the face area information to an analysis server (for example, the LPR server 90) via the communication unit CK4.

The communication unit CK4 transmits captured video data recorded in the recording unit 15 to the vehicle search server 80 and the video management server 40 via the network NW1 described above based on an instruction from a processor 12P. The communication unit CK4 receives a control command of the camera C1 transmitted from outside (for example, the vehicle search server 80), and transmits state information of the camera C1 to the outside (for example, the vehicle search server 80).

The recording unit CK5 is configured with an external storage medium such as a semiconductor memory (for example, a flash memory) incorporated in the camera C1 or a memory card (for example, an SD card) that is not incorporated in the camera C1. The recording unit 15 records the captured video data generated by the processor 12P in association with the identification information (an example of camera information) of the camera C1 and imaging date and time information. The recording unit 15 constantly pre-buffers and stores the captured video data for a predetermined time (for example, 30 seconds), and continues to store the captured video data for a predetermined time (for example, 30 seconds) from current time while writing the captured video data. When the recording unit 15 is configured with a memory card, the recording unit 15 is detachably attached to a housing of the camera C1.

Figure 3:
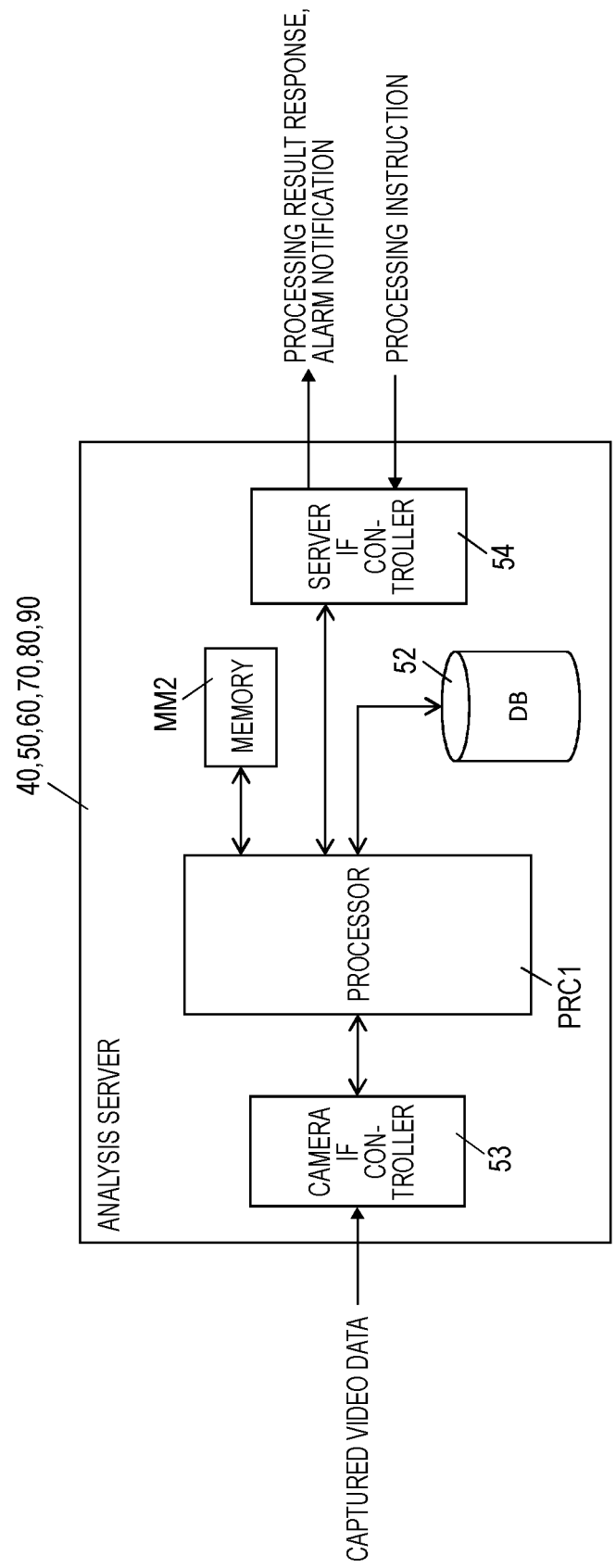
FIG. 3 is a block diagram showing a hardware configuration example of various analysis servers provided in the investigation assistance system.

FIG. 3 is a block diagram showing a hardware configuration example of various analysis servers provided in the investigation assistance system 1. Specifically, the various analysis servers are the video management server 40, the face authentication server 50, the people search server 60, the behavior detection server 70, the vehicle search server 80, and the LPR server 90. Therefore, the analysis server shown in FIG. 3 is used as a generic term for the video management server 40, the face authentication server 50, the people search server 60, the behavior detection server 70, the vehicle search server 80, and the LPR server 90. A hardware configuration common to each analysis server will be described in detail in FIG. 3, and a characteristic operation of each unit will be described in detail with reference to FIG. 1 or will be described later, and thus description thereof will be simplified here.

The analysis server in FIG. 3 is configured with, for example, a server computer machine, and specifically includes a processor PRC1, a memory MM2, a database 52, a camera IF controller 53, and a server IF controller 54. In particular, the face authentication server 50, the people search server 60, the behavior detection server 70, the vehicle search server 80, and the LPR server 90 are high-performance server computer machines equipped with artificial intelligence (AI), and can detect objects different from those of the other analysis servers by using an AT learned model.

The processor PRC1 is configured with, for example, a graphic processing unit (GPU) or an FPGA, functions as a control unit of the analysis server, and executes a control processing for integrally controlling an operation of each unit of the analysis server, a data input and output processing to each unit of the analysis server, a data calculation processing, and a data storage processing. The processor PRC1 operates in accordance with a program stored in the memory MM2. For example, the processor PRC1 of each analysis server (specifically, the face authentication server 50, the people search server 60, the behavior detection server 70, the vehicle search server 80, and the LPR server 90) can execute a learned model (AI) generated by machine learning so as to be suitable for a processing in a corresponding analysis server. Each analysis server outputs a processing result and a score (to be described later) indicating a similarity (reliability probability) of the processing result by executing a processing using the learned model.

For example, the face authentication server 50 uses a learned model for the face authentication server 50 to detect a face of a people appearing in captured video data of each of the cameras C1 to C20 and execute a collation processing on a face image included in a collation instruction from the AI integrated server 10 and the blacklist data of the database 52 (in other words, a collation list including one or more face images or face thumbnail images requested to be found). The face authentication server 50 outputs the face image or the face thumbnail image registered in the blacklist data and a score indicating a similarity of the face image or the face thumbnail image as a processing result of the people face detection.

For example, the people search server 60 uses a learned model for the people search server 60 to detect and extract people information (people attribute information) indicating a feature element such as a people appearing in the captured video data of each of the cameras C1 to C20, an appearance of the people or whether the people has personal belongings and execute a search processing of a people satisfying a search condition of a people included in a collation instruction from the AI integrated server 10 by referring to the database 62 (in other words, a whole body image of one or more persons requested to be found, a thumbnail image of the whole body of a people, or people attribute information). The people search server 60 outputs a whole body image of a people, a thumbnail image of the whole body of the people, people information (people attribute information), and a score indicating a similarity of the thumbnail image as a processing result of detection of the people and the people attribute information.

For example, the behavior detection server 70 uses a learned model for the behavior detection server 70 to detect whether there is a predetermined behavior caused by a people appearing in the captured video data of each of the cameras C1 to C20. The behavior detection server 70 outputs contents (a result) of the predetermined behavior determined to have a highest similarity, a thumbnail image indicating captured video data in which the behavior is detected, an imaging date and time, and camera identification information as a processing result of the behavior detection.

For example, the vehicle search server 80 uses a learned model for the vehicle search server 80 to detect and extract vehicle information (vehicle attribute information) indicating a feature element such as a vehicle appearing in the captured video data of each of the cameras C1 to C20, a vehicle type and a vehicle color of the vehicle and execute a search processing of a vehicle satisfying a search condition of a vehicle included in a collation instruction from the AI integrated server 10 by referring to the database 82 (in other words, the entire image of one or more vehicles requested to be found, a thumbnail image of an entire vehicle, or vehicle attribute information). The vehicle search server 80 outputs the entire image of the vehicle, the thumbnail image of the entire vehicle, the vehicle information (vehicle attribute information), and a score indicating a similarity of the thumbnail image as a processing result of the detection of the vehicle and the vehicle attribute information.

For example, the LPR server 90 uses a learned model for the LPR server 90 to detect and extract license number information of a license plate appearing in the captured video data of each of the cameras C1 to C20 and execute a collation processing on license number information included in a collation instruction from the AI integrated server 10 and license number list data of the database 92. The LPR server 90 outputs license number information registered in the license number list data, and a face image and personal information of a purchaser (owner) of a vehicle corresponding to the license number information as a processing result of the detection of the license number information.

The memory MM2 is configured with, for example, a RAM and a ROM, and temporarily stores a program necessary for executing an operation of an analysis server, and further stores data or information generated during the operation. The RAM is, for example, a work memory used during an operation of the processor PRC1. The ROM stores, for example, a program for controlling the processor PRC1 in advance.

The database 52 is configured with, for example, an HDD or an SSD, and stores data or information acquired or generated by the processor PRC1 of an analysis server. The data generated by the processor PRC1 is, for example, a face image collation processing result when the analysis server is the face authentication server 50, the people attribute information (see above description) obtained as a search processing result when the analysis server is the people search server 60, the vehicle attribute information (refer to the above description) obtained as a search processing result when the analysis server is the vehicle search server 80, and the license number information obtained as a search processing result when the analysis server is the LPR server 90.

The camera IF controller 53 includes a communication interface circuit that controls communication (transmission and reception) between the analysis server and each of the cameras C1 to C20. The camera IF controller 53 receives captured video data of each of the cameras C1 to C20 and outputs the captured video data to the processor PRC1.

The server IF controller 54 is configured with a communication interface circuit that controls communication (transmission and reception) between the analysis server and the AI integrated server 10. The server IF controller 54 receives a processing instruction from the AI integrated server 10 and responds (returns) a processing result of the processor PRC1 based on the processing instruction to the AI integrated server 10. The server IF controller 54 transmits an alarm notification (see above description) corresponding to an object detected by the processor PRC1 of each analysis server to the AI integrated server 10.

Figure 4:
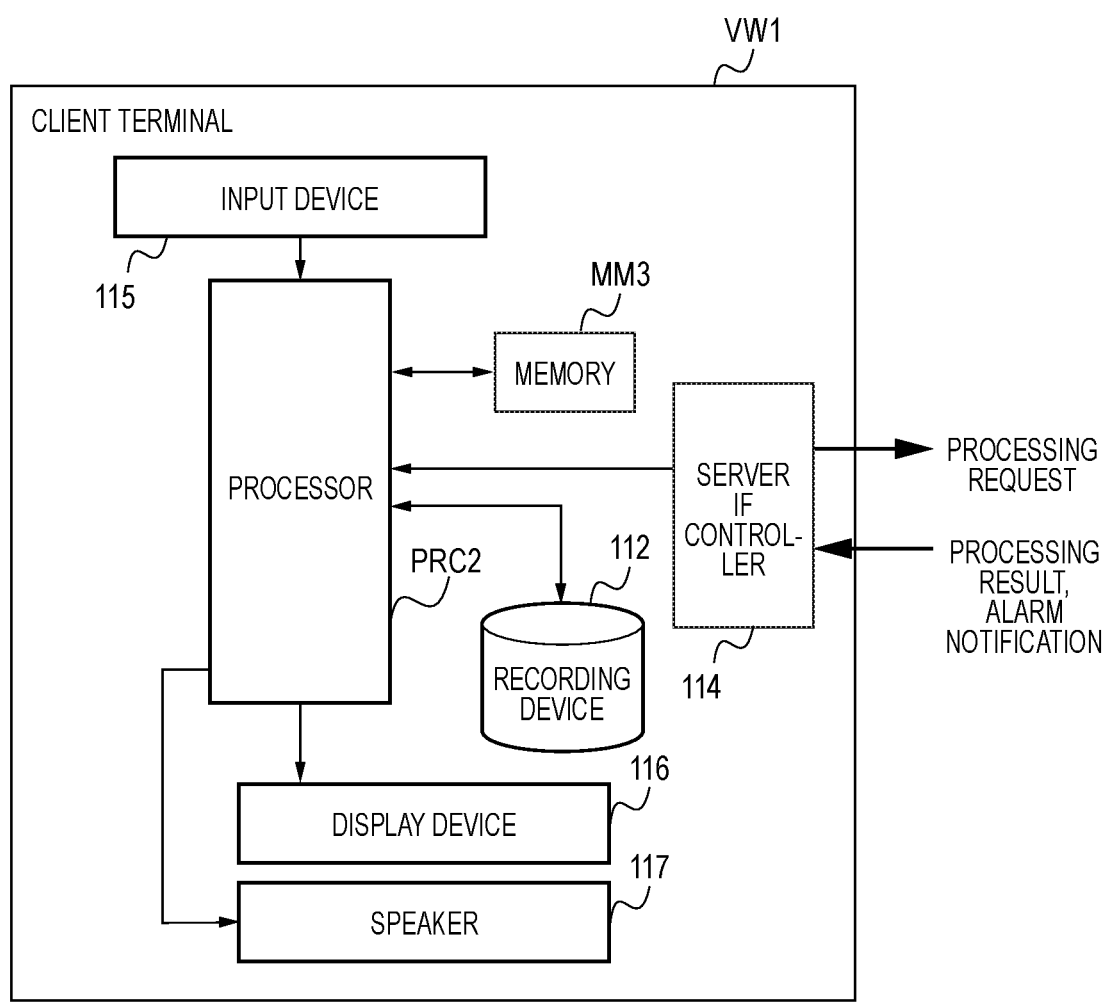
FIG. 4 is a block diagram showing a hardware configuration example of a client terminal and a mobile terminal provided in the investigation assistance system.

FIG. 4 is a block diagram showing a hardware configuration example of the client terminal VW1 and the mobile terminal VW2 provided in the investigation assistance system 1. The client terminal VW1 is shown in FIG. 4, only elements common to the hardware configuration of the client terminal VW1 and the mobile terminal VW2 are shown, and configurations specific to the client terminal VW1 or the mobile terminal VW2 are not shown. In FIG. 4, the hardware configuration will be described in detail by taking the client terminal VW1 as an example.

Specifically, the client terminal VW1 shown in FIG. 4 includes a processor PRC2, a memory MM3, a recording device 112, a server IF controller 114, an input device 115, a display device 116, and a speaker 117.

The processor PRC2 is configured with, for example, a central processing unit (CPU), a digital signal processor (DSP), or an FPGA, functions as a control unit of the client terminal VW1, and executes a control processing of integrally controlling an operation of each unit of the client terminal VW1, a data input and output processing to each unit of the client terminal VW1, a data calculation processing, and a data storage processing. The processor PRC2 operates in accordance with a program stored in the memory MM3.

The memory MM3 is configured with, for example, a RAM and a ROM, and temporarily stores a program necessary for executing an operation of the client terminal VW1 and further stores data or information generated during the operation. The RAM is, for example, a work memory used during an operation of the processor PRC2. The ROM stores, for example, a program for controlling the processor PRC2 in advance. The memory MM3 records road map information indicating positions where the cameras C1 to C20 are installed, and records updated road map information each time road map information is updated by, for example, new road construction, maintenance work, or the like.

The recording device 112 is configured with, for example, an HDD or an SSD, and stores data or information acquired or generated by the processor PRC2 of the client terminal VW1. The recording device 112 stores data of various search results transmitted from the AI integrated server 10.

The server IF controller 114 is configured with a communication interface circuit that controls communication (transmission and reception) between the client terminal VW1 and the AI integrated server 10. The server IF controller 114 transmits a search processing request generated by the processor PRC2 to the AI integrated server 10. The server IF controller 114 receives various search results (processing results) or alarm notifications (see above description) transmitted from the AI integrated server 10.

The input device 115 receives an operation of an operator (for example, a user of the client terminal VW1) in the police station or an operation of a police officer (for example, a user of the mobile terminal VW2) who is out at the site. The input device 115 includes, for example, a mouse, a keyboard, and a touch panel.

The display device 116 includes, for example, a liquid crystal display (LCD) or an organic electroluminescence (EL), and displays various kinds of data transmitted from the processor PRC2.

The speaker 117 acoustically outputs a sound when data (for example, video data included in a search result from the AI integrated server 10) is played back by the processor PRC2.

Figure 5:
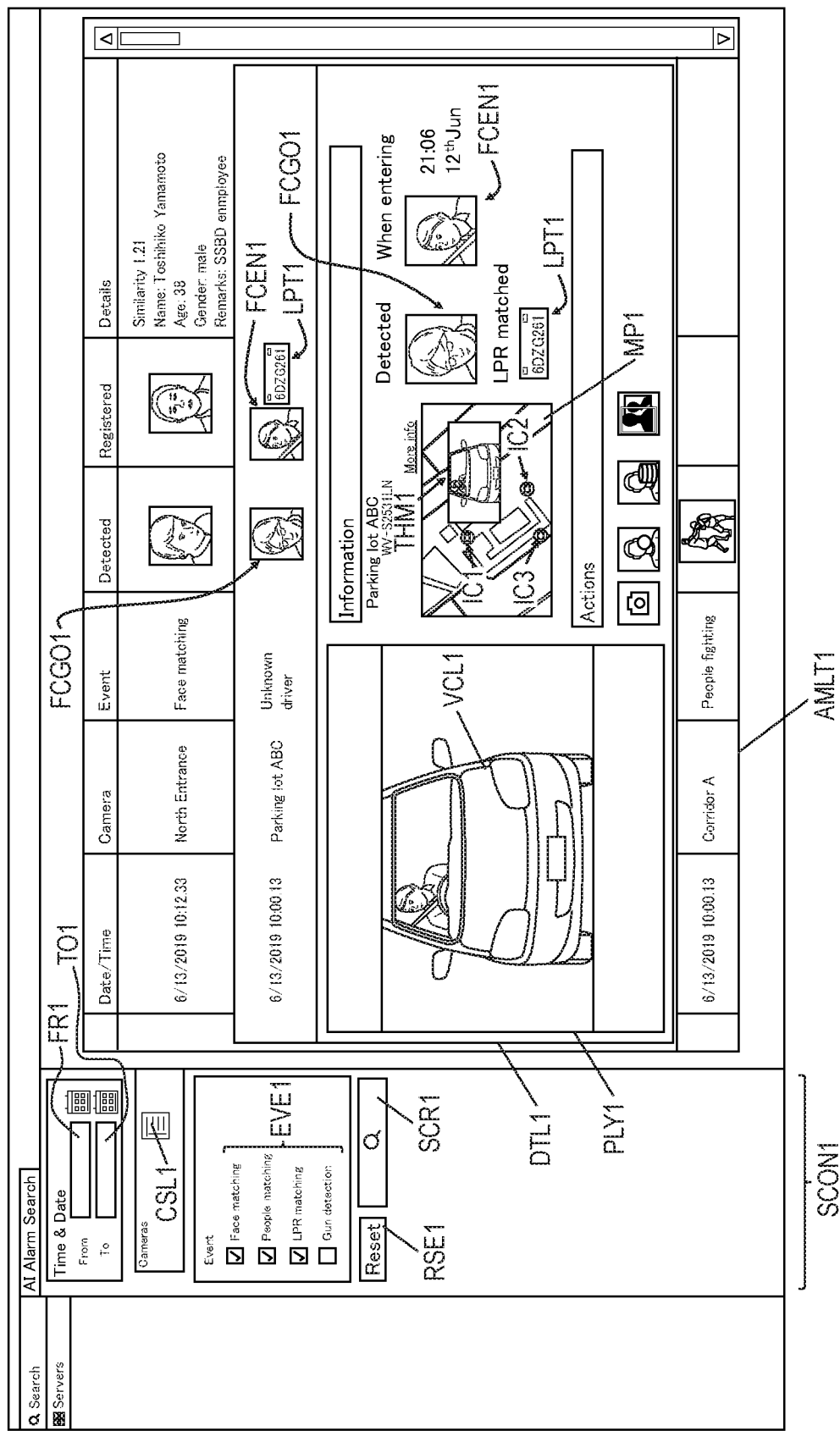
FIG. 5 is a diagram showing an example of an alarm notification screen.

Next, an example of a screen displayed on the display device 116 of the client terminal VW1 in a police investigation using the investigation assistance system 1 according to the first embodiment will be described with reference to FIG. 5. FIG. 5 is a diagram showing an example of an alarm notification screen. The alarm notification screen displayed in FIG. 5 may be displayed on the mobile terminal VW2. In order to keep consistency in description, the client terminal VW1 will be described as an example.

In a police investigation, the client terminal VW1 or the mobile terminal VW2 activates and executes an investigation assistance application (hereinafter, referred to as an "investigation assistance app") installed in advance by an operation of an operator or a police officer. The investigation assistance app is stored in, for example, the ROM of the memory MM3 of the client terminal VW1 or the mobile terminal VW2, and is executed by the processor PRC2 when the investigation assistance app is activated by an operation of an operator or a police officer. In other words, the investigation assistance app serving as an operation subject in the following description can be read as the processor PRC2. Data or information generated by the processor PRC2 during the activation of the investigation assistance app is temporarily stored in the RAM of the memory MM3.

In the first embodiment, in the client terminal VW1, when the investigation assistance app receives a notification of an event related to an incident or the like from the AI integrated server 10, the investigation assistance app displays an alarm notification screen WD1 shown in FIG. 5 on the display device 116.

The alarm notification screen WD1 shown in FIG. 5 includes a display area of an input field SCON1 of search conditions (for example, an object feature element (for example, people attribute information and vehicle attribute information)) of various objects (for example, a people and a vehicle) related to an incident and the like, and a display area of a list window AMLT1 of events related to an incident and the like transmitted from the AI integrated server 10. The input field SCON1 of search conditions is normally used by the investigation assistance app.

In the input field SCON1 of search conditions, display areas are provided so that a date and time when an object to be searched is detected, a camera, an event, a reset icon RSE1, and a search execution icon SCR1 can be input or selected.

A date and time start input field FR1 and a date and time end input field TO1 are provided in the display area of the time and date.

The date and time start input field FR1 is input by a user operation as a start date and time when video data to be searched for an object (for example, a people such as a suspect or a vehicle such as a vehicle for escape) is captured. For example, an occurrence date and time of an incident or the like or a date and time slightly before the occurrence date and time is input in the date and time start input field FR1. When an input is made by a user operation, the investigation assistance app sets a date and time input to the date and time start input field FR1 as a search condition (for example, a start date and time).

An end date and time is input in the date and time end input field TO1 by an operation of an operator as an end date and time when video data to be searched for an object (for example, a people such as a suspect or a vehicle such as a vehicle for escape) is captured. In the date and time end input field TO1, for example, a predetermined period (for example, a date and time slightly after an occurrence date and time of an incident or the like) from the date and time input in the date and time start input field is input. When a date and time is input by an operation of an operator, the investigation assistance app sets the date and time input to the date and time end input field TO1 as a search condition (for example, an end date and time).

A camera selection icon CSL1 for facilitating selection of a camera to be searched is arranged in the camera display area.

The camera selection icon CSL1 displays a list of cameras that capture video data to be searched for an object (for example, a people such as a suspect or a vehicle such as a vehicle for escape) and facilitates an operator to select a camera. When at least one camera is selected by an operation of an operator, the investigation assistance app sets camera identification information of the selected camera as a search condition.

A check box EVE1 indicating a type of an event to be displayed in the list window AMLT1 of the alarm notification screen WD1 is arranged in the event display area.

In the example of FIG. 5, three check boxes of "Face matching", "People fighting", and "LPR matching" are selected by an operation of an operator. "Face matching" indicates, for example, an event in which a face that is the same as or similar to a face registered in blacklist data (an example of a collation list) is detected based on a video analysis of captured video data (a live video) of a camera. "People fighting" indicates, for example, an event in which it is detected that two people are quarreling based on a video analysis of captured video data (a live video) of a camera. "LPR matching" indicates, for example, an event in which a vehicle having the same license number as a license number of license number information registered in the blacklist data (an example of the collation list) is detected based on a video analysis of captured video data (a live video) of a camera.

The reset icon RSE1 instructs resetting of a search condition input by an operation of an operator. For example, when the investigation assistance app detects that the reset icon RSE1 is pressed after a search condition is input by an operation of an operator, the investigation assistance app resets the input search condition (that is, deletes all search conditions and returns to an initial state).

The search execution icon SCR1 requests execution of a search that satisfies a search condition input by an operation of an operator. When the investigation assistance app detects that the search execution icon SCR1 is pressed after a search condition is input by an operation of an operator, for example, the investigation assistance app generates a search request satisfying the input search condition and transmits the search request to the AI integrated server 10.

The event list window AMLT1 displays, for each event, content data of a date and time (Date/Time) when an event is detected, a camera (Camera), an event (Event), a detected image (Detected), a registered image (Registered), and details (Details). In the example of FIG. 5, content data of each item described above is shown for the three events of "Face matching", "Unknown driver", and "People fighting". The content data of "Face matching" and "People fighting" is indicated in a default simplified style, and the content data of "Unknown driver" is indicated in a detailed style DTL1 by an operation of an operator.

For example, the event "Face matching" was detected based on a video analysis of captured video data of a camera (for example, the camera C1) arranged at a "North Entry" and the video data was captured at 10:12:33 a.m. Jun. 13, 2019. A "Detected" face image that is the same as or similar to a "Registered" face image was detected. For example, information such as similarity of the face image, name, age, gender, and memo of a people who is a target of the event "Face matching" is displayed in the "Details" field.

For example, the event "Unknown driver" was detected based on a video analysis of captured video data of a camera (see FIG. 2) arranged at a "Parking lot ABC" and the video data was captured at 10:00:13 am. Jun. 13, 2019. When the event is detected, license number information of a license plate LPT1 and a face image FCEN1 of an occupant (for example, a driver) are registered when a vehicle VCL1 enters the "parking lot ABC". When a face image FCGO1 of a different occupant (for example, a driver) in the vehicle VCL1 having the same license number information as the license number information at the time of entering the parking lot is detected at the time of leaving the "Parking lot ABC", the event "Unknown driver" is detected. The event "Unknown driver" may be an event belonging to a lower group of the event "LPR matching", and may be notified by the AI integrated server 10 when the "LPR matching" is designated by the check box EVE1.

The investigation assistance app displays content data of "Unknown driver" in the list window AMLT1 in a detailed style DTL1. Specifically, the investigation assistance app displays, in the list window AMLT1, that the face image FCEN1 of the occupant of the vehicle VCL1 having the license plate LPT1 when entering the parking lot ABC is registered at an entry time (09:06:00 p.m. Jun. 12, 2019). The investigation assistance app displays, in the list window AMLT1, a playback window PLY1 capable of playing back captured video data of a state when the vehicle VCL1 enters the parking lot ABC, and map data MP1 in which arrangement positions of a plurality of cameras including a camera (see FIG. 2) that images the entry of the vehicle VCL1 and a thumbnail image THM1 of the vehicle VCL1 are superimposed on each other. In the map data MP1, indicators IC1, IC2, and IC3 indicating arrangement positions of a plurality of cameras are displayed in an identifiable manner. The investigation assistance app displays in the list window AMLT1 that the investigation assistance app detects a different face image FCGO1 of an occupant of the vehicle VCL1 having the same license plate LPT1 as the license plate detected when the vehicle VCL1 leaves the "Parking lot ABC".

That is, the client terminal VW1 receives a notification of the event "Unknown driver" and displays the event "Unknown driver" in the list window AMLT1, the client terminal VW1 can notify an operator or a police officer that occupant face images are different while the license number information is the same between a case where the vehicle V1 enters the parking lot and a case where the vehicle V1 leaves the parking lot (in other words, occupants are changed during parking). Therefore, the operator or the police officer can know that a suspect of an incident or the like is no longer in the parking lot or appears suddenly according to an event notification from the AI integrated server 10, and investigation efficiency can be improved.

Figure 6:
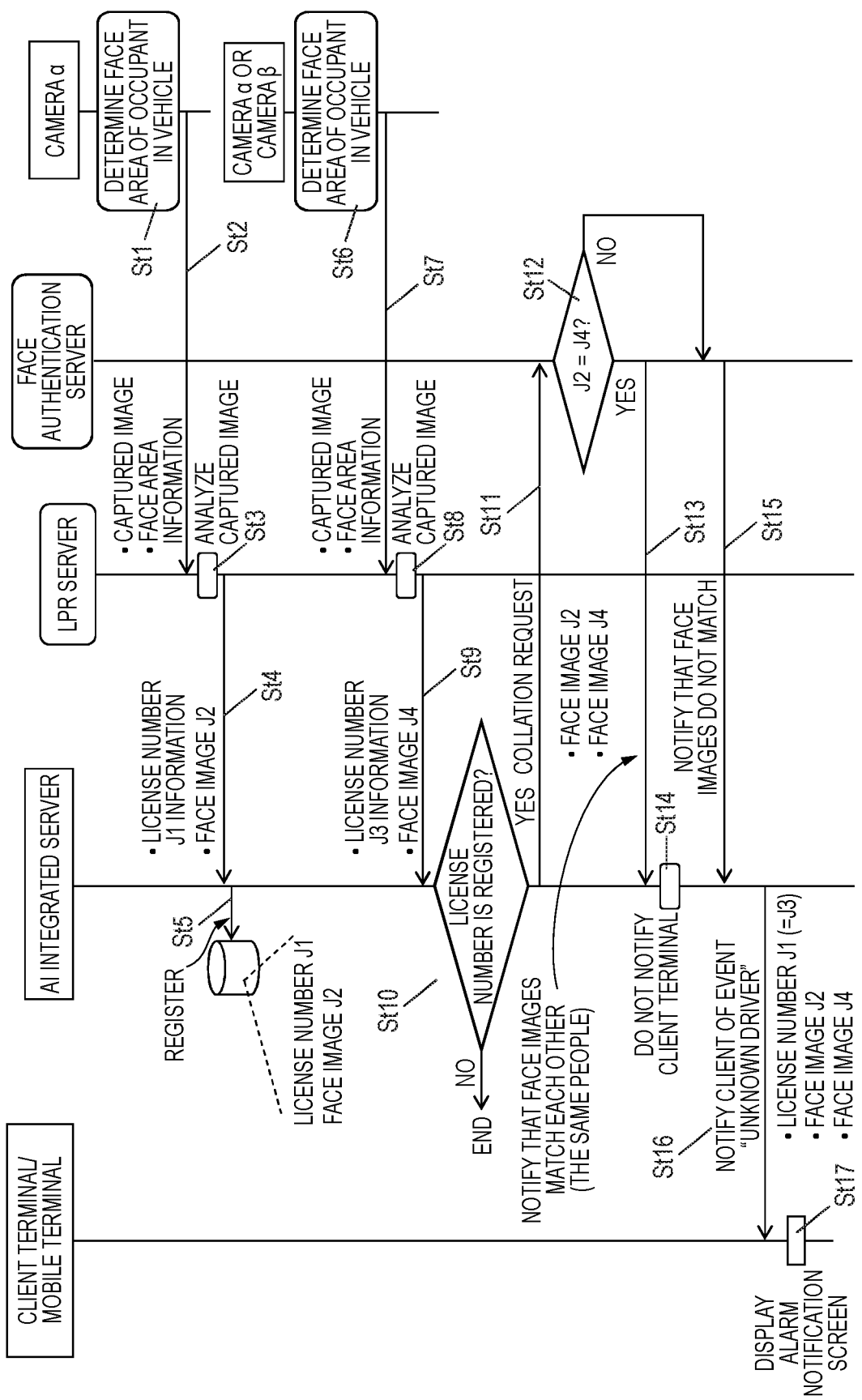
FIG. 6 is a sequence diagram showing an operation procedure example of an investigation assistance system according to a first embodiment.

Next, an operation procedure example of the investigation assistance system 1 according to the first embodiment will be described with reference to FIG. 6. FIG. 6 is a sequence diagram showing an operation procedure example of the investigation assistance system 1 according to the first embodiment. In FIG. 6, a flow of a processing of detecting the event "Unknown driver" and a processing of notifying the client terminal VW1 will be described in time series, a camera that detects entering of a vehicle into a parking lot is defined as a "camera α" (see FIG. 2), and a camera that detect leaving of a vehicle from the parking lot is defined as a "camera β" (see FIG. 2). The camera α and the camera β may be the same.

In FIG. 6, the camera α detects and determines a face area of an occupant of a vehicle that is about to enter a parking lot (for example, the "Parking lot ABC") by executing a video analysis on video data captured by the camera α (St1). The camera α transmits a pair of a captured image used for the detection in step St1 and face area information of an occupant to the LPR server 90 (St2). The LPR server 90 analyzes the captured image transmitted from the camera α in step St2 (St3), generates a face image by cutting out a face portion of the occupant appearing in the captured image, and transmits a pair of a face image J2 and vehicle license number J information to the AI integrated server 10 (St4). The AI integrated server 10 registers the pair of the face image 32 and the vehicle license number J1 information transmitted from the LPR server 90 in the database 12 in association with a time w % ben the camera α detects that the vehicle enters the parking lot (St5).

The camera β detects and determines a face area of an occupant of a vehicle that is about to leave a parking lot (for example, the "Parking lot ABC") by executing a video analysis on video data captured by the camera β (St6). The camera α and the camera β may be different from each other or may be the same. In a case where the camera α and the camera β are the same, the time in step St1 and the time in step St6 are different from each other. The camera β transmits a pair of a captured image used for the detection in step St6 and the face area information of the occupant to the LPR server 90 (St7). The LPR server 90 analyzes the captured image transmitted from the camera β in step St7 (St8), generates a face image by cutting out a face portion of the occupant appearing in the captured image, and transmits a pair of a face image J4 and vehicle license number J3 information to the AI integrated server 10 (St9). In order to simplify the description of FIG. 6, it is assumed that the license number J1 and the license number 33 are the same.

When the AI integrated server 10 receives the pair of the face image J4 and the vehicle license number J3 (=J1) information transmitted from the LPR server 90, the AI integrated server 10 determines whether the license number J3 (=J1) is registered in the database 12 (St10). When the AI integrated server 10 determines that the license number J3 (=J1) is not registered in the database 12 (St10, NO), the processing of the investigation assistance system 1 according to the first embodiment ends.

On the other hand, when the AI integrated server 10 determines that the license number J3 (=J1) is registered in the database 12 (St10, YES), the AI integrated server 10 reads the face image J2 corresponding to the license number J3 information from the database 12, generates a collation request including the face image J2 and the face image J4, and transmits the collation request to the face authentication server 50 (St11).

The face authentication server 50 determines whether the face image 32 and the face image J4 are the same or similar to each other in accordance with the collation request from the AI integrated server 10 (St12). When the face authentication server 50 determines that the face image J2 and the face image J4 are the same or similar to each other (St12, YES), the face authentication server 50 generates a report indicating that the face image J2 and the face image J4 match each other (in other words, the people of the face image J2 and the people of the face image J4 are the same people), and transmits the report to the AI integrated server 10 (St13). When the AI integrated server 10 receives the report from the face authentication server 50, the AI integrated server 10 determines that there is no need to notify the event "Unknown driver" because the event such as an incident does not occur according to the report, and does not notify the client terminal VW1 of the event "Unknown driver" (St14).

On the other hand, when the face authentication server 50 determines that the face image J2 and the face image J4 are not similar to each other (St12, NO), the face authentication server 50 generates a report indicating that the face image J2 and the face image J4 do not match each other (in other words, the people of the face image J2 and the people of the face image J4 are different people), and transmits the report to the AI integrated server 10 (St15). When the AI integrated server 10 receives the report from the face authentication server 50, the AI integrated server 10 determines that it is necessary to notify the event "Unknown driver" on an assumption that an event in which an occupant (for example, a driver) is changed during parking occurs according to the report, and notifies the client terminal VW1 of the event "Unknown driver" including the license number J1 (=J3) information, the face image J2, and the face image J4 (St16). The client terminal VW1 displays the alarm notification screen WD1 shown in FIG. 5 based on the notification transmitted from the AI integrated server 10 (St17).

As a background leading to the first embodiment, in view of recent circumstances in which a form of an incident or the like is diversified, it is not considered to search a suspect who caused the incident or the like or a vehicle for escape which is used for escape by the suspect in Patent Literature 1. In particular, in an investigation (in particular, an initial investigation) by an investigation institution such as the police, it is often required to quickly specify the suspect or the vehicle for escape in order to find the suspect at an early stage. However, even when the technique in Patent Literature 1 is used, there is a problem that it is difficult to find the suspect or the vehicle for escape at an early stage since it takes time and it is inefficient to confirm the suspect and specify the vehicle for escape by an investigator (for example, a police officer) manually watching videos of camera devices one by one. It is required to improve convenience by simplifying a user operation when a search condition is input.

Figure 7:
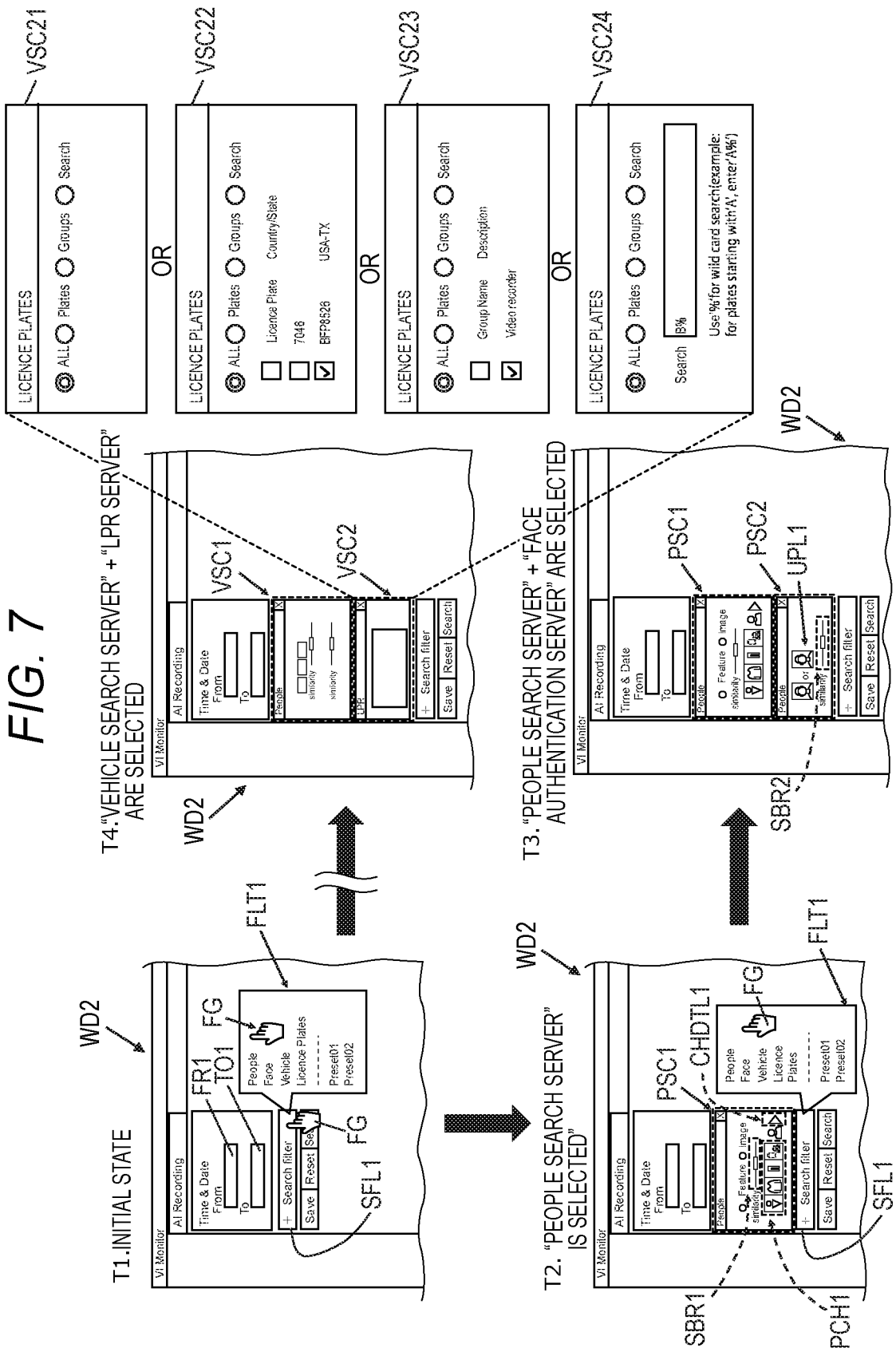
FIG. 7 is a diagram showing a display example of a part of a search condition input screen.

Therefore, in the investigation assistance system 1 according to the first embodiment, an example of a user interface (UI) for further simplifying a user operation at the time of searching a suspect or a vehicle for escape will be described with reference to FIG. 7. FIG. 7 is a diagram showing a display example of apart of a search condition input screen WD2. The investigation assistance app displays the search condition input screen WD2 on the display device 116 by an operation of a user (for example, an operator in a police station or a police officer at the site). Feature contents for further simplifying a user interface on the search condition input screen WD2 are extracted and shown in FIG. 7.

Display contents of the search condition input screen WD2 are changed by a user operation starting from an initial state (T1) to any one state of (T2) in which the people search server 60 is selected, (T3) in which the people search server 60 and the face authentication server 50 are selected, and (T4) in which the vehicle search server 80 and the LPR server 90 are selected.

The initial state (T1) of the search condition input screen WD2 includes a display area of an input field of a search condition (for example, an object feature element (for example, people attribute information or vehicle attribute information)) for various objects (for example, a people or a vehicle) related to an incident or the like. In the display area of the search condition input field, icons of date and time when an object to be searched is to be detected, search filter, save, reset, and search are arranged so that an item can be input or selected. In the description of FIG. 7, the same components as those in the description of FIG. 5 are denoted by the same reference numerals, description thereof will be simplified or omitted, and different contents will be described. In the initial state (T1), since a search condition has not been input yet, all of the icons of save, reset, and search on the search condition input screen WD2 are set such that the investigation assistance app cannot press any icons.

A search filter SFL1 displays a list of various objects related to an incident or the like that can be searched for from the client terminal VW1 in a sub-window FLT1, and facilitates a user selection operation. The list of various objects includes, for example, "People", "Face", "Vehicle", and "License Plates". In other words, the search filter SFL1 in FIG. 7 enables a user to designate a search for a people, a face, a vehicle, or a license plate by using a cursor that can be moved by a finger FG, a mouse, or the like.

When the investigation assistance app detects that "People" in the sub-window FLT1 of the search filter SFL1 is selected by a user operation (for example, the finger FG), the investigation assistance app displays, for example, a people search condition field PSC1 on the search condition input screen WD2 (see T2).

The investigation assistance app displays the search condition input screen WD2 in the state (T2) in which the people search server 60 is selected when the investigation assistance app detects that "People" is selected by a cursor (not shown) such as a finger FG or a mouse from the initial state (T1). When "People" is selected, for example, a people search condition field PSC1 indicating a search condition PCH1 used in a previous people search is displayed. Instead of the search condition used in a previous people search, a people search condition field PSC1 indicating a search condition newly input by a user operation may be displayed. The search condition PCH1 indicates, for example, all of four object feature elements "male", "yellow clothes", "black trousers", and "no possession". An adjustment bar SBR1 capable of adjusting a similarity of a search and a display icon CHDTL1 of a detailed search condition detail screen (see FIG. 12) of an object feature element (for example, an appearance feature element of a people) may be displayed in the people search condition field PSC1.

When the investigation assistance app detects that "Face" in the sub-window FLT1 of the search filter SFL1 is selected by a user operation (for example, a finger FG) after a search condition of a people search is input, the investigation assistance app displays, for example, a face search condition field PSC2 under the people search condition field PSC1 in the search condition input screen WD2 (see T3).

The investigation assistance app displays the search condition input screen WD2 in the state (T3) in which the people search server 60 and the face authentication server 50 are selected when the investigation assistance app detects that "Face" is selected by a cursor (not shown) such as a finger FG or a mouse from the state (T2) in which the people search server 60 is selected. When "Face" is selected, for example, the face search condition field PSC2 indicating an uploading icon UPL1 of a face image to be searched is displayed. An adjustment bar SBR2 capable of adjusting a similarity of a search may also be displayed in the face search condition field PSC2.

When the investigation assistance app detects that "Vehicle" in the sub-window FLT1 of the search filter SFL1 is selected by a user operation (for example, the finger FG) in the initial state (T1), the investigation assistance app displays, for example, a vehicle search condition field VSC1. Further, when the investigation assistance app detects that "License Plates" in the sub-window FLT1 of the search filter SFL1 is selected by a user operation (for example, the finger FG) after a search condition of a vehicle is input in the vehicle search condition field VSC1, the investigation assistance app displays, for example, a license plate search condition field VSC2.

The investigation assistance app displays the search condition input screen WD2 in the state (T4) in which the vehicle search server 80 and the LPR server 90 are selected when the investigation assistance app detects that "License Plates" is selected by a cursor (not shown) such as a finger FG or a mouse from the state in which the vehicle search server 80 is selected. When "Vehicle" is selected, for example, the vehicle search condition field VSC1 indicating a search condition used in a previous vehicle search is displayed. Instead of the search condition used in a previous vehicle search, the vehicle search condition field VSC1 indicating a search condition newly input by a user operation may be displayed. The search condition indicates, for example, all of four object feature elements "vehicle type=sedan", "vehicle type=van", "vehicle type=SUV", and "vehicle color=white". An adjustment bar capable of adjusting a similarity of a search may also be displayed in the vehicle search condition field VSC1.

When "License Plates" is selected, one of four types of license number search condition fields VSC21, VSC22, VSC23, and VSC24 shown in FIG. 7 is displayed. Each of the license number search condition fields VSC21, VSC22, VSC23, and VSC24 has four check boxes (specifically, "All", "Plates", "Groups", and "Search").

When all license numbers are set as search targets, the check box "All" is selected by a user operation in the license number search condition field VSC21. The investigation assistance app generates a search condition including all license numbers.

When a specific license number designated by a user operation is set as a search target, the check box "Plates" is selected by a user operation in the license number search condition field VSC22. Not only a specific license number can be designated, but also a country or a state of a license number can be designated. The investigation assistance app generates a search condition including, for example, a license number of "BFP8526".

When a license number of a specific group designated by a user operation is set as a search target, the check box "Groups" is selected by a user operation in the license number search condition field VSC23. The investigation assistance app generates a search condition including a license number of a vehicle appearing in, for example, "Video recorder" (that is, all the captured video data recorded in the video management server 40).

When any license number designated by a user operation is set as a search target, the check box "Search" is selected by a user operation in the license number search condition field VSC24. For example, the investigation assistance app generates a search condition including a license number of "B %" using a symbol "%" of a wild card (that is, a license number including "B").

Figure 8:
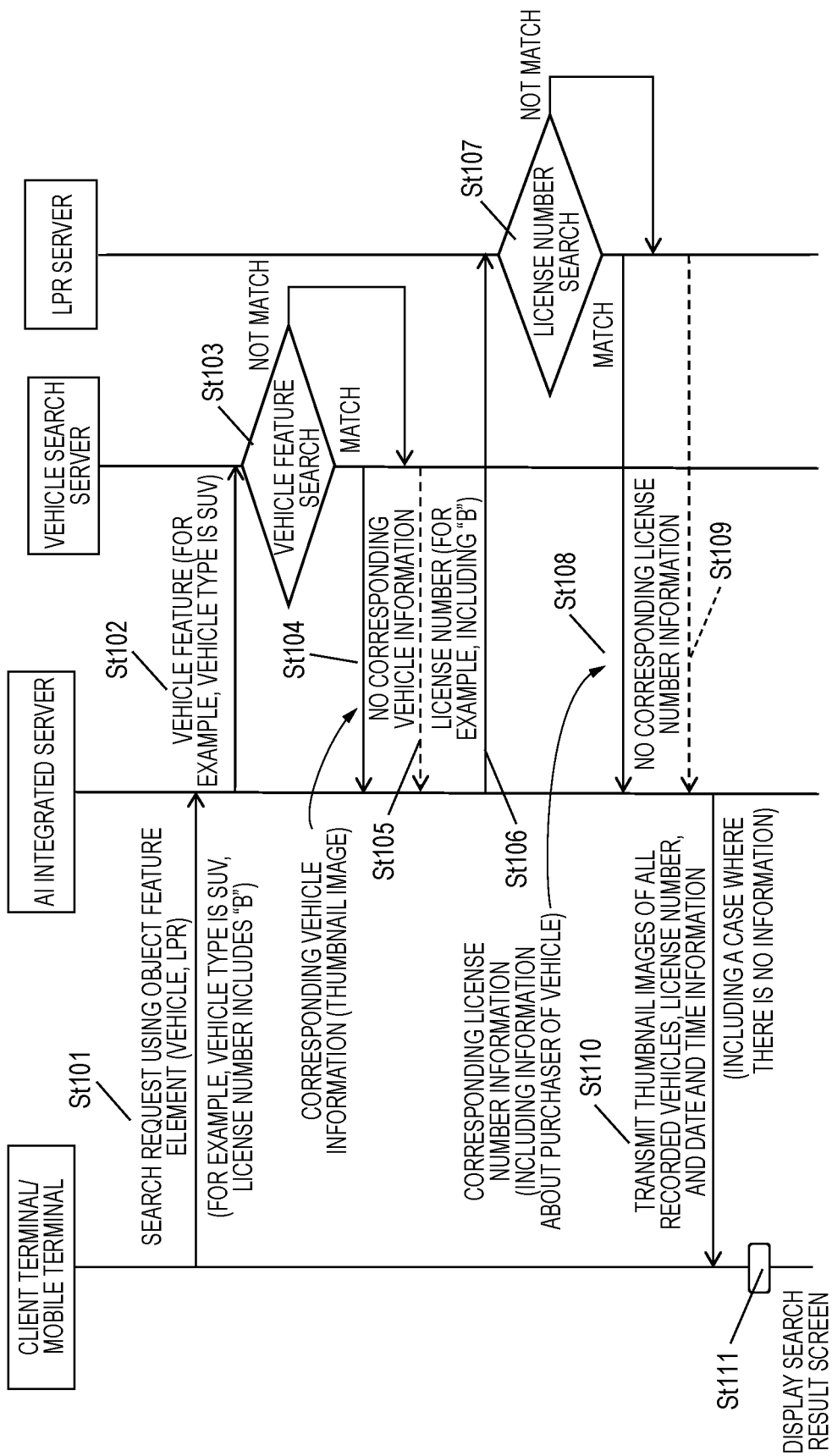
FIG. 8 is a sequence diagram showing another operation procedure example of the investigation assistance system according to the first embodiment.

Next, another operation procedure example of the investigation assistance system 1 according to the first embodiment will be described with reference to FIG. 8. FIG. 8 is a sequence diagram showing another operation procedure example of the investigation assistance system 1 according to the first embodiment. In FIG. 8, a flow of a processing of searching for a vehicle and a license number and a processing of notifying the client terminal VW1 will be described in time series. FIG. 8 shows an OR search in which a plurality of objects are individually searched in order to make the description easy to understand, but the present invention can also be applied to an AND search in which all of a plurality of objects are simultaneously satisfied.

In FIG. 8, the client terminal VW1 generates a search request for an OR search (see FIG. 7) including a vehicle search condition targeted for a vehicle and a license number search condition targeted for a license number by an operation of an operator, and transmits the search request to the AI integrated server 10 (St101). Here, the vehicle search condition indicates that, for example, a vehicle type of a vehicle is SUV (sports multipurpose vehicle). The license number search condition includes, for example, a character "B".

When the AI integrated server 10 receives the search request of the OR search from the client terminal VW1, the AI integrated server 10 first extracts the vehicle search condition from the search request transmitted in step St101 and transmits a search request of a vehicle satisfying the vehicle search condition to the vehicle search server 80 (St102).

Based on the search request from the AI integrated server 10, the vehicle search server 80 refers to the database 82 and executes a search processing for a vehicle that satisfies the vehicle search condition (St103). When the vehicle search server 80 extracts a vehicle that matches the feature of the vehicle search condition (St103, match), a processing result including a thumbnail image of the vehicle is returned to the AI integrated server 10 (St104). On the other hand, when the vehicle search server 80 cannot extract the vehicle that matches the feature of the vehicle search condition (No in St103), a processing result indicating that there is no corresponding vehicle information is returned to the AI integrated server 10 (St105).

Subsequent to the step St104 or the step St105, the AI integrated server 10 extracts a license number search condition from the search request transmitted in step St101, and transmits a search request for a license number satisfying the license number search condition to the LPR server 90 (St106).

Based on the search request from the AI integrated server 10, the LPR server 90 refers to the database 92 and executes a search processing for a license number that satisfies the license number search condition (St107). When the LPR server 90 extracts a license number that matches the feature of the license number search condition (St107, match), the LPR server 90 returns a processing result including a thumbnail image of the license number and information (see above description) about a purchaser of a vehicle corresponding to the license number to the AI integrated server 10 (St108). On the other hand, when the LPR server 90 cannot extract the license number that matches the feature of the license number search condition (No in St107), the LPR server 90 returns a processing result indicating that there is no corresponding license number information to the AI integrated server 10 (St109).

The AI integrated server 10 integrates (aggregates) the processing result of the vehicle search by the vehicle search server 80 and the processing result of the license number search by the LPR server 90 including a result indicating that there is no corresponding vehicle or corresponding license number, and returns the integrated result to the client terminal VW1 (St110). The client terminal VW1 generates a search result screen (not shown) indicating the search processing result returned in step St110 and displays the search result screen on the display device 116.

Although FIG. 8 shows an example of the OR search of the vehicle search and the license number search using the vehicle search condition and the license number search condition, the AI integrated server 10 executes an AND search of a people search and a vehicle search as follows. For example, the AI integrated server 10 sets the processing result of the vehicle search transmitted in step St104 as a population of a subsequent license number search, and causes the LPR server 90 to search for a processing result that satisfies the license number search condition in the processing result of the vehicle search.

As described above, in the investigation assistance system 1 according to the first embodiment, the analysis server and the AI integrated server 10 are communicably connected to each other. When the analysis server receives a first captured image in which a vehicle is captured at a first imaging timing, the analysis server analyzes a face of an occupant of the vehicle and a license plate of the vehicle, and transmits a first analysis result including the face image J2 of the occupant and the license number J1 information to the AI integrated server. The AI integrated server 10 registers the first analysis result in the database 12 in association with the first imaging timing. When the analysis server receives a second captured image in which a vehicle is captured at a second imaging timing, the analysis server analyzes a face of an occupant of the vehicle and a license plate of the vehicle, and transmits a second analysis result including the face image J4 of the occupant and the license number J3 information to the AI integrated server 10. When the AI integrated server 10 determines that the license number J1 information included in the first analysis result and the license number J3 information included in the second analysis result match each other and the face image J2 of the occupant included in the first analysis result and the face image J4 of the occupant included in the second analysis result are different from each other, the AI integrated server 10 transmits an alarm notification related to an incident or the like.

Accordingly, the investigation assistance system 1 can efficiently assist, at an early stage, specification of a suspect who caused an incident or the like or a vehicle for escape used by the suspect, and can improve convenience of an investigation by an investigation institution such as the police. Therefore, a user of the client terminal VW1 can notice that the face image of the occupant is different (in other words, the occupant is changed during parking) at different imaging timings (for example, when the vehicle enters a parking lot and when the vehicle leaves the parking lot) while the vehicle has the same license number information. Therefore, an operator or a police officer can know that a suspect of an incident or the like is no longer in a parking lot or appears suddenly according to an event notification from the AI integrated server 10, and investigation efficiency can be improved.

A camera that captures the first captured image at the first imaging timing is the same as a camera that captures the second captured image at the second imaging timing. Accordingly, since the cameras that capture the first captured image and the second captured image at different imaging timings are the same, for example, even in a small parking lot in which entering the parking lot and leaving the parking lot are monitored by the same camera, an operator or a police officer can easily know that an occupant such as a driver is changed (for example, a suspect of an incident or the like is no longer in the parking lot or appears suddenly).

Alternatively, the camera that captures the first captured image at the first imaging timing is different from the camera that captures the second captured image at the second imaging timing. Accordingly, since the cameras that capture the first captured image and the second captured image at different imaging timings are different from each other, for example, even in a medium or large parking lot in which entering the parking lot and leaving the parking lot are monitored by different cameras, an operator or a police officer can easily know that an occupant such as a driver is changed (for example, a suspect of an incident or the like is no longer in the parking lot or appears suddenly).

The investigation assistance system 1 further includes a user terminal that is communicably connected to the AI integrated server 10. Based on the alarm notification, the user terminal displays the alarm notification screen WD1 including at least the license number J1 information, the face image J2 of the occupant included in the first analysis result, and the face image J4 of the occupant included in the second analysis result. Accordingly, since a user of the client terminal VW or the mobile terminal VW2 can easily know the occurrence of an event related to an incident or the like such as "Unknown driver", for example, the user can know a site where a suspect that the user is tracking appears and go to the site quickly, and investigation efficiency is improved.

The user terminal displays the map data MP1 on which an arrangement position of the camera that captures the first captured image is superimposed on the alarm notification screen WD1. Accordingly, a user of the client terminal VW or the mobile terminal VW2 can quickly check, on the alarm notification screen WD1, the map data MP1 around a place where a suspect who is a tracking target appears and can quickly go to the site, or can easily predict a destination of a vehicle in which the suspect is riding.

The investigation assistance system 1 according to the first embodiment includes a user terminal and the AI integrated server 10 communicably connected to a plurality of analysis servers. The user terminal displays an analysis server selection screen (see the sub-window FLT1 of the search filter SFL1) showing a list of a plurality of analysis servers provided corresponding to a plurality of different object feature elements related to an incident or the like. The user terminal selects a first analysis server (for example, the people search server 60) from the analysis server selection screen. Based on an input of a search condition including an object feature element (for example, an appearance feature element of a people) of an object (for example, a people) searched by the selected first analysis server, the user terminal transmits a search request for an object satisfying the search condition to the AI integrated server 10. The AI integrated server 10 transmits a search instruction for an object to the first analysis server based on the search request, receives a search result from the first analysis server, and transmits the search result to the user terminal.

Accordingly, the investigation assistance system 1 can present, to the user terminal, a list of a plurality of analysis servers (for example, the face authentication server 50, the people search server 60, the vehicle search server 80, and the LPR server 90) capable of independently searching for object feature elements of a plurality of different objects. Therefore, it is possible to further simplify a user operation when a user of the client terminal VW1 or the mobile terminal VW2 (for example, an operator in a police station or a police officer who goes out to the site) searches for a suspect or a vehicle for escape.

After the user terminal selects the first analysis server, the user terminal selects a second analysis server from the analysis server selection screen. Based on an input of a search condition including an object feature element of an object that can be searched by the selected first analysis server and the selected second analysis server, the user terminal transmits a search request for an object satisfying the search condition to the AI integrated server 10. Based on the search request, the AI integrated server 10 transmits a search instruction for a corresponding object to each of the first analysis server and the second analysis server, receives a search result from each of the first analysis server and the second analysis server, and transmits the search result to the user terminal. Accordingly, the investigation assistance system 1 can easily input a search condition including an object feature element of an object corresponding to each of a plurality of analysis servers, and can further improve convenience for a user.

Background of Second Embodiment

In view of recent circumstances in which a form of an incident or the like is diversified, it is not considered to search a suspect who caused the incident or the like or a vehicle for escape which is used for escape by the suspect in Patent Literature 1. In particular, in an investigation (in particular, an initial investigation) by an investigation institution such as the police, it is often required to quickly specify the suspect or the vehicle for escape in order to find the suspect at an early stage. However, even when the technique in Patent Literature 1 is used, there is a problem that it is difficult to find the suspect or the vehicle for escape at an early stage since it takes time and it is inefficient to confirm the suspect and specify the vehicle for escape by an investigator (for example, a police officer) manually watching videos of camera devices one by one. When searching for a plurality of different objects related to an incident or the like, since an analysis server capable of searching for each object is not always in a communicable state, in a case where there is an analysis server in a non-communicable state, there may be a request to visualize the presence of the analysis server.

Second Embodiment

An example of an investigation assistance system will be described in the second embodiment. The investigation assistance system according to the second embodiment is provided with a user interface of a user-friendly search condition at the time of searching, efficiently assists, at an early stage, specification of a vehicle for escape used by a suspect who caused an incident or the like, and improves convenience of an investigation by an investigation institution such as the police. The configuration of the investigation assistance system according to the second embodiment is the same as the configuration of the investigation assistance system 1 according to the first embodiment, and thus description of the same contents will be omitted and different contents from the first embodiment will be described with the same reference numerals.

Figure 9:
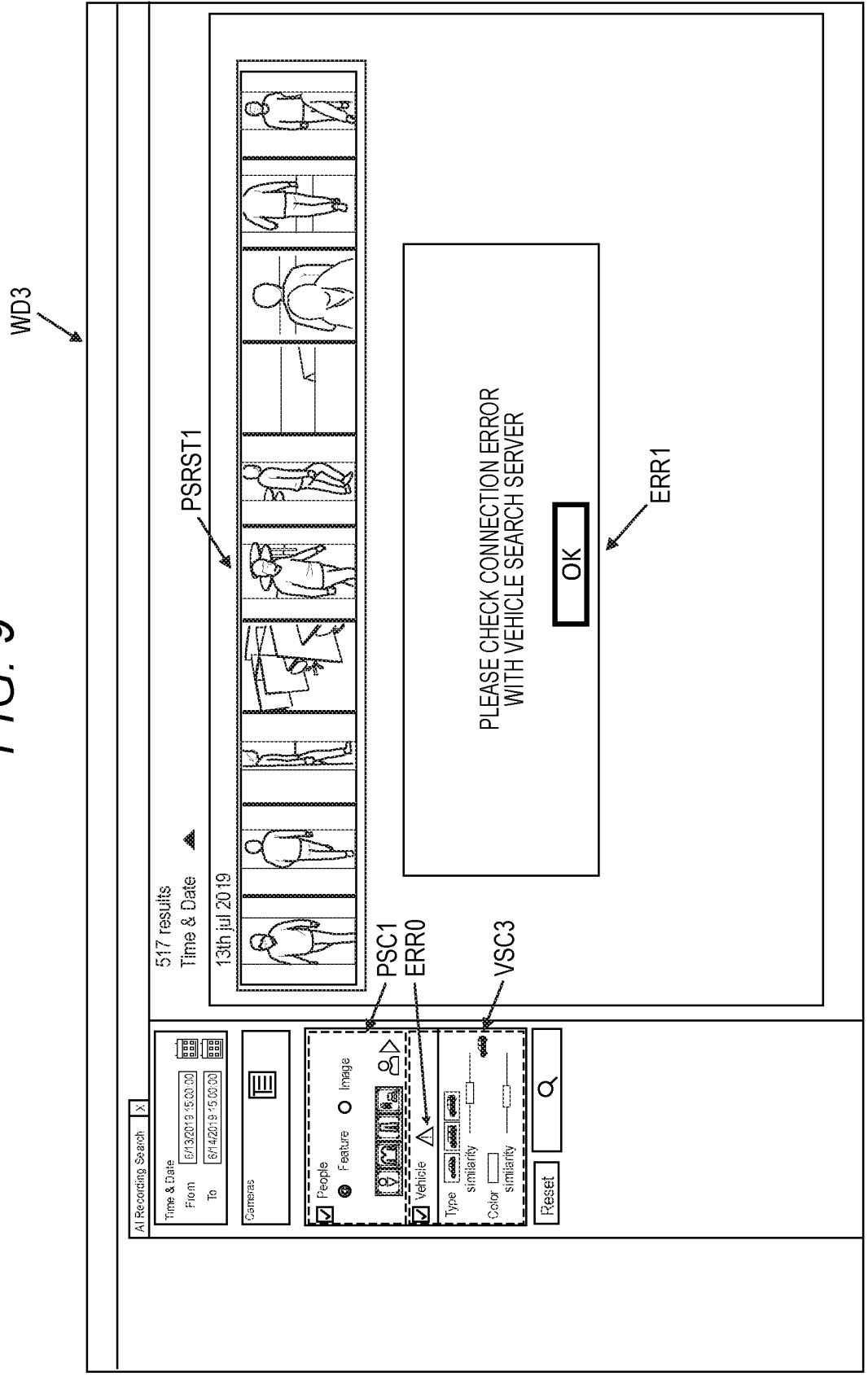
FIG. 9 is a diagram showing an example of a search result screen for notifying the occurrence of a connection error with a vehicle search server.

FIG. 9 is a diagram showing an example of a search result screen for notifying the occurrence of a connection error with the vehicle search server 80. For example, a date and time from 15:00:00 Jun. 13, 2019 to 15:00:00 Jun. 14, 2019 is input as a search condition on a search result screen WD3 in FIG. 9. When four object feature elements "male", "yellow clothes", "black trousers", and "no possession" are input as a search condition, the investigation assistance app displays the people search condition field PSC1 including these four object feature elements. Further, when four object feature elements "vehicle type=sedan", "vehicle type=van", "vehicle type=SUV", and "vehicle color=white" are input as a search condition, the investigation assistance app displays the vehicle search condition field VSC3 including these four object feature elements.

Details will be described with reference to FIG. 11, and it is assumed that a communication disconnection occurs between the AI integrated server 10 and the vehicle search server 80 after a search condition is transmitted from the client terminal VW1 (hereinafter, may be the mobile terminal VW2) to the AI integrated server 10. In this case, the investigation assistance app displays a communication error message ERR1 indicating a connection error with the vehicle search server 80 on the search result screen WD3, and displays, in the vehicle search condition field VSC3, a communication disconnection icon ERR0 indicating that a vehicle satisfying the search condition of the vehicle search condition field VSC3 cannot be searched.

On the other hand, when no communication disconnection occurs between the AI integrated server 10 and the people search server 60, a search result PSRST1 including the number of objects (for example, 517 objects) satisfying the search condition of the people search condition field PSC1 and a date and time when the objects are to be searched is transmitted from the people search server 60 to the AI integrated server 10. Therefore, the investigation assistance app also displays the search result PSRST1 on the search result screen WD3 in FIG. 9.

Figure 10:
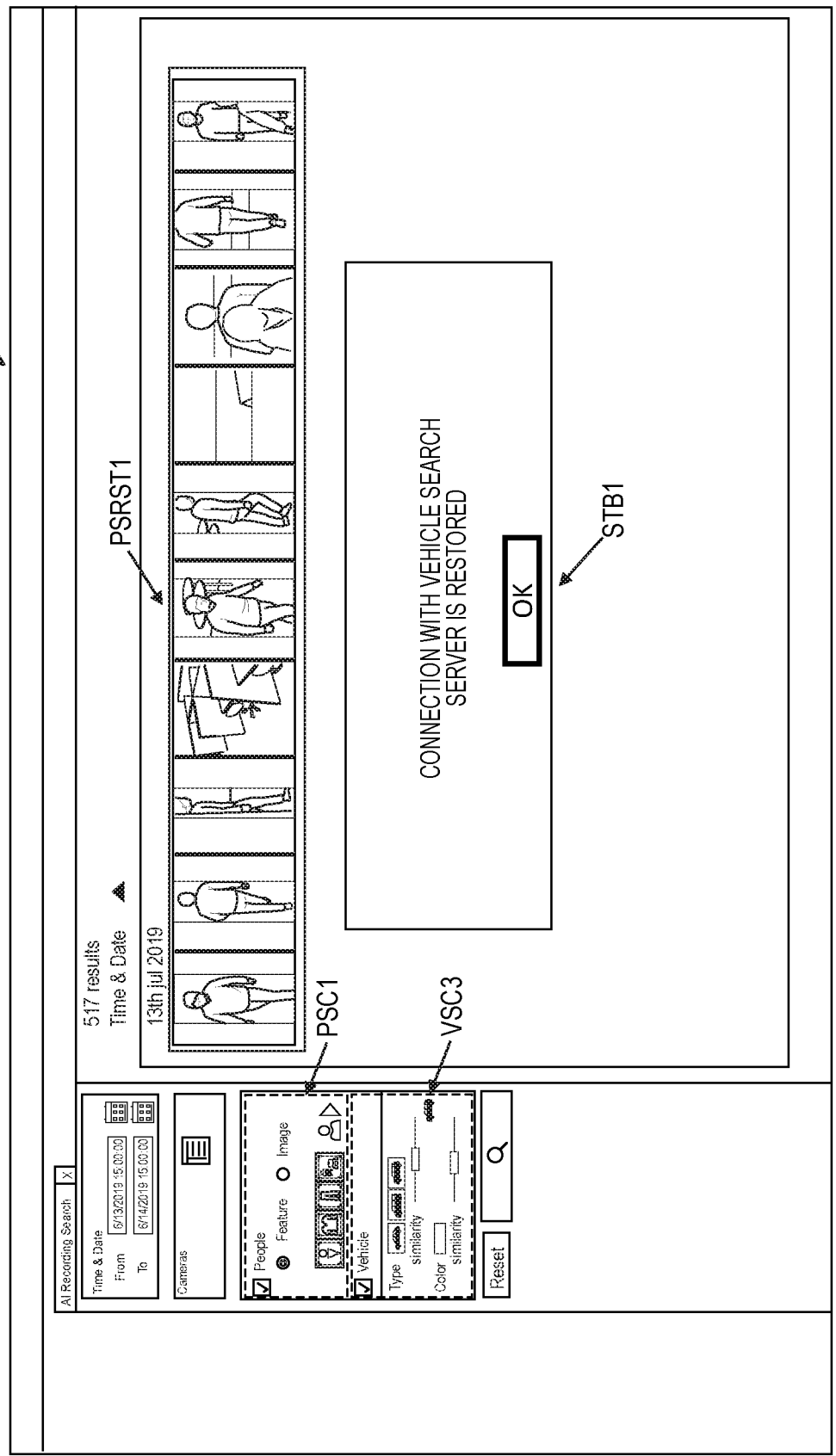
FIG. 10 is a diagram showing an example of a search result screen for notifying restoration of the connection with the vehicle search server.

FIG. 10 is a diagram showing an example of a search result screen for notifying the restoration of the connection with the vehicle search server 80. In the description of FIG. 10, description of the elements the same as the contents of FIG. 9 will be omitted, and different contents will be described.

Details will be described with reference to FIG. 11, and it is assumed that the AI integrated server 10 and the vehicle search server 80 are restored to a communicable state after the communication error message ERR1 shown in FIG. 9 is displayed on the search result screen WD3 of the client terminal VW1. In this case, the investigation assistance app displays a communication restoration message STB1 indicating that the connection with the vehicle search server 80 is restored on the search result screen WD3, and do not display the communication disconnection icon ERR0 in the vehicle search condition field VSC3 (in other words, the communication disconnection icon ERR0 is not displayed).

Next, an operation procedure example of the investigation assistance system 1 according to the second embodiment will be described with reference to FIG. 11. FIG. 1 is a sequence diagram showing an operation procedure example of the investigation assistance system 1 according to the second embodiment. A flow of a processing of instructing a search request from the AI integrated server 10 to each of the people search server 60 and the vehicle search server 80 when a search condition of an AND search that simultaneously satisfies both a search condition of the people search condition field PSC1 and a search condition of the vehicle search condition field VSC3 in FIG. 9 is input will be described in time series in FIG. 11.

Figure 11:
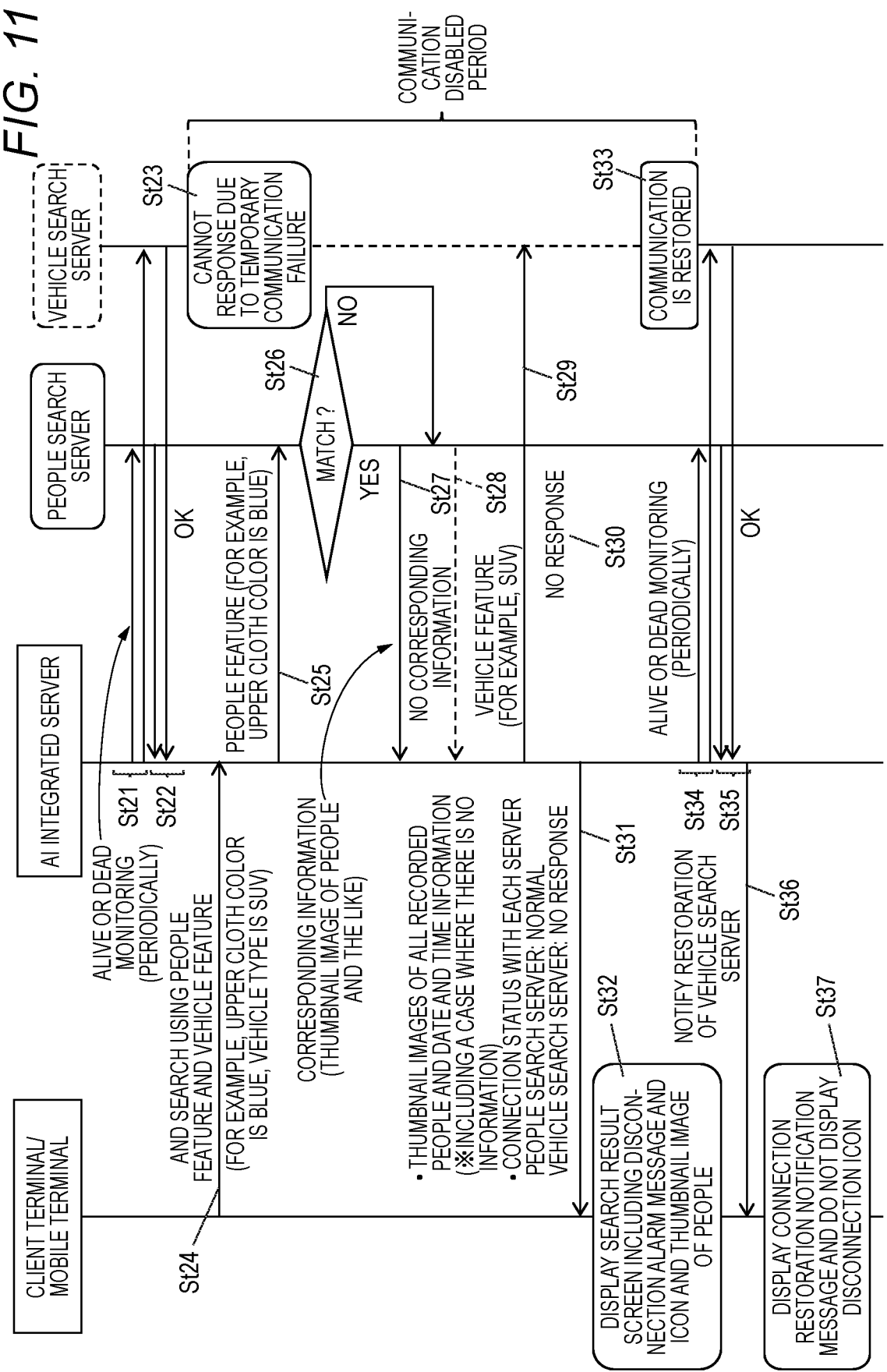
FIG. 11 is a sequence diagram showing an operation procedure example of an investigation assistance system according to a second embodiment.

In FIG. 11, the AI integrated server 10 periodically executes alive or dead monitoring with various analysis servers (for example, the face authentication server 50, the people search server 60, the vehicle search server 80, and the LPR server 90) (St21). The various analysis servers (for example, the face authentication server 50, the people search server 60, the vehicle search server 80, and the LPR server 90) transmit responses (in other words, messages indicating that a communication status is good) from the AI integrated server 10 (St22). For example, after step St22, it is assumed that a communication failure occurs between the AI integrated server 10 and the vehicle search server 80, and a communication disconnection occurs between the AI integrated server 10 and the vehicle search server 80 (St23). That is, at this time point, a communication disabled period between the AI integrated server 10 and the vehicle search server 80 starts.

The client terminal VW1 generates a search request for an AND search (see FIG. 9) including a people search condition targeted for a people and a vehicle search condition targeted for a vehicle by an operation of an operator, and transmits the search request to the AI integrated server 10 (St24). Here, for example, the people search condition is used to search for a people whose upper body is dressed in blue. For example, the vehicle search condition is used to search for a vehicle of which a vehicle type is SUV.

When the AI integrated server 10 receives the search request for the AND search from the client terminal VW1, the AI integrated server 10 first extracts a people search condition from the search request transmitted in step St24, and transmits a search request for a people satisfying the people search condition to the people search server 60 (St25).

Based on the search request from the AI integrated server 10, the people search server 60 refers to the database 62 and executes a processing of searching for a people satisfying the people search condition (St26). When the people search server 60 extracts a people matching the feature of the people search condition (St26, match), the people search server 60 returns a processing result including a thumbnail image of the people to the AI integrated server 10 (St27). On the other hand, when the people search server 60 cannot extract a people matching the feature of the people search condition (No in St26), the people search server 60 returns a processing result indicating that there is no corresponding people information to the AI integrated server 10 (St28).

Subsequent to step St27 or step St28, the AI integrated server 10 extracts a vehicle search condition from the search request transmitted in step St24 and transmits a search request for a vehicle satisfying the vehicle search condition to the vehicle search server 80 (St29). However, a time point in step St29 is in the communication disabled period between the AI integrated server 10 and the vehicle search server 80, and the AI integrated server 10 cannot receive any response from the vehicle search server 80 (St30). The AI integrated server 10 integrates (aggregates) a processing result of the people search by the people search server 60 (for example, a thumbnail image of a people and an imaging time) or a result indicating that there is no corresponding people and connection status data indicating a connection status with various analysis servers (for example, the people search server 60 and the vehicle search server 80), and returns the integrated result to the client terminal VW1 (St31).

The client terminal VW1 uses the processing result of the people search and the connection status data transmitted from the AI integrated server 10 in step St31 to display the search result screen WD3 including the communication error message ERR1 indicating communication disconnection with the vehicle search server 80, the communication disconnection icon ERR0, and the processing result of the people search on the display device 116 (St32).

Here, after step St32, it is assumed that the communication between the AI integrated server 10 and the vehicle search server 80 is restored (St33). That is, at this time point, the communication disabled period between the AI integrated server 10 and the vehicle search server 80 ends. Therefore, the AI integrated server 10 periodically executes alive or dead monitoring with various analysis servers (for example, the people search server 60 and the vehicle search server 80) (St34), and various analysis servers (for example, the face authentication server 50, the people search server 60, the vehicle search server 80, and the LPR server 90) can transmit a response (in other words, a message indicating that the communication status is good) from the AI integrated server 10 (St35).

When the AI integrated server 10 receives the processing result of step St35, the AI integrated server 10 transmits, to the client terminal VW1, a notification indicating that the communication (connection) with the vehicle search server 80 is restored (St36). Based on the notification transmitted from the AI integrated server 10 in step St36, the client terminal VW1 displays the communication restoration message STB1 on the search result screen WD3 instead of the communication error message ERR1 displayed at the time point of step St32, and does not display the communication disconnection icon ERR0 (St37).

As described above, the investigation assistance system 1 according to the second embodiment includes a user terminal and the AI integrated server 10 that is communicably connected to n (n is an integer of 2 or more) analysis servers (for example, the face authentication server 50, the people search server 60, the vehicle search server 80, and the LPR server 90). In the examples of FIGS. 9 to 11, n=4. The AI integrated server 10 periodically monitors a communication status between the AI integrated server 10 and each of the n analysis servers. When the AI integrated server 10 receives a search condition including k (k is any integer from 1 to n) different object feature elements from the user terminal, the AI integrated server 10 determines k analysis servers provided corresponding to the k object feature elements included in the search condition among the n analysis servers. In the examples of FIGS. 9 to 11, k=2. The AI integrated server 10 transmits a search request for an object to each of the k analysis servers. When the AI integrated server 10 detects that a communication disconnection with a specific analysis server among the k analysis servers occurs, the AI integrated server 10 transmits, to the user terminal, search results received from the (k−1) analysis servers and a communication disconnection notification (for example, the communication error message ERR1) indicating that a communication disconnection with the specific analysis server occurs. The user terminal displays the search result screen WD3 including the search results received from the (k−1) analysis servers and the communication disconnection notification.

Accordingly, the investigation assistance system 1 can efficiently assist, at an early stage, specification of a vehicle for escape used by a suspect who caused an incident or the like, and can improve convenience of an investigation by an investigation institution such as the police. In a case where the investigation assistance system 1 searches for a plurality of different objects related to an incident or the like by an operation of a user who uses the client terminal VW1, when there is an analysis server that cannot communicate with the AI integrated server 10, the investigation assistance system 1 can visualize the presence of the analysis server in the client terminal VW1 in an easily understandable manner for the user.

The user terminal displays the communication disconnection icon ERR0 indicating that a communication disconnection with a specific analysis server occurs on the search result screen WD3. As a result, even when the communication error message ERR1 is deleted (hidden) from the search result screen WD3 due to, for example, an erroneous operation, a user can easily confirm that a communication disconnection occurs by visually checking the communication disconnection icon ERR0 displayed on the search result screen WD3. It is more preferable that the communication disconnection icon ERR0 is an icon different for each type of analysis server, and specifically, it is more preferable that the communication disconnection icon ERR0 is an icon that visualizes the communication disconnection with a specific analysis server.

When the AI integrated server 10 detects that the communication with a specific analysis server is restored, the AI integrated server 10 transmits a restoration notification (for example, the communication restoration message STB1) indicating that the communication with the specific analysis server is restored to the user terminal. The user terminal displays the restoration notification transmitted from the AI integrated server 10 on the search result screen WD3. Accordingly, when the investigation assistance system 1 searches for a plurality of different objects related to an incident or the like by an operation of a user who uses the client terminal VW1, the investigation assistance system 1 can visualize, in the client terminal VW1, the fact that the communication between the AI integrated server 10 and a specific analysis server is restored from a non-communicable state to a communicable state in an easily understandable manner for the user.

When the user terminal receives the restoration notification from the AI integrated server 10, the user terminal does not display, on the search result screen WD3, the communication disconnection icon ERR0 indicating that a communication disconnection with a specific analysis server occurs before the user terminal receives the restoration notification from the AI integrated server 10. Accordingly, even when the communication restoration message STB1 is deleted (hidden) from the search result screen WD3 due to, for example, an erroneous operation, a user can easily confirm that there is no communication disconnection with a specific analysis server since the communication disconnection icon ERR0 displayed on the search result screen WD3 is not displayed.

Background of Third Embodiment

In view of recent circumstances in which a form of an incident or the like is diversified, it is not considered to search a suspect who caused the incident or the like or a vehicle for escape which is used for escape by the suspect in Patent Literature 1. In particular, in an investigation (in particular, an initial investigation) by an investigation institution such as the police, it is often required to quickly specify the suspect or the vehicle for escape in order to find the suspect at an early stage. However, even when the technique in Patent Literature 1 is used, there is a problem that it is difficult to find the suspect or the vehicle for escape at an early stage since it takes time and it is inefficient to confirm the suspect and specify the vehicle for escape by an investigator (for example, a police officer) manually watching videos of camera devices one by one. In particular, in order to avoid obtaining an unnecessary search result (so-called search noise) during a search, when the search can be executed after an unnecessary object feature element is input in advance, search efficiency may be improved.

Third Embodiment

An example of an investigation assistance system will be described in the third embodiment. The investigation assistance system according to the third embodiment executes an exclusion search that can exclude an unnecessary search result, efficiently assists, at an early stage, specification of a vehicle for escape used by a suspect who caused an incident or the like, and improves convenience of an investigation by an investigation institution such as the police. The configuration of the investigation assistance system according to the third embodiment is the same as the configuration of the investigation assistance system 1 according to the first embodiment, and thus description of the same contents will be omitted and different contents from the first embodiment will be described with the same reference numerals.

Figure 12:
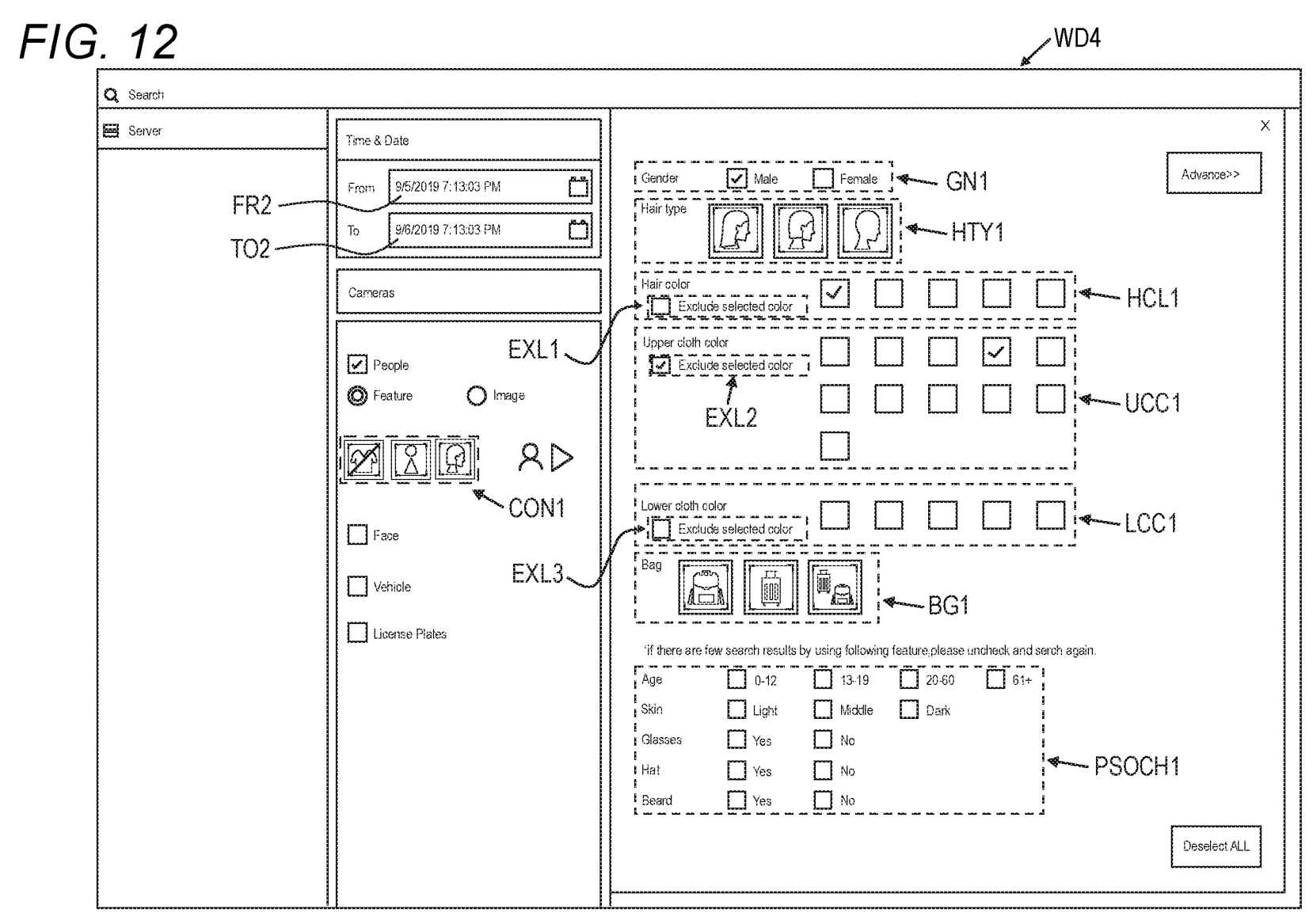

FIG. 12 is a diagram showing an example of a search condition detail screen according to the third embodiment. A search condition detail screen WD4 in FIG. 12 is a detail screen on which it is possible to select whether to include a plurality of different object feature elements (for example, appearance feature elements of a people) related to an object (for example, a people) as a search condition when searching for the object (for example, a people). The investigation assistance app displays the search condition detail screen WD4 on the display device 116 based on a user operation (for example, pressing of the display icon CHDTL1 in FIG. 7). The search condition detail screen WD4 includes a date and time input field display area for a date and time when an object to be searched is to be detected, a camera selection field display area, an object designation field display area for an object to be searched, and an object feature element designation field display area related to a designated object. In the example of FIG. 12, a people is designated by a user operation as an object to be searched.

A date and time is input by a user operation in the date and time start input field FR2 as a start date and time when video data to be searched for an object (for example, a people such as a suspect or a vehicle such as a vehicle for escape) is captured. For example, an occurrence date and time of an incident or the like or a date and time slightly before the occurrence date and time is input in the date and time start input field FR2. When an input is made by a user operation, the investigation assistance app sets a date and time (for example, 07:13:03 p.m. Sep. 5, 2019) input to the date and time start input field FR2 as a search condition (for example, a start date and time).

An end date and time is input in a date and time end input field TO2 by a user operation as an end date and time w % ben video data to be searched for an object (for example, a people such as a suspect or a vehicle such as a vehicle for escape) is captured. In the date and time end input field TO2, for example, a predetermined period (for example, a date and time slightly after an occurrence date and time of an incident or the like) from the date and time input in the date and time start input field is input. When an input is made by a user operation, the investigation assistance app sets a date and time (for example, 07:13:03 p.m. Sep. 6, 2019) input to the date and time end input field TO2 as a search condition (for example, an end date and time).

In the camera selection field, a camera selection icon for facilitating a user to select a camera to be searched is arranged.

In an object designation field OBDTL1, for example, four types of objects of People, Face. Vehicle, and License Plates are displayed and can be designated. In the example of FIG. 12, "People" is designated as an object by a user operation. The investigation assistance app can execute both a search satisfying one or more appearance feature elements (Feature) and a search for a people the same as or similar to a specific people image (Image) as a people search. Here, a search that satisfies an appearance feature element (Feature) is specified. In the object designation field OBDTL1, a designation result CON1 of an object feature element designated by a user operation in an object feature element designation field PSDTL1 is displayed.

The object feature element designation field PSDTL1 includes a gender designation field GN1, a hair type designation field HTY1, a hair color designation field HCL1, an upper cloth color designation field UCC1, a lower cloth color designation field LCC1, a possession designation field BG1, and another feature designation field PSOCH1.

In the gender designation field GN1, whether a people to be searched for is a male or a female is designated by a user operation.

In the hair type designation field HTY1, whether a hair type of a people to be searched for is long hair type, semi-long hair type, or other hair types is designated by a user operation.

In the hair color designation field HCL1, for example, at least one of five colors is designated as a hair color of a people to be searched for by a user operation. In addition, a hair color to be excluded from a search can also be designated, and a hair color exclusion field EXL1 is also provided. For example, when both yellow and the hair color exclusion field EXL1 are designated, the investigation assistance app sets a hair color that is not yellow as a people search condition.

In the upper cloth color designation field UCC1, for example, at least one of 11 colors is designated as an upper cloth color (that is, an upper cloth that covers an upper body) of a people to be searched by a user operation. An upper cloth color to be excluded from a search can also be designated, and a cloth color exclusion field EXL2 is provided. For example, when both white and the cloth color exclusion field EXL2 are designated, the investigation assistance app sets a cloth color that is not white as a people search condition.

In the lower cloth color designation field LCC1, for example, at least one of five colors is designated as a lower cloth color (that is, a lower cloth that covers a lower body) of a people to be searched by a user operation. A lower cloth color to be excluded from a search can also be designated, and a cloth color exclusion field EXL3 is provided. For example, when both blue and the cloth color exclusion field EXL3 are designated, the investigation assistance app sets a lower cloth color that is not blue as a people search condition.

In the possession designation field BG1, whether a people to be searched carries a rucksack, a carry case (or a suit case), or carries nothing is designated by a user operation.

In the other feature designation field PSOCH1, corresponding items are designated for age, skin, glasses, hat, and beard of a people to be searched by a user operation. The age may be designated as any one of 0 to 12 years old, 13 to 19 years old, 20 to 60 years old, and 61 years old or more. The skin may be designated as any one of bright, intermediate, and dark. The glasses may be designated as any one of wearing glasses and no glasses. The hat may be designated as any one of wearing a hat and no hat. The beard may be designated as any one of having beard and no beard.

Figure 13:
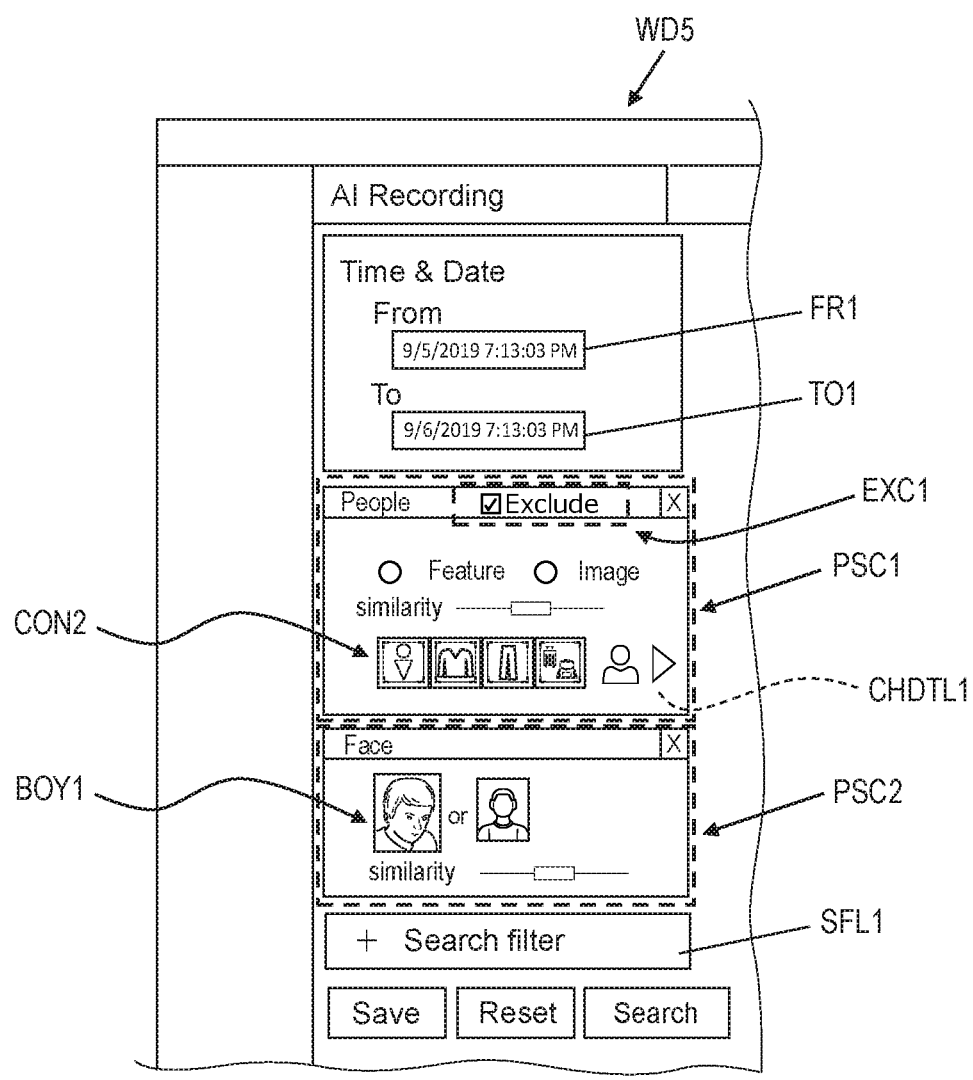
FIG. 13 is a diagram showing a display example of a part of a search condition input screen according to the third embodiment.

FIG. 13 is a diagram showing a display example of a part of a search condition input screen according to the third embodiment. The investigation assistance app displays a search condition input screen WD5 shown in FIG. 13 on the display device 116 according to an operation of a user (for example, an operator in a police station or a police officer at the site) during an AND search in which a plurality of objects (for example, faces and people) are simultaneously satisfied. Apart of an input of a search condition on the search condition input screen WD5 is extracted and shown in FIG. 13. In the description of FIG. 13, the same elements as those in FIG. 7 are denoted by the same reference numerals, description thereof will be simplified or omitted, and different contents will be described.

On the search condition input screen WD5 shown in FIG. 13, a search exclusion icon EXC1 and a designation result CON2 of a search condition designated by a user operation according to a search condition detail screen (for example, see FIG. 12) displayed by pressing the display icon CHDTL1 are displayed in the people search condition field PSC1. The designation result CON2 indicates, for example, four object feature elements "male", "white clothes", "black trousers", and "no possession". Since the search exclusion icon EXC1 is selected by a user operation, the investigation assistance app sets object feature elements for a people search to "male", "cloth color other than white", "trousers color other than black", and "no possession" as a search condition. When the search exclusion icon EXC1 is selected, a color other than a designated color can be designated for three object feature elements of a hair color for which the hair color exclusion field EXL1 is provided, an upper cloth color for which the cloth color exclusion field EXL2 is provided, and a lower cloth color for which the cloth color exclusion field EXL3 is provided. A face image BOY1 of a specific people is uploaded (pasted) in a face search condition field PSC2. Therefore, the investigation assistance application generates a search request for searching for a people having a face the same as or similar to the face image BOY1 of the specific people and satisfying "male", "cloth color other than white", "trousers color other than black", and "no possession" (in other words, a male who does not wear a uniform) through the search condition input screen WD5 shown in FIG. 13, and transmits the search request to the AI integrated server 10. The search request also includes data of the face image BOY1 of the specific people.

Figure 14:
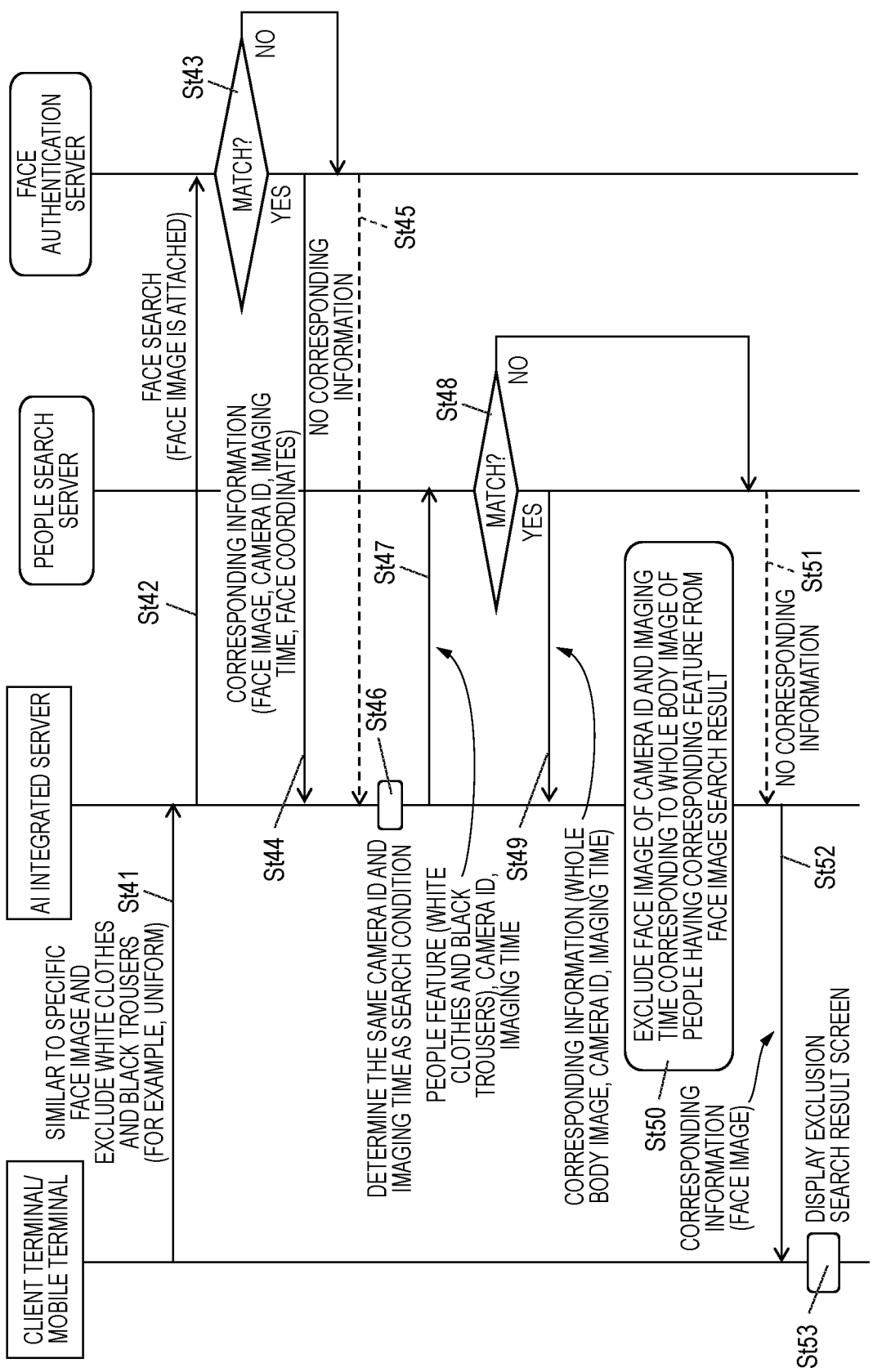
FIG. 14 is a sequence diagram showing an operation procedure example of an investigation assistance system according to the third embodiment.

Next, an operation procedure example of the investigation assistance system 1 according to the third embodiment will be described with reference to FIG. 14. FIG. 14 is a sequence diagram showing an operation procedure example of the investigation assistance system 1 according to the third embodiment. In FIG. 14, a flow of a search processing using a search condition designated on the search condition input screen WD5 shown in FIG. 13 will be described in time series.

In FIG. 14, the client terminal VW1 generates a search request for searching for a people having a face the same as or similar to a face image of a specific people and satisfying "male", "cloth color other than white", "trousers color other than black", and "no possession", and transmits the search request to the AI integrated server 10 (St41).

The AI integrated server 10 transfers the search request transmitted in step St41 to the face authentication server 50 in a state in which the face image of the specific people is attached (St42). In accordance with the search request transmitted in step St42, the face authentication server 50 refers to the database 52 and determines whether there is a face image of a people that is the same as or similar to the face image of the specific people (St43). When the face authentication server 50 determines that there is a face image of a people that is the same as or similar to the face image of the specific people (St43, YES), the face authentication server 50 transmits, to the AI integrated server 10, corresponding information (a search result) including the corresponding face image, camera identification information (for example, a camera ID) of a camera that captures the face image, an imaging time when the face image is captured, and face coordinates that specify a position of a face in the face image (St44). When it is determined that there is no face image of a people the same as or similar to the face image of the specific people (St43, NO), the face authentication server 50 transmits a report indicating that there is no corresponding information (search result) described above to the AI integrated server 10 (St45).

In order to execute an AND search that simultaneously satisfies a plurality of objects (for example, a face and a people), the AI integrated server 10 determines to use the camera ID and the imaging time in the corresponding information (search result) transmitted in step St44 as a search condition of a subsequent people search (St46).

Next, the AI integrated server 10 generates a search request including the camera ID and the imaging time determined in step St46 and the four object feature elements "male", "white clothes", "black trousers", and "no possession", and transmits the search request to the people search server 60 (St47). In accordance with the search request transmitted in step St47, the people search server 60 refers to the database 62 to determine whether there is a people who satisfies the four object feature elements "male", "white clothes", "black trousers", and "no possession" (St48). When the people search server 60 determines that there is a corresponding people (St48, YES), the people search server 60 transmits corresponding information (a search result) including a whole body image of the corresponding people, camera identification information (for example, a camera ID) of a camera that captures the whole body image, and imaging time w % ben the whole body image is captured to the AI integrated server 10 (St49).

The AI integrated server 10 excludes, from the search result (that is, a face image search result) transmitted in step St44, a face image search result in which the camera ID and the imaging time corresponding to the whole body image of the people included in the search result (that is, the people search result) transmitted in step St49 are the same in the search result (that is, the face image search result) transmitted in step St44 (St50). Accordingly, the AI integrated server 10 can efficiently extract a search result (that is, an exclusion search result described with reference to FIG. 13) of a people satisfying "male", "clothes color other than white", "trousers color other than black", and "no possession" while the people has the same or similar face as the face image of the specific people.

On the other hand, when it is determined that there is no corresponding people (St48. NO), the people search server 60 transmits a report indicating that there is no corresponding information (search result) to the AI integrated server 10 (St51). The AI integrated server 10 transmits the search result (including the corresponding face image, the camera ID, and the imaging time) extracted in step St50 to the client terminal VW1 (St52). The client terminal VW1 displays an exclusion search result screen (not shown) including the search result (see above description) transmitted in step St52 on the display device 116 (St53).

As described above, the investigation assistance system 1 according to the third embodiment includes a user terminal and the AI integrated server 10 that is communicably connected to at least a first analysis server (for example, the face authentication server 50) and a second analysis server (for example, the people search server 60). When the AI integrated server 10 receives, from the user terminal, a search condition including a first object feature element (for example, a face image of a specific people) related to an incident or the like and a second object feature element (for example, an appearance feature element of a people) related to an incident or the like that is a search exclusion target, the AI integrated server 10 transmits a search request for a corresponding object satisfying the first object feature element to the face authentication server 50 and transmits a search request for a corresponding object satisfying the second object feature element to the people search server 60. The AI integrated server 10 receives a first search result including the object satisfying the first object feature element from the face authentication server 50 and receives a second search result including the object satisfying the second object feature element from the people search server 60. The AI integrated server 10 transmits a third search result obtained by excluding the second search result from the first search result to the user terminal. The user terminal displays a search result screen including the third search result transmitted from the AI integrated server 10.

Accordingly, the investigation assistance system 1 can efficiently assist, at an early stage, specification of a vehicle for escape used by a suspect who caused an incident or the like, and can improve convenience of an investigation by an investigation institution such as the police. Since the investigation assistance system 1 can designate an object feature element that is unnecessary for a search for each object (for example, a people or a vehicle) by a user operation, it is possible to exclude an unnecessary search result (so-called search noise) when searching for an object requested by a user, and accuracy of an object search is improved.

The first search result includes camera identification information of a camera that images an object satisfying the first object feature element, and imaging time information. The second search result includes camera identification information of a camera that images an object satisfying the second object feature element, and imaging time information. The AI integrated server 10 extracts the third search result based on the second search result in which the camera identification information and the imaging time information included in each of the first search result and the second search result are the same. Accordingly, since the second search result having the shared camera ID and imaging time corresponds to an object designated as an exclusion target by a user operation, the AI integrated server 10 can efficiently and easily extract an exclusion search result by excluding (that is, removing) the second search result from the first search result.

The user terminal transmits, to the AI integrated server 10, an exclusion search condition in which some object feature elements constituting the first object feature element or the second object feature element are designated as search exclusion targets. The AI integrated server 10 transmits a search request for an object satisfying the exclusion search condition to the first analysis server (for example, the face authentication server 50) or the second analysis server (for example, the people search server 60). The AI integrated server 10 receives a search result from the first analysis server or the second analysis server and transmits the search result to the user terminal. Accordingly, a user can designate some object feature elements as search exclusion targets on the search condition detail screen WD4 in which an object feature element of one object can be designated in detail, can designate a complicated search condition, and can achieve a variation of a search.

Background of Fourth Embodiment

In view of recent circumstances in which a form of an incident or the like is diversified, it is not considered to notify an external terminal or the like of a suspect who caused the incident or the like or a vehicle for escape which is used for escape by the suspect in Patent Literature 1. In particular, in an investigation (in particular, an initial investigation) by an investigation institution such as the police, it is often required to quickly specify the suspect or the vehicle for escape in order to find the suspect at an early stage. However, even when the technique in Patent Literature 1 is used, there is a problem that it is difficult to find the suspect or the vehicle for escape at an early stage since it takes time and it is inefficient to confirm the suspect and specify the vehicle for escape by an investigator (for example, a police officer) manually watching videos of camera devices one by one. In particular, in a case where an investigation range is wide, when an object feature element of a suspect or a vehicle for escape related to an incident or the like is registered as a collation list in advance and a people or a vehicle matching the collation list is detected, it is likely that the people or the vehicle is a suspect or a vehicle for escape and it is expected to make a progress in the investigation.

Fourth Embodiment

An example of an investigation assistance system will be described in the fourth embodiment. The investigation assistance system according to the fourth embodiment notifies the detection of an event indicating that there is a suspect related to an incident or the like or a vehicle for escape even in a wide investigation area, efficiently assists, at an early stage, specification of the vehicle for escape used by the suspect who caused the incident or the like, and improves convenience of an investigation by an investigation institution such as the police. The configuration of the investigation assistance system according to the fourth embodiment is the same as the configuration of the investigation assistance system 1 according to the first embodiment, and thus description of the same contents will be omitted and different contents from the first embodiment will be described with the same reference numerals.

Figure 15:
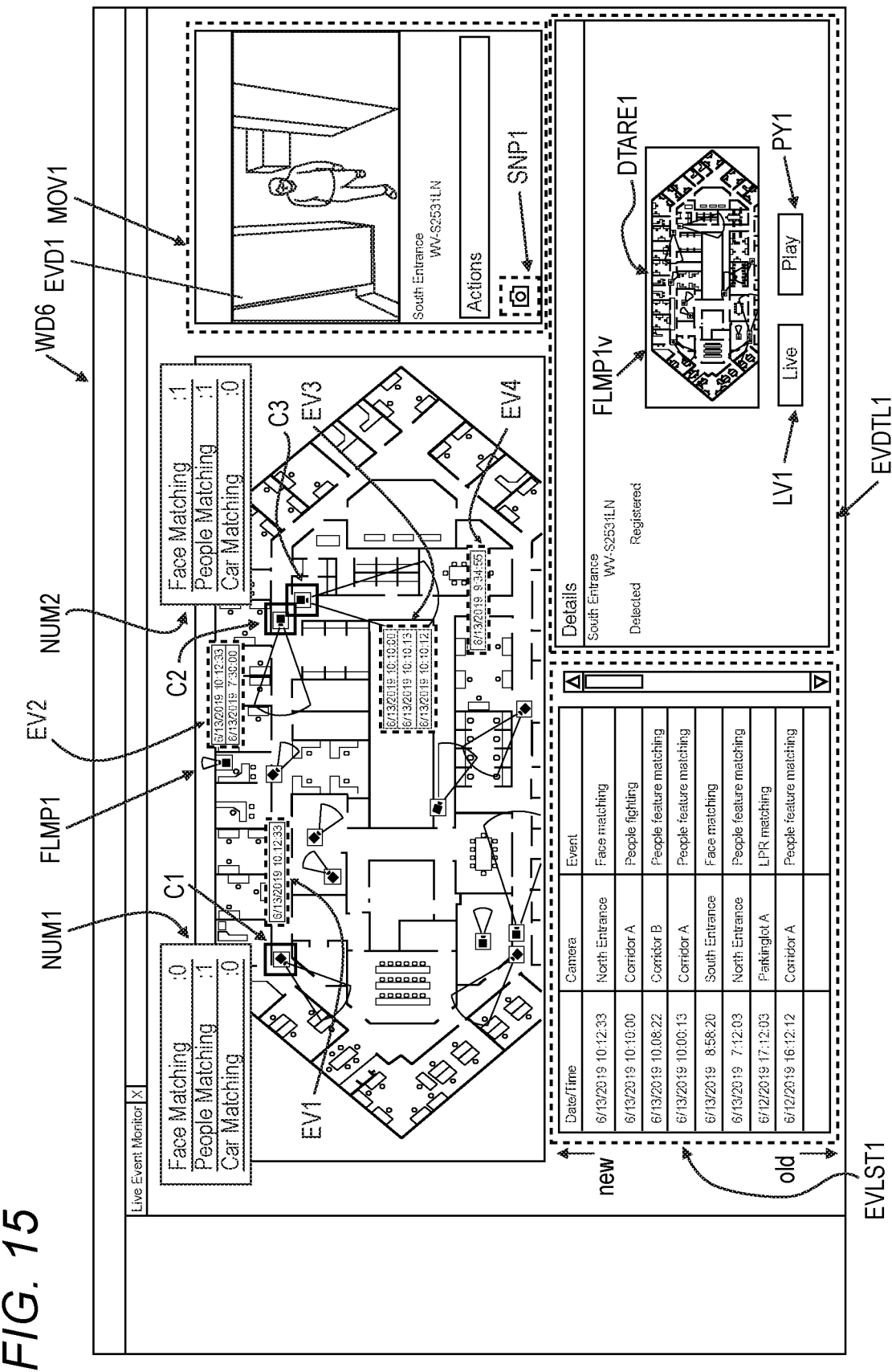
FIG. 15 is a diagram showing an example of an event detection operation screen.

FIG. 15 is a diagram showing an example of an event detection operation screen. An event detection operation screen WD6 shown in FIG. 15 displays at least map data FLMP1 in which arrangement positions of a plurality of cameras (see FIG. 2) arranged in a floor are superimposed in a case where the floor is a certain floor in a building in which an investigation area of an incident or the like is wide. The event detection operation screen WD6 is displayed by the investigation assistance app based on a user operation or an event notification from the AI integrated server 10. The event detection operation screen WD6 displays an event list EVLST1 including event records each having content data of items of date and time of a number of events detected in the floor, a camera, and an event name of an event indicating an event type. In the event list EVLST1, an event record with a new date and time of a detected event is displayed at an upper side, and an event record with an old date and time of a detected event is displayed at a lower side.

In the map data FLMP1 of the event detection operation screen WD6, the investigation assistance app displays event recording windows NUM1 and NUM2 indicating event names and the number of events detected based on captured video data of cameras for an arrangement position of each of the cameras C1, C2, and C3. For example, it is indicated that one event of "People Matching" is detected at the arrangement position of the camera C1. Similarly, it is indicated that one event "Face Matching" and one event "People Matching" are detected at the arrangement position of the camera C2. In addition, the investigation assistance app displays event icons EV1, EV2, EV3, and EV4 indicating a date and time of an event detected in a similar manner together with the event recording windows NUM1 and NUM2 for an arrangement position of each camera. As a result, a user can know a date and time of one event indicated by the event recording window NUM1 according to the event icon EV1.

Further, when the investigation assistance app detects that, for example, an arrangement position of a camera, an event icon, or an event name in an event recording window is pressed by a user operation, the investigation assistance app highlights a corresponding event record of the event list EVLST1 and displays an event detail window EVDTL1 of the event corresponding to the pressing on the event detection operation screen WD6. The event detail window EVDTL1 includes at least map data FLMP1v superimposed with a camera arrangement position DTARE1 of a camera that captures video data in which a corresponding event is detected, a live video button LV1, and a playback button PY1.

When it is detected that the live video button LV1 is pressed by a user operation, the investigation assistance app outputs a live video EVD1 of a camera at an arrangement position DTARE1 to a live video screen MOV1. A snapshot icon SNP1 that enables saving of a snapshot of the live video is displayed on the live video screen MOV1.

When it is detected that the playback button PY1 is pressed by a user operation, the investigation assistance app plays back a past captured video (not shown) at an event detection date and time of the camera at the arrangement position DTARE 1. The investigation assistance app may play back and display the captured video on, for example, the live video screen MOV1.

Figure 16:
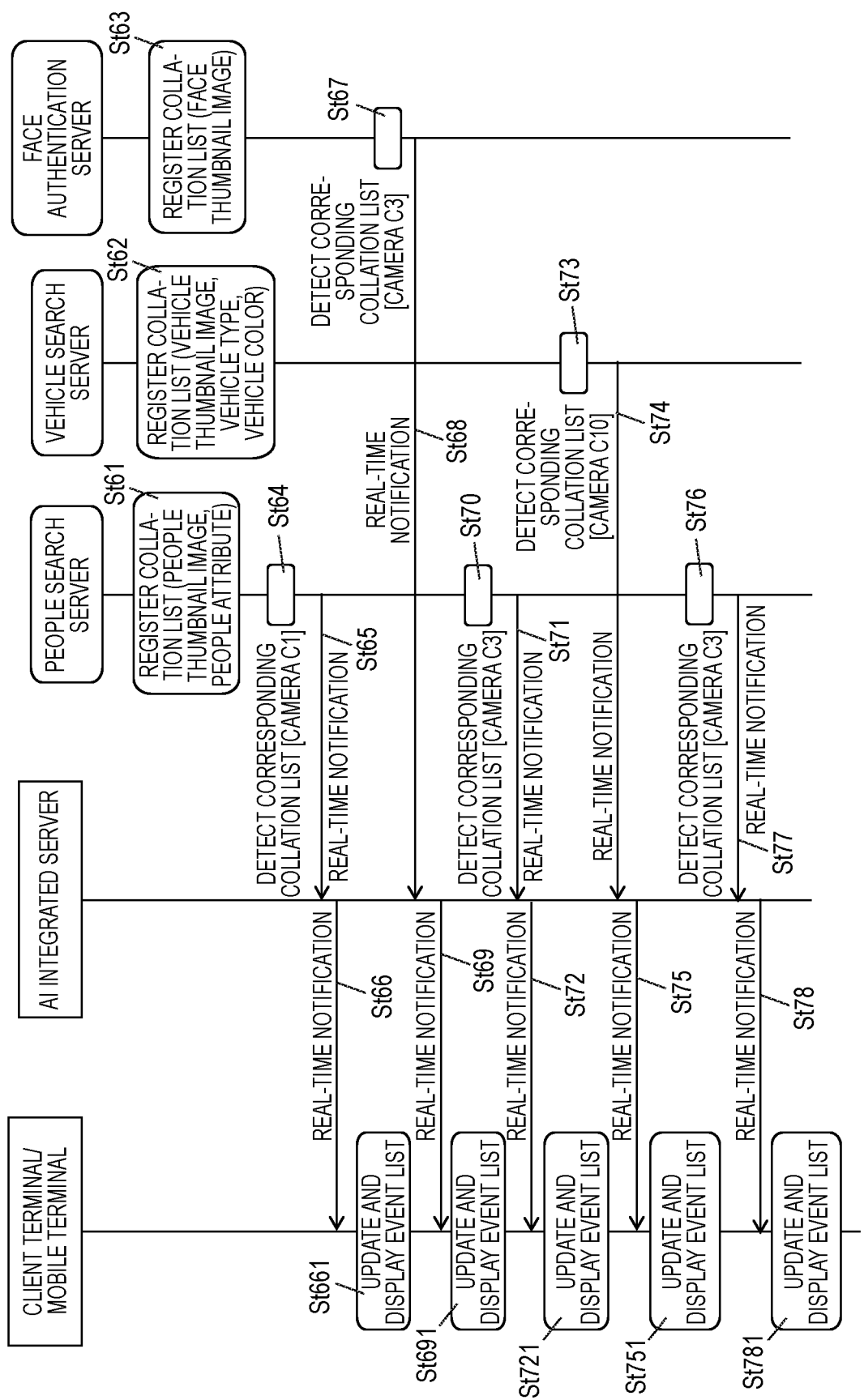
FIG. 16 is a sequence diagram showing an operation procedure example of an investigation assistance system according to a fourth embodiment.

Next, an operation procedure example of the investigation assistance system 1 according to the fourth embodiment will be described with reference to FIG. 16. FIG. 16 is a sequence diagram showing an operation procedure example of the investigation assistance system 1 according to the fourth embodiment. In FIG. 16, a flow of a processing of displaying the event detection operation screen WD6 shown in FIG. 15 will be described in time series. As a premise of the description of FIG. 16, the people search server 60, the vehicle search server 80, and the face authentication server 50 are connected as an example of an analysis server capable of searching for an object.

In FIG. 16, a collation list in which an object feature element of an object that causes an event to be detected by each of the people search server 60, the vehicle search server 80, and the face authentication server 50 is registered is stored in each of the databases 62, 82, and 52 (St61, St62, and St63). For example, the people search server 60 registers and stores a collation list having a thumbnail image of a people and a people attribute (for example, an appearance feature element) in the database 62. Similarly, the vehicle search server 80 registers and stores a collation list having a thumbnail image of a vehicle and a vehicle attribute (for example, a vehicle type and a vehicle color) in the database 82. The face authentication server 50 registers and stores a collation list having a thumbnail image of a face of a people in the database 52.

For example, the people search server 60 detects a people satisfying the collation list (that is, a people who causes an event) based on a video analysis on captured video data of any one camera (for example, the camera C1) arranged in an investigation area (St64). In this case, the people search server 60 generates a real-time notification including a date and time when the event is detected, a camera (including arrangement position information), and content data of an event name, and transmits the real-time notification to the AI integrated server 10 (St65). The AI integrated server 10 transfers the real-time notification transmitted in step St65 to the client terminal VW (St66). The client terminal VW1 generates an event record (see FIG. 15) based on content data of each item included in the real-time notification transmitted in step St66, generates the event detection operation screen WD6 including the event list EVLST1 in which the event record is added and updated, and displays the event detection operation screen WD6 on the display device 116 (St661).

For example, the face authentication server 50 detects a face satisfying the collation list (that is, a face of a people who causes an event) based on a video analysis on captured video data of any one camera (for example, the camera C3) arranged in an investigation area (St67). In this case, the face authentication server 50 generates a real-time notification including a date and time when the event is detected, a camera (including arrangement position information), and content data of an event name, and transmits the real-time notification to the AI integrated server 10 (St68). The AI integrated server 10 transfers the real-time notification transmitted in step St68 to the client terminal VW (St69). The client terminal VW1 generates an event record (see FIG. 15) based on content data of each item included in the real-time notification transmitted in step St69, generates the event detection operation screen WD6 including the event list EVLST1 in which the event record is added and updated, and displays the event detection operation screen WD6 on the display device 116 (St691).

For example, the people search server 60 detects a people satisfying the collation list (that is, a people who causes an event) based on a video analysis on captured video data of any one camera (for example, the camera C3) arranged in an investigation area (St70). In this case, the people search server 60 generates a real-time notification including a date and time when the event is detected, a camera (including arrangement position information), and content data of an event name, and transmits the real-time notification to the AI integrated server 10 (St71). The AI integrated server 10 transfers the real-time notification transmitted in step St71 to the client terminal VW (St72). The client terminal VW1 generates an event record (see FIG. 15) based on content data of each item included in the real-time notification transmitted in step St72, generates the event detection operation screen WD6 including the event list EVLST1 in which the event record is added and updated, and displays the event detection operation screen WD6 on the display device 116 (St721).

For example, the vehicle search server 80 detects a vehicle satisfying the collation list (that is, a vehicle that causes an event) based on a video analysis on captured video data of any one camera (for example, the camera C10) arranged in an investigation area (St73). Although not shown in FIG. 15, the camera C10 can image, for example, a parking lot or the like outside a building in the investigation area, and can image a vehicle for escape that is taken by a suspect when escaping. In this case, the vehicle search server 80 generates a real-time notification including a date and time when the event is detected, a camera (including arrangement position information), and content data of an event name, and transmits the real-time notification to the AI integrated server 10 (St74). The AI integrated server 10 transfers the real-time notification transmitted in step St74 to the client terminal VW (St75). The client terminal VW1 generates an event record (see FIG. 15) based on content data of each item included in the real-time notification transmitted in step St75, generates the event detection operation screen WD6 including the event list EVLST1 in which the event record is added and updated, and displays the event detection operation screen WD6 on the display device 116 (St751).

For example, the people search server 60 detects a people satisfying the collation list (that is, a people who causes an event) based on a video analysis on captured video data of any one camera (for example, the camera C3) arranged in an investigation area (St76). In this case, the people search server 60 generates a real-time notification including a date and time when the event is detected, a camera (including arrangement position information), and content data of an event name, and transmits the real-time notification to the AI integrated server 10 (St77). The AI integrated server 10 transfers the real-time notification transmitted in step St77 to the client terminal VW (St78). The client terminal VW1 generates an event record (see FIG. 15) based on content data of each item included in the real-time notification transmitted in step St78, generates the event detection operation screen WD6 including the event list EVLST1 in which the event record is added and updated, and displays the event detection operation screen WD6 on the display device 116 (St781). In FIG. 16, for example, a flow from a processing at a time when five events are detected to a processing when the real-time notification is transmitted to the client terminal VW1 is described in time series, but it is needless to say that the number of events to be detected is not limited to five.

As described above, in the investigation assistance system 1 according to the fourth embodiment, the user terminal and a plurality of analysis servers are communicably connected to each other via the AI integrated server 10. The plurality of analysis servers are respectively connected to the plurality of cameras C1 to C20, and each analysis server stores a collation list of objects different from an object that can be searched for by another analysis server and that is related to an incident or the like. When each of the plurality of analysis servers detects an object satisfying the collation list stored by the analysis server by analyzing captured video of a camera, the analysis server transmits a detection notification (for example, a real-time notification) including information about an event name indicating the detection of the object, a detection date and time, and a camera arrangement position to the user terminal via the AI integrated server 10. The user terminal displays an event detection screen (for example, the event detection operation screen WD6) including the information about the event name, the detection date and time, and the camera arrangement position that are included in the detection notification transmitted from any of the analysis servers.

Accordingly, the investigation assistance system 1 can efficiently assist, at an early stage, specification of a vehicle for escape used by a suspect who caused an incident or the like, and can improve convenience of an investigation by an investigation institution such as the police. In addition, since the investigation assistance system 1 can notify the client terminal VW1 of the detection of an event indicating the presence of a suspect or a vehicle for escape related to an incident or the like even when an investigation area is wide, it can be expected that the progress of an investigation of the suspect or the vehicle for escape is advanced.

The user terminal displays an event list including items of information about an event name, a detection date and time, and a camera arrangement position in the event detection operation screen WD6. Accordingly, a user can visually check the event list, so that the user can efficiently know a list of events detected around a position where a camera is arranged even when an investigation area is wide.

Each time the user terminal receives a detection notification (for example, a real-time notification) from any one of the analysis servers, the user terminal adds and updates the items of the information about the event name, the detection date and time, and the camera arrangement position included in the detection notification to the event list. Accordingly, a user can visually check the event list updated at any time, and the user can check the progress of a list of events detected around a position where a camera is arranged even when an investigation area is wide.

The user terminal has the map data FLMP1 of an area in which a plurality of cameras are arranged, and displays the event detection operation screen WD6 including an event name, the number of events, and a detection date and time of an event detected based on captured video of a camera in a manner of being associated with each arrangement position and being superimposed on the map data MP1. Accordingly, a user can visually and intuitively know the details of an event detected by a camera arranged in the map data FLMP1 in an investigation area in an easily understandable manner.

Based on the designation of a detection date and time, the user terminal displays the event detection operation screen WD6 including an output window (for example, the live video screen MOV1) of a live video of a camera at an arrangement position corresponding to the designated detection date and time. Accordingly, a user can easily visually check a current live video of a camera at a position where a concerned event is detected, and thus, for example, the user can efficiently check a current situation without going to the arrangement position of the camera.

The user terminal has the map data FLMP1 of an area in which a plurality of cameras are arranged, and based on the designation of any item of the event list EVLST1, the user terminal displays the event detection operation screen WD6 including the event detail window EVDTL1 that has at least the map data FLMP1 on which an arrangement position of a camera corresponding to the designated item is superimposed and the playback button PY1 of a captured video of a camera at the detection date and time. Accordingly, a user can easily and visually check a captured video when an even was detected (in the past) by a camera at a position where a concerned event is detected, and thus, for example, the user can efficiently check a situation when an event is detected without going to the arrangement position of the camera.

The user terminal displays the event detail window EVDTL1 including an output button (for example, the live video button LV1) of a live video of a camera at an arrangement position corresponding to the designated item. Accordingly, a user can visually and easily check a current live video of a camera at a position where a concerned event is detected or a past captured video when an event was detected by selectively switching, and, for example, can efficiently check a current situation or a situation when the event was detected without going to the arrangement position of the camera.

Background of Fifth Embodiment

In view of recent circumstances in which a form of an incident or the like is diversified, it is not considered to notify an external terminal or the like in a case where a predetermined behavior (for example, quarreling, gun firing, and sudden accelerated escape) is detected indicating that there is a suspect who caused the incident or the like or a vehicle for escape which is used for escape by the suspect in Patent Literature 1. In particular, in an investigation (in particular, an initial investigation) by an investigation institution such as the police, it is often required to quickly specify the suspect or the vehicle for escape in order to find the suspect at an early stage. However, even when the technique in Patent Literature 1 is used, there is a problem that it is difficult to find the suspect or the vehicle for escape at an early stage since it takes time and it is inefficient to confirm the suspect and specify the vehicle for escape by an investigator (for example, a police officer) manually watching videos of camera devices one by one. In particular, in a case where an investigation range is wide and a blacklist registration can be made so as to be able to track a people or a vehicle related to the predetermined behavior described above when the predetermined behavior described above is detected in a place where a police officer is not noticed, it is likely that the people or the vehicle is a suspect or a vehicle for escape and it is expected to make a progress in the investigation.

Fifth Embodiment

An example of an investigation assistance system will be described in the fifth embodiment. The investigation assistance system according to the fifth embodiment notifies the detection of a predetermined behavior indicating that there is a suspect related to an incident or the like or a vehicle for escape even in a wide investigation area, efficiently assists, at an early stage, specification of the vehicle for escape used by the suspect who caused the incident or the like, and improves convenience of an investigation by an investigation institution such as the police. The configuration of the investigation assistance system according to the fifth embodiment is the same as the configuration of the investigation assistance system 1 according to the first embodiment, and thus description of the same contents will be omitted and different contents from the first embodiment will be described with the same reference numerals.

Figure 17:
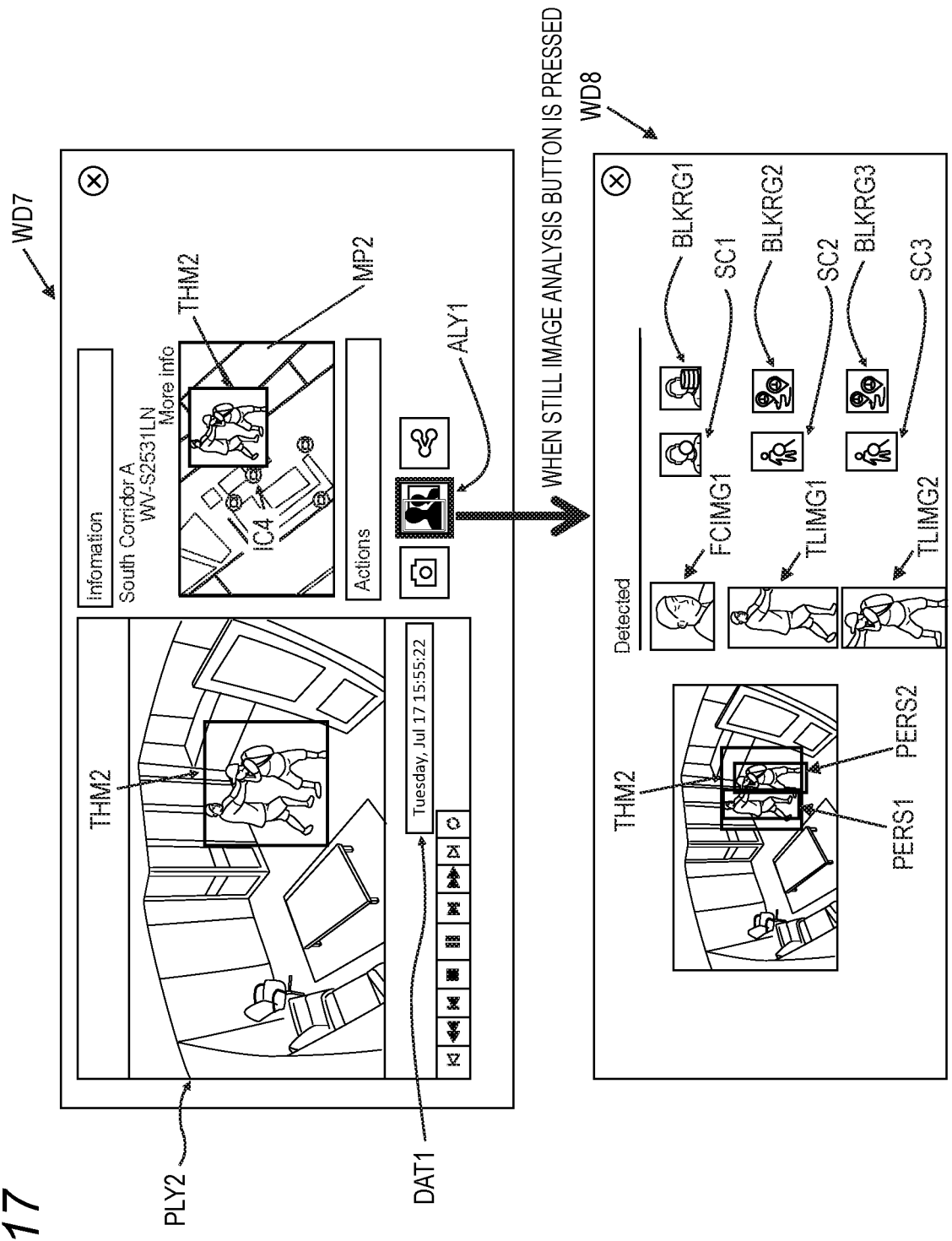
FIG. 17 is a diagram showing a display transition from an event detection screen to an analysis result screen.

FIG. 17 is a diagram showing a display transition from an event detection screen WD7 to an analysis result screen WD8. For example, when the behavior detection server 70 detects a predetermined behavior (for example, quarreling) indicating that there is a suspect of an incident or the like or a vehicle for escape, the investigation assistance app displays the event detection screen WD7 shown in FIG. 17 based on an alarm notification transmitted via the behavior detection server 70 and the AI integrated server 10. The event detection screen WD7 displays, for example, a playback window PLY2 of a captured video superimposed with a quarreling thumbnail image THM2 of a camera when the quarreling is detected, map data MP2 superimposed with an arrangement position IC4 of a camera that detects the quarreling and the quarreling thumbnail image THM2, and a still image analysis button ALY1 for the quarreling thumbnail image THM2. A time indicator DAT1 indicating a date and time when the quarreling is detected (for example, Tuesday, June 17, 15:55:22) is superimposed on the playback window PLY2.

When the investigation assistance app detects that the still image analysis button ALY1 is pressed by a user operation, the investigation assistance app generates an analysis request (to be described later) based on the pressing of the still image analysis button ALY1 and transmits the analysis request to the AI integrated server 10. Although details will be described later, when the investigation assistance app receives an analysis result from the AI integrated server 10, the investigation assistance app displays the analysis result screen WD8 on the display device 116.

The investigation assistance app displays the analysis result screen WD8 shown in FIG. 17 using the analysis result transmitted from the AI integrated server 10 based on the pressing of the still image analysis button ALY1 for the quarreling thumbnail image THM2. Specifically, the analysis result screen WD8 displays captured video (captured image) of a camera when the quarreling is detected and on which the quarreling thumbnail image THM2 is superimposed, three images serving as an analysis result (Detected), and various buttons provided corresponding to respective images.

Specifically, the three images obtained as the analysis result includes a face image FCIMG1 and a whole body image TLIMG1 of a people PERS1 among two people (that is, quarreling people) appearing in the quarreling thumbnail image THM2, and a whole body image TLIMG2 of another people PERS2. A search button SC1 and a blacklist registration button BLKRG1 are displayed corresponding to the face image FCIMG1. A search button SC2 and a blacklist registration button BLKRG2 are displayed corresponding to the whole body image TLIMG1. A search button SC3 and a blacklist registration button BLKRG3 are displayed corresponding to the whole body image TLIMG2.

The search buttons SC1, SC2, and SC3 are buttons for requesting the AI integrated server 10 to search for a people who is the same as or similar to the corresponding face image FCIMG1 and whole body images TLIMG1 and TLIMG2. The blacklist registration buttons BLKRG1, BLKRG2, and BLKRG3 are buttons for requesting the AI integrated server 10 to register the corresponding face image FCIMG1 and whole body images TLIMG1 and TLIMG2 as blacklist data to corresponding analysis servers (specifically, the face authentication server 50, the people search server 60, and the people search server 60).

Figure 18:
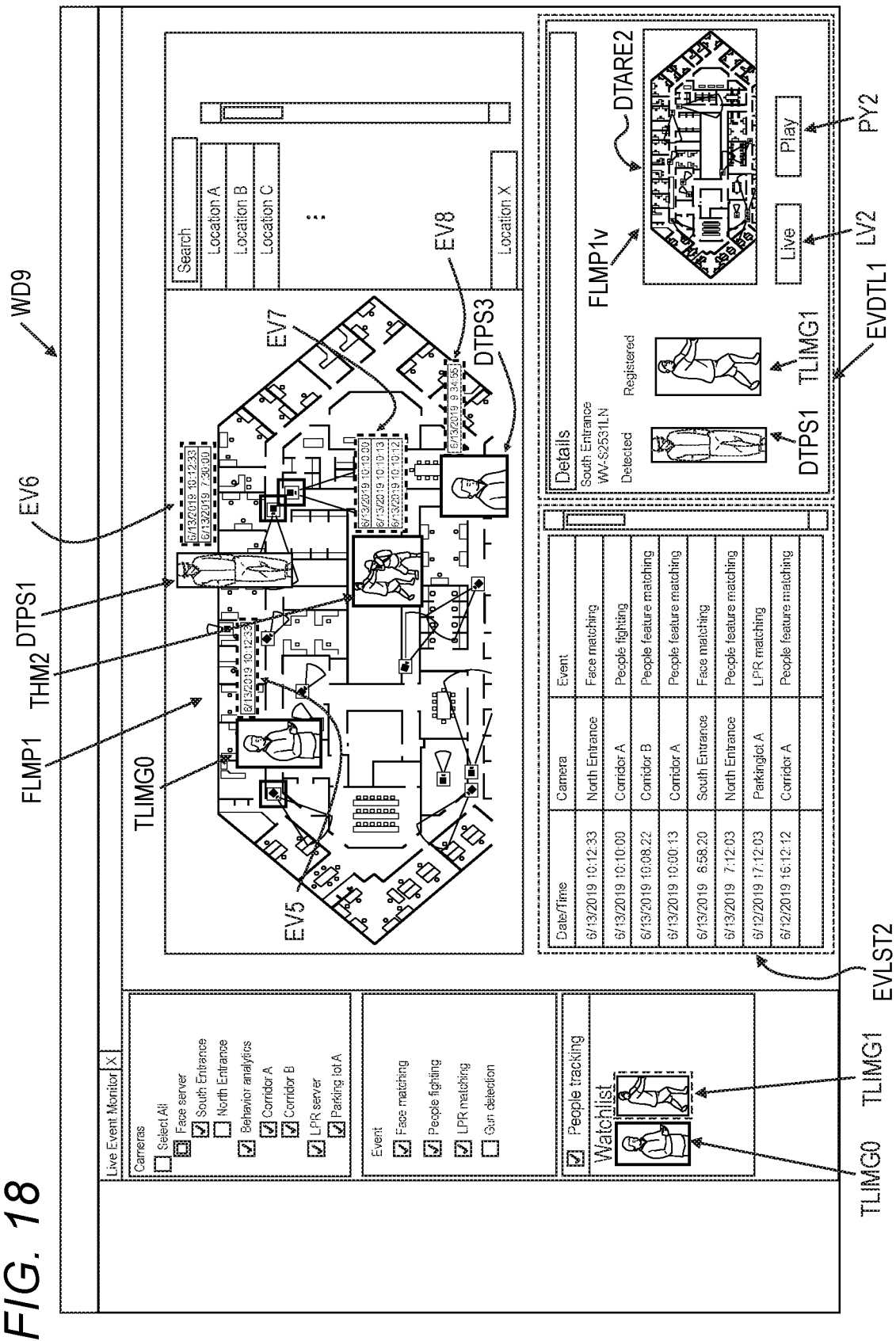
FIG. 18 is a diagram showing an example of a people tracking operation screen.

FIG. 18 is a diagram showing an example of a people tracking operation screen. For example, in a case where an investigation area of an incident or the like is a certain floor in a building in which the investigation area is wide, a people tracking operation screen WD9 shown in FIG. 18 displays at least an image of a people to be tracked (for example, whole body images TLIMG0 and TLIMG1) and map data FLMP1 superimposed with arrangement positions of a plurality of cameras (see FIG. 2) arranged in the floor. The investigation assistance app displays the people tracking operation screen WD9 based on a user operation or an alarm notification from the AI integrated server 10. Here, the whole body image TLIMG1 corresponding to a blacklist registration button BLKRG2 pressed by a user operation on the analysis result screen WD8 of FIG. 18 is added and displayed in a watch list of the people tracking operation screen WD9 shown in FIG. 19.

The people tracking operation screen WD9 displays an event list EVLST2 including event records each having content data of items of Date/Time of a number of events detected in the floor, Camera, and Name of an event indicating an event type. In the event list EVLST2, an event record with a new date and time of a detected event is displayed at an upper side, and an event record with an old date and time of a detected event is displayed at a lower side.

In the map data FLMP1 of the people tracking operation screen WD9, the whole body image TLIMG0 at the time when a people displayed in the watch list is first detected is displayed in a manner of being superimposed on an arrangement position of a corresponding camera, and further, a thumbnail image DTPS1, a quarreling thumbnail image THM2, and a thumbnail image DTPS3 at the time when a predetermined behavior (see above description) performed by a people the same as or similar to the people displayed in the watch list is detected are displayed in a manner of being superimposed on arrangement positions of corresponding cameras.

The investigation assistance app displays event icons EV5, EV6, EV7, and EV8 indicating a date and time when an even is detected. Accordingly, the event icons EV5, EV6. EV7, and EV8 enables a user to know a date and time when a predetermined behavior (see above description) performed by the people of the whole body image TLIMG or the thumbnail image DTPS1, the quarreling thumbnail image THM2, and the thumbnail image DTPS3 is detected by the event icons EV5, EV6, EV7, and EV8.

When the investigation assistance app detects that, for example, a whole body image, a thumbnail image, or an event icon is pressed by a user operation, the investigation assistance app highlights a corresponding event record in the event list EVLST1 and displays an event detail window EVDTL2 of an event corresponding to the pressing on the people tracking operation screen WD9. The event detail window EVDTL2 includes at least the whole body image TLIMG1 when a people who performs a corresponding predetermined behavior (see above description) is first added to the watch list, the thumbnail image DTPS1 when the predetermined behavior (see above description) is detected, the map data FLMP1v superimposed with an arrangement position DTARE2 of a camera that captures video data when the predetermined behavior (see above description) is detected, a live video button LV2, and a playback button PY2.

When it is detected that the live video button LV2 is pressed by a user operation, the investigation assistance app outputs a live video of a camera at the arrangement position DTARE2 to a live video screen (not shown).

When it is detected that the playback button PY2 is pressed by a user operation, the investigation assistance app plays back a past captured video (not shown) at an event detection date and time of a camera at the arrangement position DTARE 2. The investigation assistance app may play back and display the captured video on, for example, a live video screen.

Figure 19:
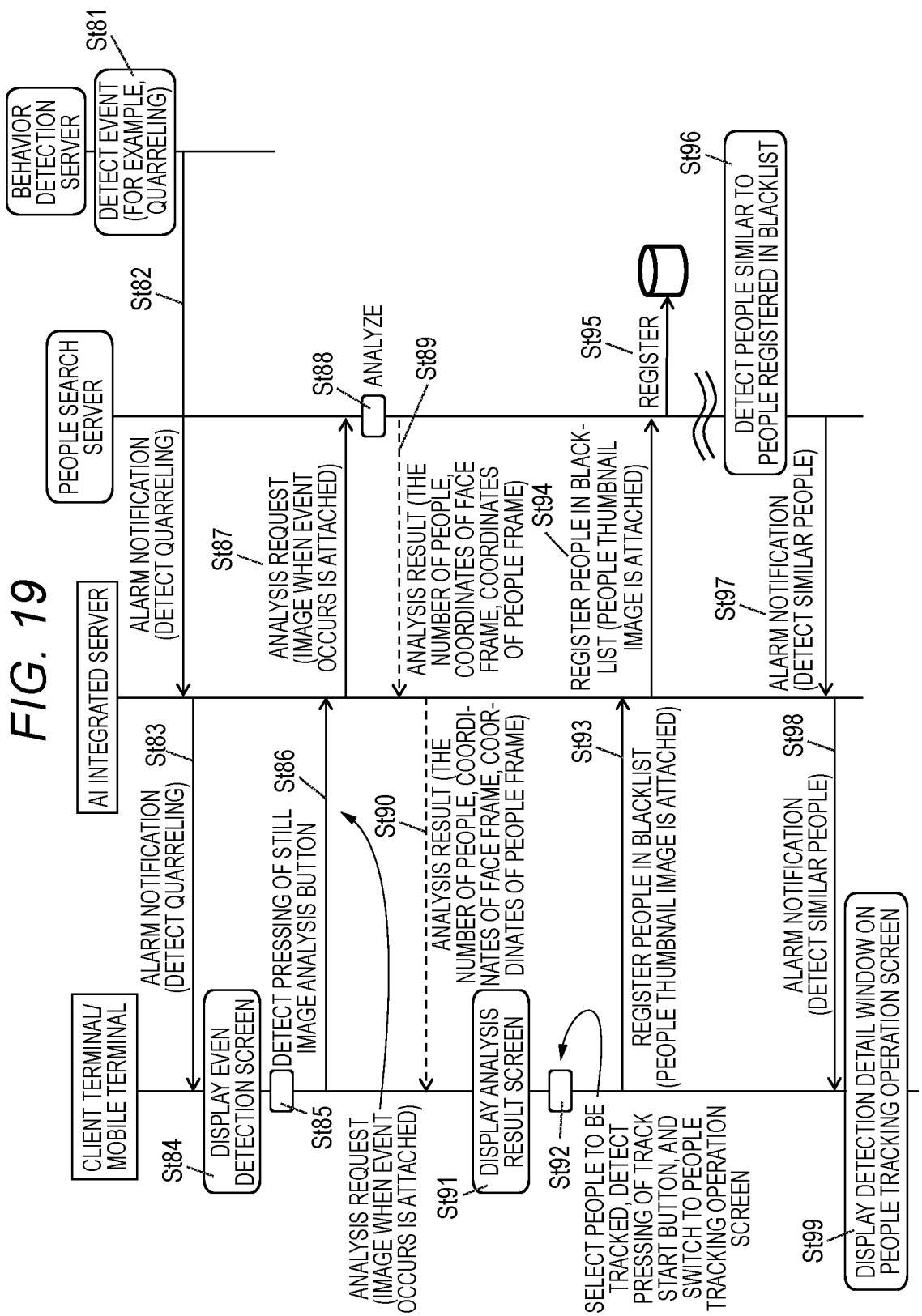
FIG. 19 is a sequence diagram showing an operation procedure example of an investigation assistance system according to a fifth embodiment.

Next, an operation procedure example of the investigation assistance system 1 according to the fifth embodiment will be described with reference to FIG. 19. FIG. 19 is a sequence diagram showing an operation procedure example of the investigation assistance system 1 according to the fifth embodiment. In FIG. 19, a flow of a processing of displaying the people tracking operation screen WD9 shown in FIG. 18 will be described in time series. As a premise of the description of FIG. 19, the people search server 60 is connected as an example of an analysis server capable of searching for an object.

In FIG. 19, the behavior detection server 70 detects a predetermined behavior (for example, quarreling) based on a video analysis of captured video data of any one of the cameras C1 to C20 (St81). The behavior detection server 70 transmits an alarm notification including information indicating that a predetermined behavior (for example, quarreling) is detected, an image captured when the predetermined behavior is detected (or the quarreling thumbnail image THM2), camera identification information, and an imaging time to the AI integrated server 10 (St82). The AI integrated server 10 transfers the alarm notification transmitted from the behavior detection server 70 to the client terminal VW1 (St83). When the client terminal VW1 receives the alarm notification transferred from the AI integrated server 10, the client terminal VW1 displays the event detection screen WD7 shown in FIG. 17 on the display device 116 based on the alarm notification (St84).

It is assumed that a user finds a people needs to be noticed among people who performs a predetermined behavior (for example, quarreling) displayed on the event detection screen WD7. When the investigation assistance app (in other words, the client terminal VW1) detects that the still image analysis button ALY1 is pressed by a user operation (St85), the investigation assistance app generates a people analysis request (including an image captured by a camera when the quarreling is detected or the quarreling thumbnail image THM2) based on the pressing of the still image analysis button ALY1 and transmits the people analysis request to the AI integrated server 10 (St86). The AI integrated server 10 transfers the people analysis request transmitted from the client terminal VW1 in step St86 to the people search server 60 (St87).

When the people search server 60 receives the people analysis request transferred from the AI integrated server 10 in step St87, the people search server 60 executes an analysis processing (for example, detecting a people and the number of people appearing in the captured image or the quarreling thumbnail image THM2 and extracting coordinates of a face frame and a people frame) on the people appearing in the image captured by a camera when the quarreling is detected or the quarreling thumbnail image THM2 based on the analysis request (St88). The people search server 60 transmits an analysis result including the people, the detected number of people, and the coordinates of the face frame and the people frame to the AI integrated server 10 (St89). The AI integrated server 10 transfers the analysis result transmitted from the people search server 60 in step St89 to the client terminal VW1 (St90). When the client terminal VW1 receives the analysis result transferred from the AI integrated server 10, the client terminal VW1 displays the analysis result screen WD8 shown in FIG. 17 on the display device 116 based on the analysis result (St91).

It is assumed that a user finds a people (for example, a suspect of an incident or the like) to be added as a tracking target in an image (for example, a face image or a whole body image) of at least one people displayed on analysis result screen WD8. When the investigation assistance app (in other words, the client terminal VW1) detects that the blacklist registration button BLKRG2 of the image (for example, the whole body image TLIMG1 serving as the analysis result displayed on the analysis result screen WD8) of the people to be tracked is pressed by a user operation (St92), the investigation assistance app generates a blacklist registration request (including the whole body image TLIMG1 to be registered) for the image of the people based on the pressing of the blacklist registration button BLKRG2 and transmits the blacklist registration request to the AI integrated server 10 (St93).

The investigation assistance app switches the analysis result screen WD8 to the people tracking operation screen WD9 shown in FIG. 18 and displays the people tracking operation screen WD9 on the display device 116 based on the pressing of the blacklist registration button BLKRG2 (St92). At this time, the investigation assistance app adds the whole body image TLIMG1 selected by a user operation as a target of the blacklist registration to the watch list of the people tracking operation screen WD9 and displays the whole body image TLIMG1. Alternatively, based on the pressing of the blacklist registration button BLKRG2, the investigation assistance app may add the people tracking operation screen WD9 shown in FIG. 18 (for example, in another window) together with the analysis result screen WD8 and display the analysis result screen WD8 and the people tracking operation screen WD9 on the display device 116 (St92). The AI integrated server 10 transfers the blacklist registration request for the image of the people transmitted from the client terminal VW1 in step St93 to the people search server 60 (St94). When the people search server 60 receives the blacklist registration request transferred from the AI integrated server 10 in step St94, the people search server 60 registers the image of the people (for example, the whole body image TLIMG1) included in the blacklist registration request in the database 62 (St95).

After a certain period of time elapses after step St95, it is assumed that the people search server 60 detects a people that is the same as or similar to a people appearing in the whole body image TLIMG1 registered in the database 62 in step St95 based on a video analysis of captured video data of each of the cameras C1 to C20 (St96). The people search server 60 transmits an alarm notification including information indicating that a people is detected, a captured image (or the thumbnail image DTPS1) when the people is detected, camera identification information, and an imaging time to the AI integrated server 10 (St97). The AI integrated server 10 transfers the alarm notification transmitted from the people search server 60 to the client terminal VW1 (St98). When the client terminal VW1 receives the alarm notification transferred from the AI integrated server 10, the client terminal VW1 displays the event detail window EVDTL2 including the image of the corresponding people (for example, the thumbnail image DTPS1) and the whole body image TLIMG1 registered in a blacklist on the people tracking operation screen WD9 shown in FIG. 18 based on the alarm notification (St99).

As described above, in the investigation assistance system 1 according to the fifth embodiment, a user terminal and a plurality of analysis servers are communicably connected to each other via the AI integrated server 10. When a first analysis server (for example, the behavior detection server 70) among the plurality of analysis servers detects a specific behavior (for example, quarreling) related to an incident or the like by analyzing a captured video of any one of the cameras C1 to C20, the first analysis server transmits an alarm notification including at least an image captured by a camera that detects the behavior to the user terminal via the AI integrated server 10. The user terminal displays an event notification screen (for example, the event detection screen WD7) including the captured image included in the alarm notification transmitted from the first analysis server and a people analysis button (for example, the still image analysis button ALY1) of a people who performs the behavior and appears in the captured image, and requests a people analysis on the people who appears in the captured image via the AI integrated server 10 based on the designation of the people analysis button. A second analysis server (for example, the people search server 60) among the plurality of analysis servers transmits a people analysis result of the people appearing in the captured image to the user terminal via the AI integrated server 10 based on a request from the user terminal. The user terminal displays the analysis result screen WD8 including a cut-out image (for example, the whole body image TLIMG1) of the people included in the people analysis result transmitted from the second analysis server and a tracking button (for example, the blacklist registration button BLKRG2) of the people appearing in the cut-out image. The user terminal requests to register the people corresponding to the tracking button in a blacklist via the AI integrated server 10 based on the designation of the tracking button. The second analysis server registers the cut-out image of the people corresponding to the tracking button in blacklist data of the second analysis server based on a request from the user terminal.

Accordingly, the investigation assistance system 1 can efficiently assist, at an early stage, specification of a vehicle for escape used by a suspect who caused an incident or the like, and can improve convenience of an investigation by an investigation institution such as the police. In addition, since the investigation assistance system 1 can notify the client terminal VW1 of the detection of a predetermined behavior indicating the presence of a suspect or a vehicle for escape related to an incident or the like even when an investigation area is wide, it can be expected that the progress of an investigation of the suspect or the vehicle for escape is advanced.

When the second analysis server (for example, the people search server 60) detects a people the same as or similar to the people registered in the blacklist data by analyzing a captured video of a camera, the second analysis server transmits a detection notification including information about a captured image in which the detected people is captured, a detection date and time, and an arrangement position of the camera to the user terminal via the AI integrated server 10. The user terminal displays the people tracking operation screen WD9 including information about the captured image, the detection date and time, and the arrangement position of the camera included in the detection notification transmitted from the second analysis server. Accordingly, a user can intuitively and visually know that a people (for example, a suspect of an incident or a similar people) selected by the user as a tracking target is registered in a blacklist and the people is detected in an easily understandable manner through the people tracking operation screen WD9.

The user terminal displays the people tracking operation screen WD9 including a tracking target list (for example, a watch list) indicating a cut-out image of a people corresponding to a tracking button. Accordingly, a user can quickly and intuitively know a people who is currently tracked.

The user terminal displays the people tracking operation screen WD9 including the event list EVLST2 having items of information about a name of a behavior, a detection date and time of the behavior, and an arrangement position of a camera. Accordingly, a user can visually check the event list, so that the user can efficiently know a list of events detected around a position where a camera is arranged even when an investigation area is wide.

Each time the user terminal receives the detection notification from the second analysis server, the user terminal adds and updates the items of the information about the name of the behavior, the detection date and time of the behavior, and the arrangement position of the camera included in the detection notification to the event list WVLST2. Accordingly, a user can visually check the event list updated at any time, and the user can check the progress of a list of events detected around a position where a camera is arranged even when an investigation area is wide.

The user terminal has the map data FLMP1 of an area in which a camera is arranged, and displays the people tracking operation screen WD9 that includes a captured image in which a behavior is detected and a detection date and time of the behavior in association with an arrangement position of a camera in a manner of being superimposed on the map data FLMP1. Accordingly, a user can visually and intuitively know the details of an event detected by a camera arranged in the map data FLMP1 in an investigation area in an easily understandable manner.

Based on the designation of a captured image, the user terminal displays the people tracking operation screen WD9 including the event detail window EVDTL2 showing a cut-out image (for example, the thumbnail image DTPS1) of a people who performs a behavior appearing in the designated captured image and a cut-out image (for example, the whole body image TLIMG1) of a people registered in the blacklist data in association with the behavior. Accordingly, a user can visually check a people image when an event is detected by a camera arranged at a position where a concerned event is detected and a people image registered in a blacklist in a comparative manner, and therefore, the user can efficiently check a current situation when the event is detected without going to the arrangement position of the camera.

A third analysis server (for example, the face authentication server 50) among the plurality of analysis servers may transmit a face analysis result of a people who performs a behavior appearing in a captured image to the user terminal via the AI integrated server 10 based on a request from the user terminal. In this case, the user terminal displays the analysis result screen WD8 including a cut-out image of a face of a people of a behavior included in the face analysis result transmitted from the third analysis server and a tracking button of the face appearing in the cut-out image. The user terminal requests to register the face corresponding to the tracking button in a blacklist via the AI integrated server 10 based on the designation of the tracking button. The third analysis server registers the cut-out image of the face corresponding to the tracking button in the blacklist data of the third analysis server based on a request from the user terminal via the AI integrated server 10. Accordingly, since the face of a people who performs a predetermined behavior (for example, quarreling) can be easily registered in the blacklist data of the face authentication server 50, it can be expected that the progress of an investigation of a suspect related to an incident or the like is advanced even when an investigation area is wide.

Although various embodiments are described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that such changes also belong to the technical scope of the present disclosure. Components in various embodiments described above may be combined freely within a range not deviating from the spirit of the invention.

Although a people search by the people search server 60 and a vehicle search by the vehicle search server 80 have been described as examples of a search executed by the AI integrated server 10 in the first embodiment described above, the search is not limited thereto. In other words, a search condition is not limited to a people or a vehicle. For example, the search executed by the AI integrated server 10 may be applied to a face detection (a face search) by the face authentication server 50 and a license plate search by the LPR server 90, and further, the search executed by the AI integrated server 10 may be applied to a combination of a people search by the people search server 60 and a vehicle search by the vehicle search server 80. In this case, a face image (an image search) or a license plate (a text search or an image search) may be used as a search condition. For example, a face image may be displayed as a search result using a face image. For example, a face image of a purchaser of a corresponding vehicle may be displayed as a search result using a license plate.

Although an AND search of a people search by the people search server 60 and a vehicle search by the vehicle search server 80 and an AND search of a face collation by the face authentication server 50, a people search by the people search server 60, and a vehicle search by the vehicle search server 80 are described as an example of an AND search (a transverse search) executed by the AI integrated server 10 in the first embodiment described above, an example of the AND search is not limited thereto. For example, the AI integrated server 10 can execute an AND search (a transverse search) by the following combination.

For example, in addition to the face collation by the face authentication server 50, at least one of a people search by the people search server 60, a behavior detection by the behavior detection server 70 (for example, a collation of a face image similar to a face image of a people who is quarreling or carries a gun), a vehicle search by the vehicle search server 80 (for example, a collation of a face image of a male in his thirties and riding a white car), a number plate collation by the LPR server 9X) (for example, a collation of a face image of a people who is similar to a certain face image and rides a vehicle having a number plate with the first two digits being specific numbers), and the like can be combined.

For example, in addition to a people search by the people search server 60, at least one of a behavior detection by the behavior detection server 70 (for example, a search for a people who wears black clothes and performs a destruction behavior on an object or carnes a gun), a search by the vehicle search server 80 (for example, a search for a people who wears red clothes and comes close to a white vehicle), a number plate collation by the LPR server 90 (for example, a search for a people who wears black clothes and comes close to a vehicle having a number of a specific number), and the like can be combined.

For example, in addition to a vehicle search by the vehicle search server 80, at least one of a behavior detection by the behavior detection server 70 (for example, a search for a sedan vehicle that travels backward, or a taxi vehicle that is threatened by a gun from outside), a number plate collation by the LPR server 90 (for example, a search for a vehicle that travels backward and has a number plate with the first two digits being specific numbers), and the like can be combined.

For example, in addition to a number plate collation by the LPR server 90, at least one of a behavior detection by the behavior detection server 70 (for example, a detection of a behavior indicating that a vehicle has a number plate with the first two digits being specific numbers and travels backward, a detection of a behavior indicating that a driver of a vehicle having a number plate with the first two digits being specific numbers is threatened by a gun from the outside), and the like can be combined.

Although an object in a captured video of each of the cameras C1 to C20 is a people or a vehicle in the first embodiment described above, the object is not limited to a people or a vehicle, and may be another object (for example, a moving object). The moving object may be, for example, a flying object such as a drone operated by a people such as a suspect who caused an incident or the like.

Background of Sixth Embodiment

An object of WO2018/198376 is to prevent a product placed on a display shelf in a store from being shoplifted. For example, unless a state in which a tagged product is taken away from the display shelf and is stopped at a place other than a POS register in the store for a predetermined time or more or a state in which a tag cannot be detected occurs, a face image of a customer who takes out the product cannot be registered. In other words, in view of recent circumstances in which a form of an incident or an accident (hereinafter, referred to as an "incident or the like") is diversified, it is not possible to easily and quickly register a feature image (for example, a face image or a whole body image) of a people of a suspect who may cause the incident or the like in the configuration of Patent Literature 1. In particular, some suspects pay attention to a trend of an investigation institution such as the police around the site where an incident or the like occurs, and thus there are few suspicious people around the site. Therefore, in a case where there is a people who is noticed by a police officer (that is, it is likely that the people is a suspect) among a crowd of people including a plurality of people appearing around the site, it is desired to simply and quickly register a feature image of a people for investigation from the viewpoint of improving investigation efficiency.

In view of the circumstances in the related art described above, an example of an investigation assistance system and a people image registration method will be described in the sixth embodiment to be described below. The investigation assistance system and the people image registration method simply and quickly register a feature image of a people that is might be a suspect who caused an incident or the like and improve convenience of an investigation by an investigation institution such as the police.

Hereinafter, an example will be described in which the investigation assistance system assists an investigation of a police officer who specifies and tracks a suspect who causes an incident or the like on the street by using captured videos captured by one or more security cameras installed in various places on the street. In the following description, a "face image" indicates an image having such image quality that the entire face of a people is clearly shown, and a "whole body image" indicates an image having such image quality that the whole body (that is, both upper body and lower body) of a people is clearly shown. The "whole body image" may be an image having such image quality that upper body of a people (for example, upper body from the shoulder blades to the top of the head) is clearly shown.

Six Embodiment

Figure 20:
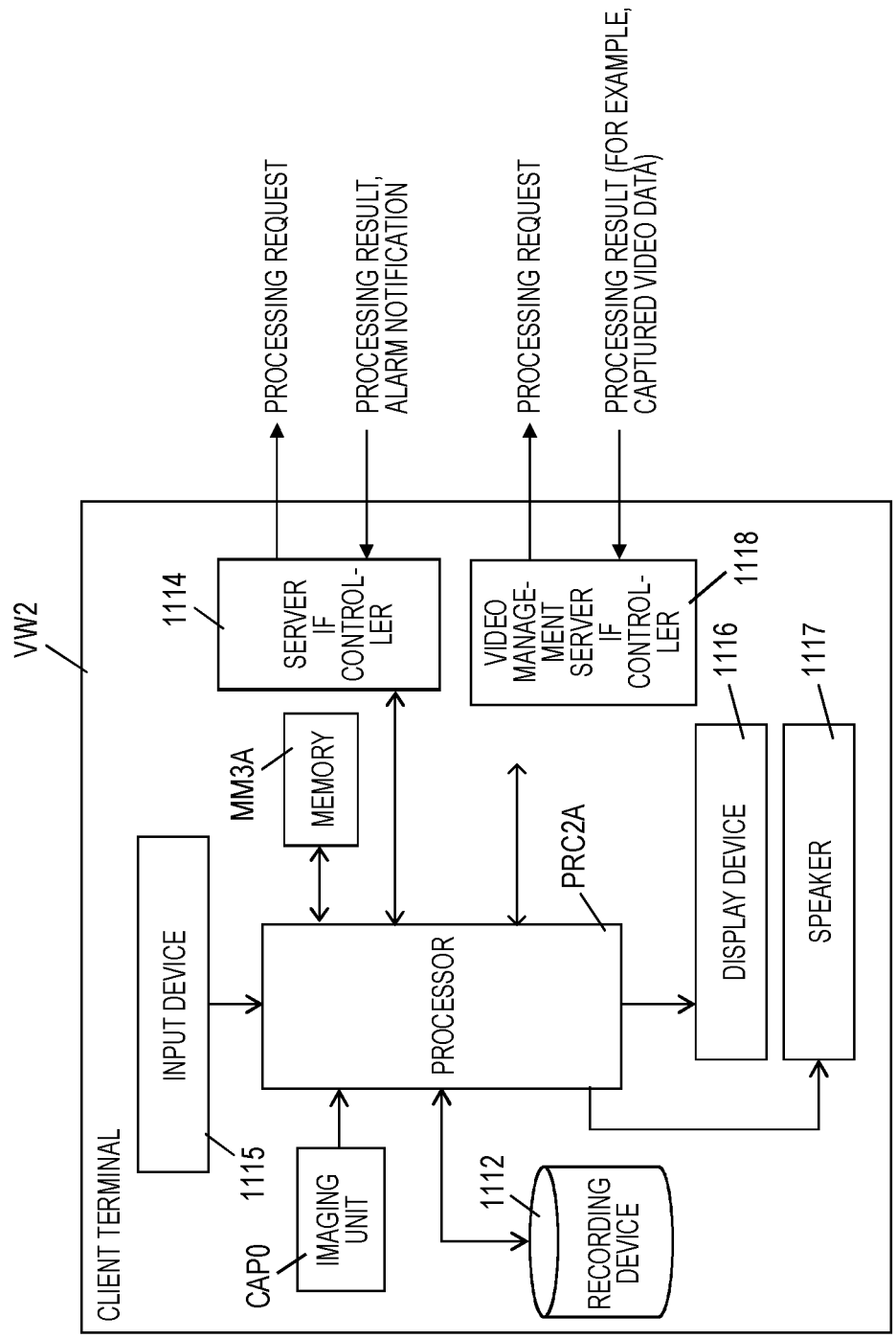
FIG. 20 is a block diagram showing a hardware configuration example of a mobile terminal provided in the investigation assistance system.

FIG. 20 is a block diagram showing a hardware configuration example of the mobile terminal VW2 provided in the investigation assistance system 1. Although illustration is omitted, the hardware configuration of the client terminal VW1 may be the same as the hardware configuration of the mobile terminal VW2, or may be a configuration in which only an imaging unit CAP0 is omitted in the hardware configuration shown in FIG. 20.

The mobile terminal VW2 in FIG. 20 includes, for example, a computer device. Specifically, the mobile terminal VW2 includes the imaging unit CAP0, a processor PRC2A, a memory MM3A, a recording device 1112, a server IF controller 1114, an input device 1115, a display device 1116, a speaker 1117, and a video management server IF controller 1118.

The imaging unit CAP0 has a camera function of the mobile terminal VW2, and has a configuration including a lens (not shown), an image sensor (not shown), and a signal processing circuit (not shown). The lens receives light from a subject, condenses the light, and emits the light to the image sensor. The image sensor is configured with, for example, a complementary metal oxide-semiconductor (CMOS) or a charge coupled device (CCD). The image sensor receives and captures light condensed by a lens, generates an electric signal of a subject image, and outputs the electric signal to the signal processing circuit. The signal processing circuit executes various signal processing on the electric signal of the subject image to generate image data of the subject, thereby generating data of a still image (a snapshot) indicating an instantaneous state of the subject or captured video data in which a movement of the subject or the like can be determined. The imaging unit CAP0 outputs the data of the snapshot or the captured video data to the processor PRC2A. The data of the snapshot or the captured video data is displayed on the display device 1116 via the processor PRC2A (see FIG. 21 or 22).

The processor PRC2A is configured with, for example, a central processing unit (CPU), a digital signal processor (DSP), or an FPGA, functions as a control unit of the mobile terminal VW2, and executes a control processing for integrally controlling an operation of each unit of the mobile terminal V2, a data input and output processing to each unit of the mobile terminal VW2, a data calculation processing, and a data storage processing. The processor PRC2 operates in accordance with a program stored in the memory MM3.

The memory MM3A is configured with, for example, a RAM and a ROM, and temporarily stores a program necessary for executing an operation of the mobile terminal VW2 and further stores data or information generated during the operation. The RAM is, for example, a work memory used during an operation of the processor PRC2A. The ROM stores, for example, a program for controlling the processor PRC2A in advance. The memory MM3 may record road map information indicating positions where the cameras C1 to C20 are installed. The mobile terminal VW2 acquires and records updated road map information from an external road map information management server (not shown) each time road map information is updated by, for example, new road construction, maintenance work, or the like.

The recording device 1112 is configured with, for example, an HDD or an SSD, and stores data or information acquired or generated by the processor PRC2A of the mobile terminal VW2. The recording device 1112 stores data of a snapshot in which a suspicious people is captured by the imaging unit CAP0, or data of various search results or image analysis results transmitted from the AI integrated server 10.

The server IF controller 1114 is configured with a communication interface circuit that controls communication (transmission and reception) between the mobile terminal VW2 and the AI integrated server 10. The server IF controller 1114 transmits a search or image analysis processing request generated by the processor PRC2A to the AI integrated server 10. The server IF controller 1114 receives various processing results or alarm notifications (see above description) transmitted from the AI integrated server 10.

The input device 1115 receives an operation of a police officer (for example, a user of the mobile terminal VW2) who is out at the site. The input device 1115 includes, for example, a touch panel or a button.

The display device 1116 includes, for example, a liquid crystal display (LCD) or an organic electroluminescence (EL), and displays various kinds of data transmitted from the processor PRC2A.

The speaker 1117 acoustically outputs a sound when data (for example, video data included in a search result from the AI integrated server 10) is played back by the processor PRC2A.

The video management server IF controller 1118 is configured with a communication interface circuit that controls communication (transmission and reception) between the mobile terminal VW2 and the video management server 40. The video management server IF controller 1118 transmits, to the video management server 40, a video distribution processing request generated by the processor PRC2A based on an operation of a police officer using the input device 1115. The video management server IF controller 1118 receives various captured video data transmitted from the video management server 40 based on the video distribution processing request described above.

Next, an operation procedure for registering, in blacklist data, an image of a suspicious people that is noticed at the site by a police officer carrying the mobile terminal VW2 and an example of a display screen on the mobile terminal VW2 in a police investigation using the investigation assistance system 1 according to the sixth embodiment will be described with reference to FIGS. 21 to 26. In the description of FIGS. 21 to 26, the same components as those shown in the drawings are denoted by the same reference numerals, and description thereof will be simplified or omitted.

In a police investigation, the mobile terminal VW2 activates and executes an investigation assistance application (hereinafter, referred to as an "investigation assistance app") installed in advance by an operation of a police officer around the site. The investigation assistance app is stored in, for example, the ROM of the memory MM3A of the mobile terminal VW2, and is executed by the processor PRC2A when the investigation assistance app is activated by an operation of a police officer. In other words, the investigation assistance app serving as an operation subject in the following description can be read as the processor PRC2A. Data or information generated by the processor PRC2A during the activation of the investigation assistance app is temporarily held in the RAM of the memory MM3A.

Figure 21:
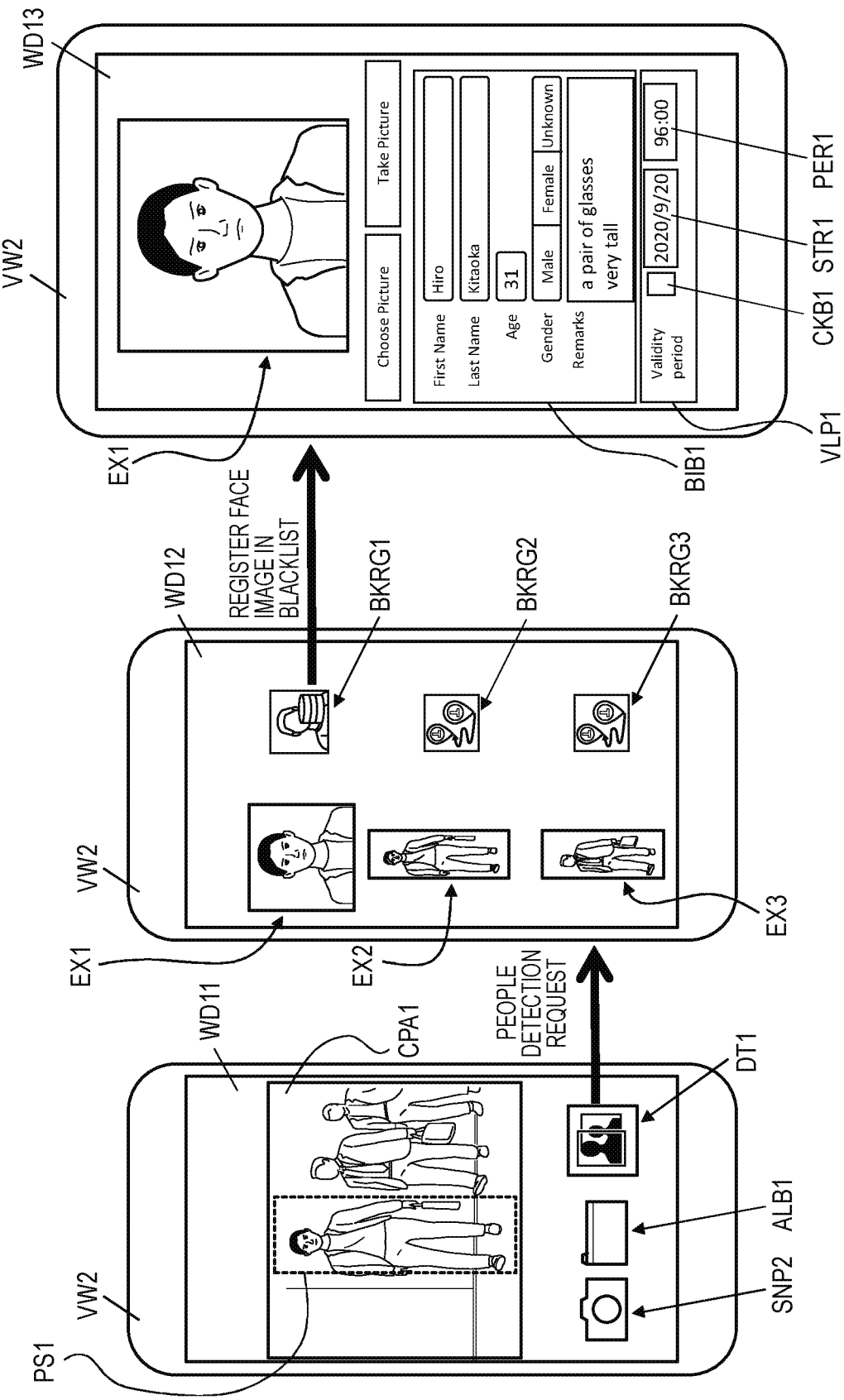
FIG. 21 is a diagram showing an example of a screen related to detection and registration of a suspicious people.

FIG. 21 is a diagram showing an example of a screen related to detection and registration of a suspicious people. When a suspicious people (for example, a people PS1) who is noticed by a police officer is around the site, the investigation assistance app displays a confirmation screen WD11 shown in FIG. 21 on the display device 1116 by an operation of the police officer.

The confirmation screen WD11 show % n in FIG. 21 has a display area for displaying a snapshot CAP1 that is a still image in which a subject (for example, a crowd including a plurality of people around the site) is instantaneously captured by an operation of a police officer using the imaging unit CAP0 and a display area for displaying a snapshot icon SNP2, an album icon ALBI, and an image analysis icon DT1. The people PS1 appears in the snapshot CAP1 shown in FIG. 21 as a suspicious people (for example, a suspect) who is noticed by a police officer in a patrol.

When the snapshot icon SNP2 is pressed by an operation of a police officer, the snapshot icon SNP2 instructs the investigation assistance app (the processor PRC2A) to store captured image data (that is, a snapshot) that is a still image of a subject captured by the imaging unit CAP0 when the snapshot icon SNP2 is pressed by an operation of a police officer.

When the album icon ALBI is pressed by an operation of a police officer, the album icon ALBI instructs the investigation assistance app (the processor PRC2A) to read past captured image data (that is, a snapshot) stored in the recording device 1112 of the mobile terminal VW2.

When the image analysis icon DT1 is pressed by an operation of a police officer, the image analysis icon DT1 instructs the investigation assistance app (the processor PRC2A) to request an image analysis (in other words, detection of a people appearing in the snapshot CAP1) on a people appearing in the snapshot CAP1 displayed on the display device 1116. In response to this request, the mobile terminal VW2 displays a detection result screen WD12 shown in FIG. 21.

The detection result screen WD12 shown in FIG. 21 displays an image analysis result (for example, a face image EX1 and a whole body image EX2 of the people PS1 appearing in the snapshot CAP1, and a whole body image EX3 of another people appearing in the snapshot CAP1) transmitted from the AI integrated server 10 to the mobile terminal VW2 based on the pressing of the image analysis icon DT1. The detection result screen WD12 displays a blacklist registration icon BKRG1 for the face image EX1 corresponding to the face image EX1 of the people PS1, a blacklist registration icon BKRG2 for the whole body image EX2 corresponding to the whole body image EX2 of the people PS1, and a blacklist registration icon BKRG3 for the whole body image EX3 corresponding to the whole body image EX3 of another people.

When the blacklist registration icon BKRG1 is pressed by an operation of a police officer, the blacklist registration icon BKRG1 instructs the investigation assistance app (the processor PRC2A) to register the face image EX1 of the people PS1. Based on this instruction, the mobile terminal VW2 inputs bibliographic information BIB1 and the like of the people PS1 corresponding to the face image EX1 (see a bibliographic input screen WD13), and transmits a registration request for the face image EX1 including the input bibliographic information BIB1 to the AI integrated server 10 (see FIG. 24).

When the blacklist registration icon BKRG2 is pressed by an operation of a police officer, the blacklist registration icon BKRG2 instructs the investigation assistance app (the processor PRC2A) to register the whole body image EX2 of the people PS1. Based on this instruction, the mobile terminal VW2 inputs the bibliographic information or the like of the people PS1 corresponding to the whole body image EX2 and transmits a registration request for the whole body image EX2 including the input bibliographic information to the AI integrated server 10 (see FIG. 25).

When the blacklist registration icon BKRG3 is pressed by an operation of a police officer, the blacklist registration icon BKRG3 instructs the investigation assistance app (the processor PRC2) to register the whole body image EX3 of another people. Based on this instruction, the mobile terminal VW2 inputs the bibliographic information or the like of another people corresponding to the whole body image EX3 and transmits a registration request for the whole body image EX3 including the input bibliographic information to the AI integrated server 10 (see FIG. 25).

The bibliographic input screen WD13 shown in FIG. 21 is generated by the investigation assistance app (the processor PRC2A) based on the pressing of the blacklist registration icon BKRG1, and receives an input of the bibliographic information BIB1 of the people PS1 corresponding to the blacklist registration icon BKRG1 and a registration valid period VLP1 of the face image EX1 by an operation of a police officer. When the bibliographic information BIB1 and information of the registration valid period VLP1 are input and an OK button (not shown on the bibliographic input screen WD13) is pressed by an operation of a police officer, the mobile terminal VW2 generates a blacklist registration of the face image EX1 including various data or information (to be described later) and transmits the blacklist registration to the AI integrated server 10.

The bibliographic information BIB1 includes, for example, a name (First Name, Last Name), age, gender, and remarks as bibliographic information of the people PS1 corresponding to the face image EX1. For example, when the people PS1 is a suspect of an incident or the like and a police officer remembers the people PS1 because the people PS1 is wanted by an investigation institution such as the police, the police inputs the bibliographic information BIB1 according to his memory.

The information of the registration valid period VLP1 includes a check box CKB1, a start date STR1, and a period PER1. The check box CKB1 can be checked by the investigation assistance app (the processor PRC2A) after, for example, the start date STR1 and the period PER1 are input by an operation of a police officer. The start date STR1 indicates a date serving as a registration starting point of the face image EX1, and for example, "Sep. 20, 2020" is input in the start date STR1. The period PER1 indicates a regis-tration valid period of the face image EX1, and for example, "96 hours" (that is, four days) is input in the period PERL. For example, when 96 hours have elapsed, the face image EX1 may be automatically deleted from the blacklist data of the database 52 in a registration destination of the face image EX1 (for example, the face authentication server 50 to be described later).

Figure 22:
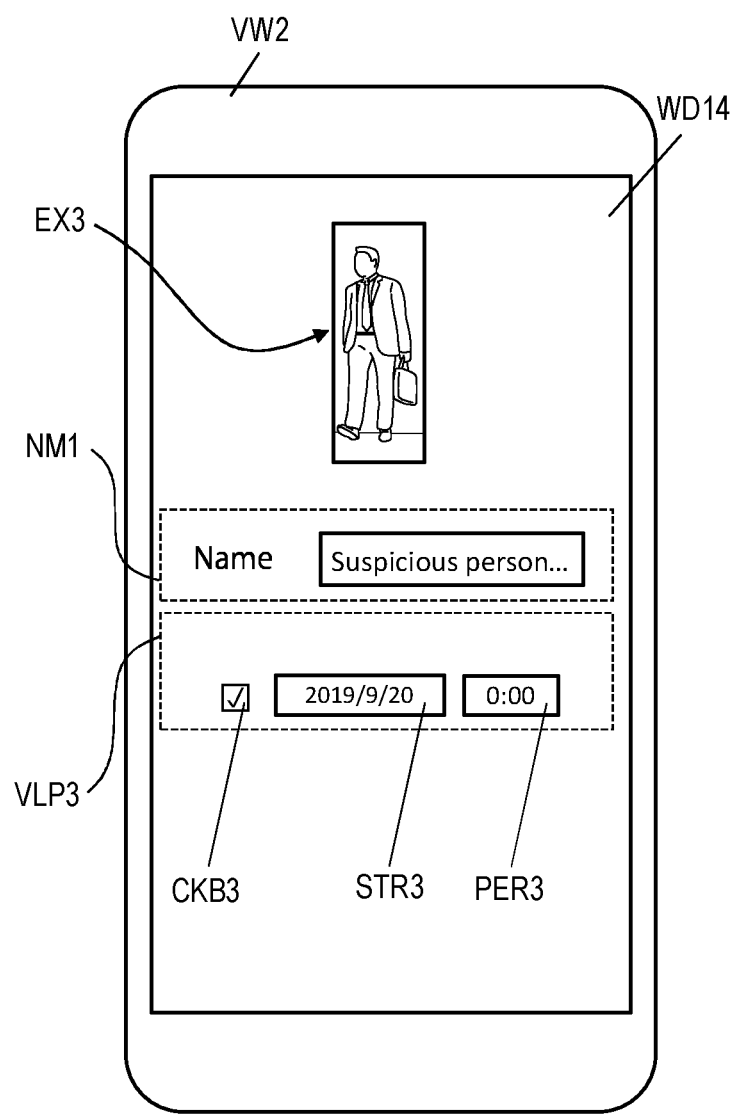
FIG. 22 is a diagram showing a display example of a setting screen for a registration valid period of a whole body image of a suspicious people.

FIG. 22 is a diagram showing a display example of a setting screen WD14 of a registration valid period of the whole body image EX3 of a suspicious people. The setting screen WD14 is displayed on the display device 1116 of the mobile terminal VW2 by a predetermined operation of a police officer. For example, when the whole body image EX3 (see FIG. 21) of the suspicious people is already registered (to be described later) in the blacklist data stored in the database 62 of the people search server 60, there may be a need to extend or shorten a registration valid period (see FIG. 21) of the whole body image EX3 of the suspicious people. In such a case, when "Suspicious person at the entrance" is input in a name field NMI of the whole body image EX3 of a suspicious people by an operation of a police officer, the mobile terminal VW2 displays a registration validity period of the whole body image EX3 acquired by the AI integrated server 10 with reference to the blacklist data of the people search server 60 in registration validity period information VLP3 of the setting screen WD14.

The registration valid period information VLP3 includes a check box CKB3 start date STR3 and a period PER3. The check box CKB3 shows values when the start date STR3 and the period PER3 have already been input at the time of registration, and therefore, the check box CKB3 can be checked by an operation of a police officer. The start date STR3 indicates a date serving as a registration starting point of the whole body image EX3, and for example, "Sep. 20, 2020" is input in the start date STR3 by a change operation of a police officer. The period PER3 indicates a registration valid period of the whole body image EX3, and for example, "0 hour" (that is, infinitely registered) is input in the period PER3 by a change operation of a police officer.

Figure 23:
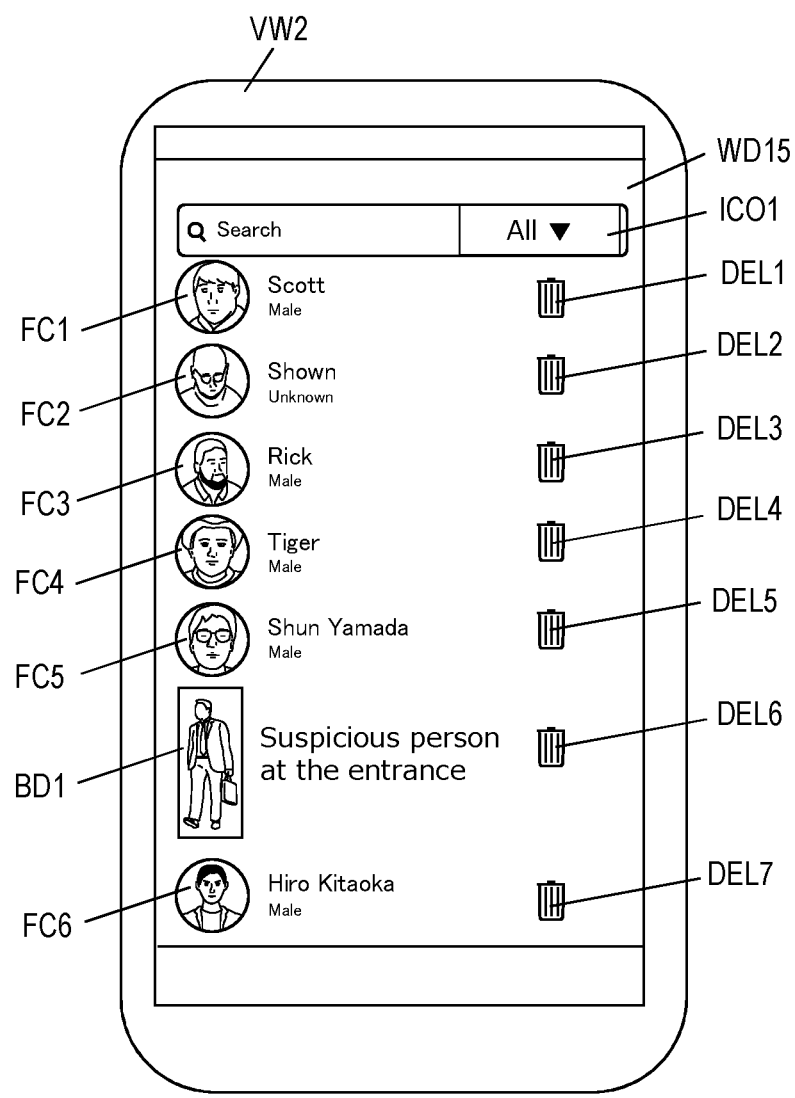
FIG. 23 is a diagram showing a display example of a registered people list screen.

FIG. 23 is a diagram showing a display example of a registered people list screen WD15. The registered people list screen WD15 is displayed on the display device 1116 of the mobile terminal VW2 by a predetermined operation of a police officer. The registered people list screen WD15 shows a people list in which images (for example, a face image and a whole body image) of one or more suspicious people that may be regarded as a suspect by a police officer among a crowd around the site. For example, the registered people list screen WD15 shown in FIG. 23 shows an image (for example, a face image) of a people FC1 having a name "Scott", an image (for example, a face image) of a people FC2 having a name "Shown", an image (for example, a face image) of a people FC3 having a name "Rick", an image (for example, a face image) of a people FC4 having a name "Tiger", an image (for example, a face image) of a people FC5 having a name "Shun Yamada", an image (for example, a whole body image) of a people BD1 having a name "Suspicious person at the entrance", and an image (for example, a face image) of a people FC6 having a name "Hiro Kitaoka".

When the registered people list screen WD15 is displayed, the mobile terminal VW2 can request the AI integrated server 10 to delete a people image that is determined to be unnecessary by a police officer. Therefore, in the registered people list screen WD15, trash box icons DEL1, DEL2, DEL3, DEL4, DEL5, DEL6, and DEL7 are arranged corresponding to the respective people FC1 to FC5, BD1, and FC6. When any one of the trash box icons is pressed by tan operation of a police officer, the mobile terminal VW2 requests the AI integrated server 10 to delete a people image corresponding to the pressed trash box icon. In response to this request, the AI integrated server 10 instructs a corresponding server (for example, the face authentication server 50 or the people search server 60) to delete the requested people image. Accordingly, it is possible to delete an unnecessary people image from the blacklist data of the face authentication server 50 or the people search server 60.

The registered people list screen WD15 shows a type icon ICO1. In the type icon ICO1, any one of "ALL", "Face", and "People" can be selected in a pull-down format as a type of an image of a suspicious people. "ALL" indicates both a face image and a whole body image registered as a blacklist. "Face" indicates a face image registered as a blacklist. "People" indicates a whole body image registered as a blacklist. That is, when any one of the type icon ICO1 is selected, the mobile terminal VW2 can display an image list of people registered in a blacklist of a corresponding type on the display device 116.

When both a face image and a whole body image are registered for the same people, the images of the people FC1 to FC6 are displayed using the same thumbnail as the face image on the registered people list screen WD15 shown in FIG. 23. That is, both a face image and a whole body image are registered for each of the people FC1 to FC6, only a whole body image is registered for the people BD1.

Regarding the registration of a whole body image, only one whole body image of the same people may be registered, or a plurality of whole body images of the same people may be registered. This is because there is a possibility that a suspicious people who is noticed by a police officer changes clothes day by day, and it is considered that different clothes are worn day by day because attention is more likely to be focused on clothes than the face of a people in a whole body image.

(Operation of Investigation Assistance System)

Figure 24:
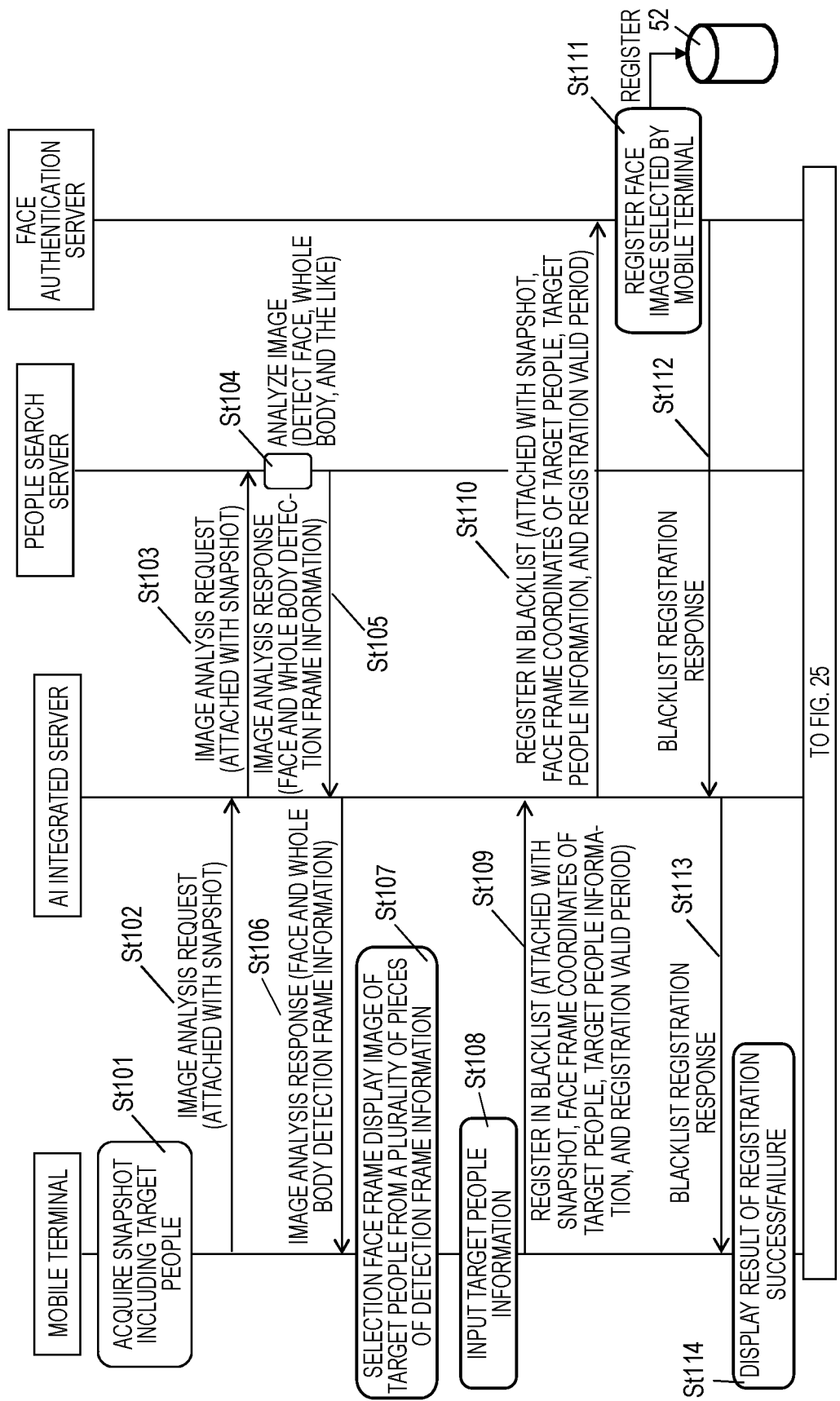
FIG. 24 is a sequence diagram showing an operation procedure example related to registration of an image of a suspicious people in a blacklist in an investigation assistance system according to a sixth embodiment.
Figure 25:
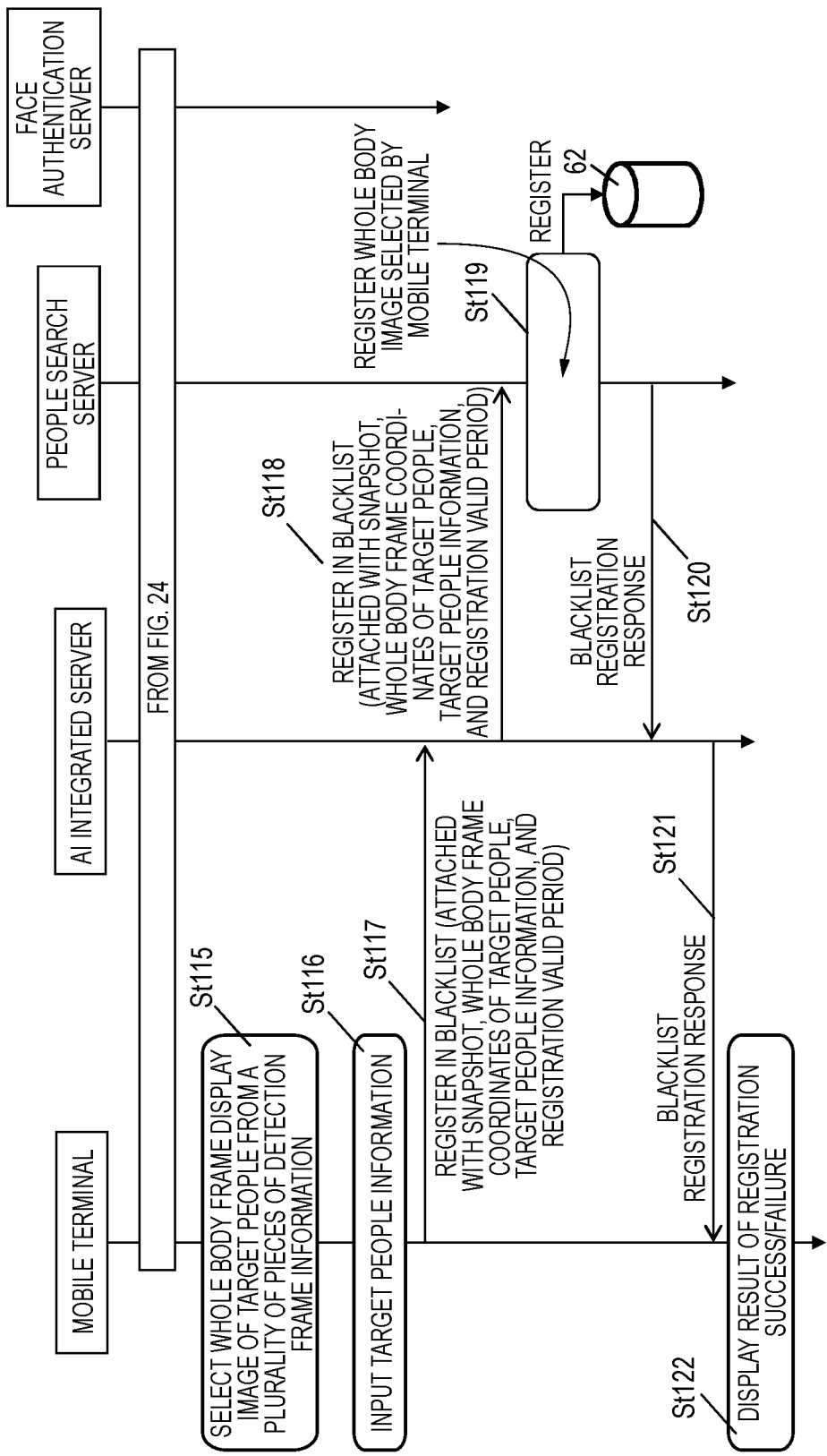
FIG. 25 is a sequence diagram showing an operation procedure example related to registration of an image of a suspicious people in a blacklist in the investigation assistance system according to the sixth embodiment.

Next, an operation procedure related to the registration of an image of a suspicious people in a blacklist in the investigation assistance system 1 according to the sixth embodiment will be described with reference to FIGS. 24 and 25. FIGS. 24 and 25 are sequence diagrams showing an operation procedure example related to the registration of an image of a suspicious people in a blacklist in the investigation assistance system 1 according to the sixth embodiment. As a premise of the description of FIGS. 24 and 25, it is assumed that a police officer who operates the mobile terminal VW2 focuses attention on whether there is a suspicious people such as a suspect in a crowd around the site of an incident or the like, and finds a suspicious people.

In FIG. 24, the investigation assistance app of the mobile terminal VW2 uses the imaging unit CAP0 to capture and acquire a still image (a snapshot) obtained by instantaneously capturing a suspicious people (a target people) who is noticed by a police officer by an operation of the police officer (for example, the pressing of the snapshot icon SNP2) (St101). The investigation assistance app displays the snapshot on the display device 1116 (see the confirmation screen WD11 in FIG. 21). The investigation assistance app generates an image analysis request attached with the snapshot acquired in step St101 by an operation of a police officer (for example, the pressing of the image analysis icon DT1), and transmits the image analysis request to the AI integrated server 10 (St102).

The AI integrated server 10 receives the image analysis request transmitted from the mobile terminal VW2 in step St102, attaches the snapshot acquired in step St101, and transfers the image analysis request to the people search server 60 (St103). The people search server 60 executes an image analysis processing on the attached snapshot based on the image analysis request transmitted from the AI integrated server 10 (St104). In step St104, the people search server 60 detects a face, a whole body, and the like of at least one people appearing in the snapshot, and acquires detection frame information (for example, coordinates indicating a position of a detection frame of the face and the whole body) indicating respective ranges of the detected face and whole body in the snapshot. The people search server 60 transmits position information (for example, coordinates) of a detection frame indicating each range of the detected face and whole body in the snapshot to the AI integrated server 10 as an image analysis response (St105). The AI integrated server 10 transfers the image analysis response transmitted from the people search server 60 in step St105 to the mobile terminal VW2 (St106).

The investigation assistance app of the mobile terminal VW2 displays the image analysis response transmitted from the AI integrated server 10 in step St106 on the display device 1116 (see the detection result screen WD12 shown in FIG. 21). Here, it is assumed that the image analysis response includes a face image of a suspicious people who is noticed by a police officer. The investigation assistance app receives a selection (for example, the pressing of the blacklist registration icon BKRG1) of a face frame display image (for example, see the face image EX1 in FIG. 21) of a target people (for example, a suspicious people) who is noticed by a police officer from a plurality of pieces of detection frame information by an operation of the police officer (St107). When the investigation assistance app detects that the blacklist registration icon BKRG1 is pressed, the investigation assistance app receives an input of various kinds of information (see the bibliographic input screen WD313 in FIG. 21) of a target people (for example, a suspicious people) by an operation of a police officer (St108). The investigation assistance app generates a face image blacklist registration request including the snapshot acquired in step St101, the detection frame information of the face of the target people acquired in step St106, the registration valid period input in step St107, and the target people information acquired in step St108, and transmits the face image blacklist registration request to the AI integrated server 10 (St109).

When the AI integrated server 10 receives the fame image blacklist registration request transmitted in step St109, the AI integrated server 10 specifies a transfer destination of the blacklist registration request as the face authentication server 50 so as to request the face authentication server 50 to register the face image in a blacklist, and transfers the blacklist registration request to the face authentication server 50 (St110). When the face authentication server 50 receives the blacklist registration request transferred in step St110, the face authentication server 50 registers (adds) the face image of the target people selected by the mobile terminal VW2 in the blacklist data of the database 52 (St111). Accordingly, since the face authentication server 50 can register the face image of the suspicious people who is noticed by a police officer at the site in the blacklist data, it is possible to efficiently assist an investigation institution such as the police to find a suspicious people such as a suspect. The face authentication server 50 generates a blacklist registration response indicating a report showing that the registration of the face image in the blacklist data is completed, and transmits the blacklist registration response to the AI integrated server 10 (St112). The AI integrated server 10 transfers the blacklist registration response transmitted in step St112 to the mobile terminal VW2 (St113). Based on the reception of the blacklist registration response, the mobile terminal VW2 displays a result indicating whether the face image EX1 selected in step St107 is registered in the blacklist data on the display device 1116 (St114).

On the other hand, the investigation assistance app of the mobile terminal VW2 displays the image analysis response transmitted from the AI integrated server 10 in step St106 on the display device 1116 (see the detection result screen WD12 in FIG. 21). Here, it is assumed that the image analysis response includes a whole body image of a suspicious people who is noticed by a police officer. The investigation assistance app receives a selection (for example, the pressing of the blacklist registration icon BKRG2) of a whole body frame display image (for example, see the whole body image EX2 in FIG. 21) of a target people (for example, a suspicious people) who is noticed by a police officer from a plurality of pieces of detection frame information by an operation of a police officer (St115). When the investigation assistance app detects that the blacklist registration icon BKRG2 is pressed, the investigation assistance app receives an input of various kinds of information (see the bibliographic input screen WD13 in FIG. 21) of a target people (for example, a suspicious people) by an operation of a police officer (St116). The investigation assistance application generates a whole body image blacklist registration request including the snapshot acquired in step St101, the detection frame information of the whole body of the target people acquired in step St106, the registration valid period input in step St115, and the target people information acquired in step St116, and transmits the whole body image blacklist registration request to the AI integrated server 10 (St117).

When the AI integrated server 10 receives the whole body image blacklist registration request transmitted in step St117, the AI integrated server 10 specifies a transfer destination of the blacklist registration request as the people search server 60 so as to request the people search server 60 to register the whole body image in a blacklist, and transfers the blacklist registration request to the people search server 60 (St118). When the people search server 60 receives the blacklist registration request transferred in step St118, the people search server 60 registers (adds) the whole body image of the target people selected by the mobile terminal VW2 in the blacklist data of the database 62 (St119). Accordingly, since the people search server 60 can register the whole body image of the suspicious people who is noticed by a police officer at the site in the blacklist data, it is possible to efficiently assist an investigation institution such as the police to find a suspicious people such as a suspect. The people search server 60 generates a blacklist registration response indicating a report showing that the registration of the whole body image in the blacklist data is completed, and transmits the blacklist registration response to the AI integrated server 10 (St120). The AI integrated server 10 transfers the blacklist registration response transmitted in step St120 to the mobile terminal VW2 (St121). Based on the reception of the blacklist registration response, the mobile terminal VW2 displays a result indicating whether the whole body image EX2 selected in step St115 is registered in the blacklist data on the display device 116 (St122).

Next, an operation procedure related to deletion of a blacklist of an image of a suspicious people in the investigation assistance system 1 according to the sixth embodiment will be described with reference to FIG. 26. FIG. 26 is a sequence diagram showing an operation procedure example related to deletion of an image of a suspicious people from a blacklist in the investigation assistance system 1 according to the sixth embodiment. In the investigation assistance system 1, the mobile terminal VW2 requests the AI integrated server 10 to delete a blacklist by an operation of a police officer until the registration valid period elapses after the registration. This is because, for example, a people other than the people of the face image registered in the blacklist is arrested as a criminal, and thus it is determined that there is the people is not related to an incident or the like. Therefore, there is no need to register the people in a blacklist.

In FIG. 26, a police officer attempts to delete an image (for example, a face image) of a people for whom the registration validity period has not yet elapsed since the registration of the face image in the blacklist.

The investigation assistance app of the mobile terminal VW2 receives an input of deletion of a blacklist of a face image (see the registered people list screen WD15 in FIG. 23) designated by an operation (for example, the pressing of a trash box icon) of a police officer. The investigation assistance app generates a request to delete the designated face image from a blacklist based on the designation by the operation of the police officer, and transmits the request to the AI integrated server 10 (St131).

When the AI integrated server 10 receives the face image blacklist deletion request transmitted in step St131, the AI integrated server 10 specifies a transfer destination of the blacklist deletion request as the face authentication server 50 in order to request the face authentication server 50 to delete the face image from the blacklist, and transfers the blacklist deletion request to the face authentication server 50 (St132). When the face authentication server 50 receives the blacklist deletion request transferred in step St132, the face authentication server 50 deletes the face image of the target people selected by the mobile terminal VW2 from the blacklist data of the database 52 (St133). Accordingly, the face authentication server 50 can appropriately delete a face image of a people who is not required to be registered in the blacklist because it is determined that the people is not related to an incident or the like, and thus the accuracy of a face collation using the blacklist data of the database 52 can be improved. The face authentication server 50 generates a blacklist deletion response indicating a report showing that the deletion of the face image from the blacklist data is completed, and transmits the blacklist deletion response to the AI integrated server 10 (St134). The AI integrated server 10 transfers the blacklist deletion response transmitted in step St134 to the mobile terminal VW2 (St135). Based on the reception of the blacklist deletion response, the mobile terminal VW2 displays a result indicating whether the face image selected in step St131 is deleted from the blacklist data on the display device 116 (St136).

On the other hand, a police officer attempts to delete an image (for example, a whole body image) of a people for whom a registration validity period has not yet elapsed since the registration in the blacklist in FIG. 26.

The investigation assistance app of the mobile terminal VW2 receives an input of deletion of a blacklist of a whole body image (see the registered people list screen WD15 in FIG. 23) designated by an operation (for example, the pressing of a trash box icon) of a police officer. The investigation assistance app generates a request to delete the blacklist of the designated whole body image based on the designation by the operation of the police officer, and transmits the request to the AI integrated server 10 (St137).

When the AI integrated server 10 receives the whole body image blacklist deletion request transmitted in step St137, the AI integrated server 10 specifies a transfer destination of the blacklist deletion request as the people search server 60 so as to request the people search server 60 to delete the whole body image from a blacklist, and transfers the blacklist deletion request to the people search server 60 (St138). When the people search server 60 receives the blacklist deletion request transferred in step St138, the people search server 60 deletes the whole body image of the target people selected by the mobile terminal VW2 from the blacklist data of the database 52 (St139). Accordingly, the people search server 60 can appropriately delete a whole body image of a people who is not required to be registered in the blacklist because it is determined that the people is not related to an incident or the like, and thus the accuracy of a people search using the blacklist data of the database 62 can be improved. The people search server 60 generates a blacklist deletion response indicating a report showing that the deletion of the whole body image from the blacklist data is completed, and transmits the blacklist deletion response to the AI integrated server 10 (St140). The AI integrated server 10 transfers the blacklist deletion response transmitted in step St140 to the mobile terminal VW2 (St141). Based on the reception of the blacklist deletion response, the mobile terminal VW2 displays a result indicating whether the whole body image selected in step St137 is deleted from the blacklist data on the display device 1116 (St142).

As described above, the investigation assistance system 1 according to the sixth embodiment includes the AI integrated server 10 that is communicably connected to a plurality of servers respectively equipped with artificial intelligence for an image analysis, and the mobile terminal VW2 that is communicably connected to the AI integrated server 10. The mobile terminal VW2 acquires the snapshot CAP1 of a crowd around the site where an incident or the like occurs, and requests the AI integrated server 10 to execute an image analysis on one or more people appearing in the snapshot CAP1. The AI integrated server 10 instructs a specific server (for example, the people search server 60) to execute a people image analysis based on a request from the mobile terminal VW2, acquires, from the specific server, a people image analysis result based on the instruction, and transfers the people image analysis result to the mobile terminal VW2. When the AI integrated server 10 receives a blacklist registration request for an image of a specific people (for example, a suspicious people who is noticed by a police officer in a crowd) selected by the mobile terminal VW2 from the people image analysis result, the AI integrated server 10 instructs to register the image of the specific people in a blacklist stored by any one of the plurality of servers.

Accordingly, in a case where there is a suspicious people who is noticed by a police officer operating the mobile terminal VW2 in a crowd around the site where an incident or the like occurs, the investigation assistance system 1 can easily and quickly register a feature image of the suspicious people who might be a suspect causing the incident or the like by an operation of the police officer. Therefore, the investigation assistance system 1 can accurately improve the convenience of an investigation by an investigation institution such as the police.

The mobile terminal VW2 transmits, to the AI integrated server 10, a blacklist registration request including an image of a specific people and a valid period for registering the image of the specific people in a blacklist. The image of the specific people and the valid period are designated by a user operation (for example, an operation of a police officer who carries the mobile terminal VW2). As a result, a police officer who operates the mobile terminal VW2 can easily register a suspicious people who is accidentally noticed by the police officer at a place (for example, the site) different from a dedicated team who performs an analysis in a police station and a registration valid period in blacklist data.

The AI integrated server 10 instructs any one of the corresponding servers to delete an image of a specific people from a blacklist after a registration valid period in the blacklist elapses. Accordingly, even when a police officer who operates the mobile terminal VW2 forgets to delete an image of a corresponding specific people, the investigation assistance system 1 can accurately delete of an unnecessary image of a specific people.

The blacklist registration request further includes specific people information indicating an appearance feature of a specific people designated by a user operation (for example, an operation of a police officer carrying the mobile terminal VW2). Accordingly, a police officer can register the appearance feature (for example, "tall, wearing glasses" described in the remarks field in FIG. 21) of a suspicious people who is a suspect of an incident or the like and is wanted by the police in the blacklist data as a memorandum.

An image of a specific people is a face image of a specific people. The AI integrated server 10 instructs to register the face image of the specific people in the blacklist for face authentication stored by the face authentication server 50 that is one of the servers. Accordingly, since the AI integrated server 10 can enhance contents of the blacklist data stored by the face authentication server 50, it is possible to improve the processing accuracy of the face authentication server 50 that executes a face authentication of a people appearing in captured video data of each of the cameras C1 to C20.

An image of a specific people is a whole body image of a specific people. The AI integrated server 10 instructs to register the whole body image of the specific people in the blacklist for people search stored by the people search server 60 that is one of the servers. Accordingly, since the AI integrated server 10 can enhance contents of the blacklist data stored by the people search server 60, it is possible to improve the processing accuracy of the people search server 60 that executes a people search using an appearance feature of a people appearing in captured video data of each of the cameras C1 to C20 as a search condition.

When the AI integrated server 10 receives a blacklist deletion request for an image of a specific people selected by the mobile terminal VW2, the AI integrated server 10 instructs one of the corresponding servers to delete the image of the specific people from the blacklist. As a result, the AI integrated server 10 can easily delete an image of a people for which it is determined that registration as blacklist data is unnecessary by a police officer who operates the mobile terminal VW2.

An image of a specific people is a face image of a specific people. The AI integrated server 10 instructs to delete a face image of a specific people from the blacklist for face authentication stored by the face authentication server 50 that is one of the servers. Accordingly, the face authentication server 50 can appropriately delete a face image of a people who is not required to be registered in the blacklist because it is determined that the people is not related to an incident or the like, and thus the accuracy of a face collation using the blacklist data of the database 52 can be improved.

An image of a specific people is a whole body image of a specific people. The AI integrated server 10 instructs to delete a whole body image of a specific people from the blacklist for people search stored by the people search server 60 that is one of the servers. Accordingly, the people search server 60 can appropriately delete a whole body image of a people who is not required to be registered in the blacklist because it is determined that the people is not related to an incident or the like, and thus the accuracy of a people search using the blacklist data of the database 62 can be improved.

Although a people search by the people search server 60 and a vehicle search by the vehicle search server 80 have been described as examples of a search executed by the AI integrated server 10 in the sixth embodiment described above, the search is not limited thereto. In other words, a search condition is not limited to a people or a vehicle as shown in FIG. 21 or FIG. 22. For example, the search executed by the AI integrated server 10 may be applied to a face detection (a face search) by the face authentication server 50 and a number plate search by the LPR server 90, and further, the search executed by the AI integrated server 10 may be applied to a combination of a people search by the people search server 60 and a vehicle search by the vehicle search server 80. In this case, a face image (an image search) or a number plate (a text search or an image search) may be used as a search condition. For example, the face image FCE1 shown in FIG. 24 may be displayed as a search result using a face image. For example, the number plate detail display information PLT1 shown in FIG. 25 or 26 and the face image FCE2 of a purchaser of a vehicle corresponding to the number plate information may be displayed as a search result using a number plate.

Although an AND search of a people search by the people search server 60 and a vehicle search by the vehicle search server 80 and an AND search of a face collation by the face authentication server 50, a people search by the people search server 60, and a vehicle search by the vehicle search server 80 are described as an example of an AND search (a transverse search) executed by the AI integrated server 10 in the sixth embodiment described above, an example of the AND search is not limited thereto. For example, the AI integrated server 10 can execute an AND search (a transverse search) by the following combination.

For example, in addition to the face collation by the face authentication server 50, at least one of a people search by the people search server 60, a behavior detection by the behavior detection server 70 (for example, a collation of a face image similar to a face image of a people who is quarreling or carries a gun), a vehicle search by the vehicle search server 80 (for example, a collation of a face image of a male in his thirties and riding a white car), a number plate collation by the LPR server 90 (for example, a collation of a face image of a people who is similar to a certain face image and rides a vehicle having a number plate with the first two digits being specific numbers), and the like can be combined.

For example, in addition to a people search by the people search server 60, at least one of a behavior detection by the behavior detection server 70 (for example, a search for a people who wears black clothes and performs a destruction behavior on an object or carries a gun), a search by the vehicle search server 80 (for example, a search for a people who wears red clothes and comes close to a white vehicle), a number plate collation by the LPR server 90 (for example, a search for a people who wears black clothes and comes close to a vehicle having a number of a specific number), and the like can be combined.

For example, in addition to a vehicle search by the vehicle search server 80, at least one of a behavior detection by the behavior detection server 70 (for example, a search for a sedan vehicle that travels backward, or a taxi vehicle that is threatened by a gun from outside), a number plate collation by the LPR server 90 (for example, a search for a vehicle that travels backward and has a number plate of which the first two digits are specific numbers), and the like can be combined.

For example, in addition to a number plate collation by the LPR server 90, at least one of a behavior detection by the behavior detection server 70 (for example, a detection of a behavior indicating that a vehicle has a number plate with the first two digits being specific numbers and travels backward, a detection of a behavior indicating that a driver of a vehicle having a number plate with the first two digits being specific numbers is threatened by a gun from the outside), and the like can be combined.

Although an object in a captured video of each of the cameras C1 to C20 is a people or a vehicle in the sixth embodiment described above, the object is not limited to a people or a vehicle, and may be another object (for example, a moving object). The moving object may be, for example, a flying object such as a drone operated by a people such as a suspect who caused an incident or the like.

The present application is based on Japanese Patent Application NO. 2019-207978 filed on Nov. 18, 2019 and Japanese Patent Application NO. 2019-231727 filed on Dec. 23, 2019.

INDUSTRIAL APPLICABILITY

The present disclosure is useful as an investigation assistance system and an investigation assistance method that efficiently assist, at an early stage, specification of a suspect who causes an incident or the like or a vehicle for escape used by the suspect and improve convenience of an investigation of an investigation institution such as the police.

REFERENCE SIGNS LIST

1 investigation assistance system
10 AI integrated server
11, 41, 51, 61, 71, 81, 91, PRC1, PRC2 processor
12, 42, 52, 62, 72, 82, 92 database
13, 54, 114 server IF controller
14 client IF controller
40 video management server
50 face authentication server
53 camera IF controller
60 people search server
70 behavior detection server
80 vehicle search server
90 LPR server
112 recording device
115 input device
116 display device
117 speaker
C1, C2, C3, C20 camera
MM1, MM2, MM3 memory
NW1 network
VW1 client terminal
VW2 mobile terminal

The invention claimed is:

1. An investigation assistance system comprising:
a processor;
a user terminal; and an integrated server that is communicably connected to a plurality of analysis servers, wherein the plurality of analysis servers each include a machine learning model;

wherein the user terminal is configured to:
- obtain a snapshot of a scene where an incident occurs including images of an object that includes at least one person at the scene;
- display an analysis server selection screen showing a list of the plurality of analysis servers corresponding to a plurality of different object feature elements related to an incident,
- select a first analysis server that includes a first machine learning model from the analysis server selection screen,
- transmit, to the integrated server, a search request via the plurality of analysis servers that each include the machine learning model for the object that includes the at least one person at the scene satisfying a search condition including an object feature element of the object being searched by the selected first analysis server based on an input of the search condition,
- upon receiving from the integrated server a search result that includes a blacklist registration request for the at least one person, selecting the at least one person for blacklisting, and
- transmitting the selected at least one person for blacklisting to the integrated server; and wherein the integrated server is configured to;
- transmit an object search instruction to the first analysis server based on the search request,
- receive the search result from the first analysis server indicating that the object feature element of the object that includes the at least one person at the scene as part of the blacklist registration request of the at least one person at the scene,
- transmit the search result from the analysis server that includes the blacklist registration request of the at least one person to the user terminal, and
- upon receiving from the user terminal the selected at least one person for blacklisting, transmit a request to the analysis server that the selected at least one person for blacklisting be registered on the blacklist.

2. The investigation assistance system according to claim 1,
wherein the user terminal selects a second analysis server from the analysis server selection screen after the first analysis server is selected, and transmits, to the integrated server, a search request for an object satisfying a search condition including an object feature element of an object to be searched by the selected first analysis server and second analysis server selection screen based on an input of the search condition, and
wherein the integrated server transmits an object search instruction to each of the first analysis server and the second analysis server based on the search request, receives a search result from each of the first analysis server and the second analysis server, and transmits the search result to the user terminal.

3. The investigation assistance system according to claim 1,
wherein the integrated server is communicably connected to n (n is an integer equal to or larger than 2) analysis servers, and periodically monitors a communication status with each of the n analysis servers,
wherein when a search condition including k (k is an integer from 1 to n) different object feature elements is received from the user terminal, the integrated server determines k analysis servers provided corresponding to the k object feature elements included in the search condition among the n analysis servers, and transmits an object search request to each of the k analysis servers,
wherein when it is detected that a communication disconnection with a specific analysis server among the k analysis servers occurs, the integrated server transmits, to the user terminal, search results received from the (k−1) analysis servers and a communication disconnection notification indicating that a communication disconnection with the specific analysis server occurs, and
wherein the user terminal displays a search result screen including the search results received from the (k−1) analysis servers and the communication disconnection notification.

4. The investigation assistance system according to claim 3,
wherein the user terminal displays the search result screen including a communication disconnection icon indicating that a communication disconnection with the specific analysis server occurs.

5. The investigation assistance system according to claim 3,
wherein when it is detected that the communication with the specific analysis server is restored, the integrated server transmits a restoration notification indicating that the communication with the specific analysis server is restored to the user terminal, and
wherein the user terminal displays the search result screen including the restoration notification transmitted from the integrated server.

6. The investigation assistance system according to claim 5,
wherein the user terminal does not display a communication disconnection icon on the search result screen according to the reception of the restoration notification, the communication disconnection icon indicating that a communication disconnection with the specific analysis server occurs before the user terminal receives the restoration notification from the integrated server.

7. The investigation assistance system according to claim 1,
wherein the integrated server is communicably connected to at least a first analysis server and a second analysis server,
wherein when a search condition including a first object feature element related to an incident and a second object feature element related to the incident is received from the user terminal, the integrated server transmits a search request for an object satisfying the first object feature element to the first analysis server and a search request for an object satisfying the second object feature element to the second analysis server,
wherein the integrated server receives a first search result including the object satisfying the first object feature element from the first analysis server and a second search result including the object satisfying the second object feature element from the second analysis server,
wherein the integrated server transmits a third search result obtained by excluding the second search result from the first search result to the user terminal, and
wherein the user terminal displays a search result screen including the third search result transmitted from the integrated server.

8. The investigation assistance system according to claim 7,
wherein the first search result includes identification information and imaging time information of a camera that images the object satisfying the first object feature element,
wherein the second search result includes identification information and imaging time information of a camera that images the object satisfying the second object feature element, and
wherein the integrated server extracts the third search result based on the second search result in which the identification information and the imaging time information of the camera included in each of the first search result and the second search result are the same.

9. The investigation assistance system according to claim 7,
wherein the user terminal transmits, to the integrated server, an exclusion search condition in which some object feature elements constituting the first object feature element or the second object feature element are designated as search exclusion targets, and
wherein the integrated server transmits a search request for an object satisfying the exclusion search condition to the first analysis server or the second analysis server, receives a search result from the first analysis server or the second analysis server, and transmits the search result to the user terminal.

10. An investigation assistance method executed by an investigation assistance system including a processor, a user terminal, and an integrated server that is communicably connected to a plurality of analysis servers, the investigation assistance method comprising:
obtaining, by the user terminal, a snapshot of a scene where an incident occurs including images of an object that includes at least one person at the scene;
displaying, by the user terminal, an analysis server selection screen showing a list of the plurality of analysis servers corresponding to a plurality of different object feature elements related to an incident, wherein the plurality of analysis servers each include a machine learning model;
selecting, by the user terminal, a first analysis server that includes a first machine learning model from the analysis server selection screen;
transmitting, by the user terminal to the integrated server, a search request via the plurality of analysis servers that each include the machine learning model for the object that includes the at least one person at the scene satisfying a search condition including an object feature element of the object being searched by the selected first analysis server based on an input of the search condition;
transmitting, by the integrated server, an object search instruction to the first analysis server based on the search request;
receiving, by the integrated server, a search result from the first analysis server indicating the object feature element of the object that includes the at least one person at the scene as part of a blacklist registration request of the at least one person at the scene;
transmitting, by the integrated server to the user terminal, the search result that includes the blacklist registration request of the at least one person to the user terminal;
upon receiving the search result that includes a blacklist registration request for the at least one person, selecting at the user terminal the at least one person for blacklisting, and
transmitting, from the user terminal to the integrated server, the selected at least one person for blacklisting to the integrated server; and
upon receiving the selected at least one person for blacklisting, transmitting a request to the analysis server that the selected at least one person for blacklisting be registered on the blacklist.

11. The investigation assistance method according to claim 10,
wherein the integrated server is communicably connected to n (n is an integer equal to or larger than 2) analysis servers,
the investigation assistance method further comprising:
periodically monitoring, by the integrated server, a communication status with each of the n analysis servers;
receiving, by the integrated server, a search condition including k (k is an integer from 1 to n) different object feature elements from the user terminal, and subsequently determining k analysis servers provided corresponding to the k object feature elements included in the search condition among the n analysis servers;
transmitting, by the integrated server, an object search request to each of the k analysis servers;
when detecting that a communication disconnection with a specific analysis server among the k analysis servers occurs, transmitting, by the integrated server, to the user terminal, search results received from the (k−1) analysis servers and a communication disconnection notification indicating that a communication disconnection with the specific analysis server occurs; and
displaying, by the user terminal, a search result screen including the search results received from the (k−1) analysis servers and the communication disconnection notification.

12. The investigation assistance method according to claim 10,
wherein the integrated server is communicably connected to at least a first analysis server and a second analysis server,
the investigation assistance method further comprising:
receiving, by the integrated server, a search condition including a first object feature element related to an incident or the like and a second object feature element related to the incident or the like from the user terminal, and subsequently transmitting, by the integrated server, a search request for an object satisfying the first object feature element to the first analysis server and a search request for an object satisfying the second object feature element to the second analysis server,
receiving, by the integrated server, a first search result including the object satisfying the first object feature element from the first analysis server and a second search result including the object satisfying the second object feature element from the second analysis server,
transmitting, by the integrated server, a third search result obtained by excluding the second search result from the first search result to the user terminal, and
displaying, by the user terminal, a search result screen including the third search result transmitted from the integrated server.

* * * * *